US012384574B1

(12) United States Patent
Seiver et al.

(10) Patent No.: US 12,384,574 B1
(45) Date of Patent: Aug. 12, 2025

(54) SYSTEMS, APPARATUS AND METHODS FOR ROTATING A CONTAINER IN A CONTAINER MANIPULATION SYSTEM

(71) Applicant: Specialty Equipment Fabrication Company, Houston, TX (US)

(72) Inventors: Michael J. Seiver, Houston, TX (US); Thomas P. Reichelt, Katy, TX (US); Jaime Iramategui, Katy, TX (US); Louis E. Bruce, Pearland, TX (US)

(73) Assignee: Specialty Equipment Fabrication Company, Houston, TX (US)

( * ) Notice: Subject to any disclaimer, the term of this patent is extended or adjusted under 35 U.S.C. 154(b) by 38 days.

(21) Appl. No.: 18/377,192

(22) Filed: Oct. 5, 2023

Related U.S. Application Data

(63) Continuation of application No. 17/492,644, filed on Oct. 3, 2021, now Pat. No. 11,780,614, which is a continuation of application No. 17/073,328, filed on Oct. 17, 2020, now Pat. No. 11,136,150, which is a continuation of application No. 16/190,647, filed on Nov. 14, 2018, now Pat. No. 10,807,744.

(51) Int. Cl.
| | |
|---|---|
| *B65B 7/28* | (2006.01) |
| *B65G 47/244* | (2006.01) |
| *B67B 1/06* | (2006.01) |
| *B67B 3/20* | (2006.01) |
| *B67B 3/26* | (2006.01) |
| *B67B 3/28* | (2006.01) |
| *B67B 7/42* | (2006.01) |
| *B67C 3/30* | (2006.01) |

(52) U.S. Cl.
CPC .......... *B65B 7/2828* (2013.01); *B65G 47/244* (2013.01); *B67B 1/06* (2013.01); *B67B 3/2013* (2013.01); *B67B 3/204* (2013.01); *B67B 3/2073* (2013.01); *B67B 3/264* (2013.01); *B67B 3/28* (2013.01); *B67B 7/42* (2013.01); *B67C 3/30* (2013.01)

(58) Field of Classification Search
CPC ................ B65B 7/2828; B65G 47/244; B65G 47/2445; B67B 1/06; B67B 3/2013; B67B 3/204; B67B 3/2073; B67B 3/264; B67B 3/28; B67B 7/42; B67C 3/30
USPC ......................................... 198/379, 415–416
See application file for complete search history.

(56) References Cited

U.S. PATENT DOCUMENTS

| | | | |
|---|---|---|---|
| 3,462,001 A * | 8/1969 | Boyce ................ | B65G 47/2445 198/623 |
| 4,257,151 A * | 3/1981 | Coots ..................... | B23P 19/06 53/367 |

(Continued)

*Primary Examiner* — Mark A Deuble
(74) *Attorney, Agent, or Firm* — E. Randall Smith; E. Randall Smith, PC

(57) ABSTRACT

Methods and apparatus for rotating a container delivered to a container manipulation system on a conveyor are described. In some embodiments, first and second carriages are positioned on opposite sides of the conveyor, each carrying respective forward and rear clamp arms. Each clamp arm is selectively independently moveable and carries at least first and second vertically spaced-apart wheels. All of the wheels are engageable with the container on the conveyor. At least two wheels on the first carriage are power-driven and selectively rotatable. The remaining wheels are free-spinning. Additional methods, systems and apparatus are also disclosed.

1 Claim, 34 Drawing Sheets

(56) References Cited

U.S. PATENT DOCUMENTS

| | | | | |
|---|---|---|---|---|
| 4,494,583 | A * | 1/1985 | Reeves, Jr. | ............... B65B 3/28 141/168 |
| 5,305,581 | A * | 4/1994 | Reeves, Jr. | ........... B65B 7/2842 53/381.4 |
| 5,415,520 | A * | 5/1995 | Seiver | .................. B65G 47/088 414/799 |
| 5,701,990 | A * | 12/1997 | Novak | ............... B65G 47/2445 198/604 |
| 6,053,219 | A * | 4/2000 | Seiver | .................... G01G 17/06 141/83 |
| 6,275,890 | B1 * | 8/2001 | Lee | ........................ G06F 13/36 710/39 |
| 6,848,565 | B2 * | 2/2005 | Lehmann | ............... B65G 47/22 198/456 |
| 8,157,084 | B2 * | 4/2012 | Begin | ................. B65G 47/244 198/399 |
| 10,807,744 | B1 * | 10/2020 | Seiver | ................... B67B 3/2013 |
| 11,136,150 | B1 * | 10/2021 | Seiver | ..................... B67B 3/204 |

* cited by examiner

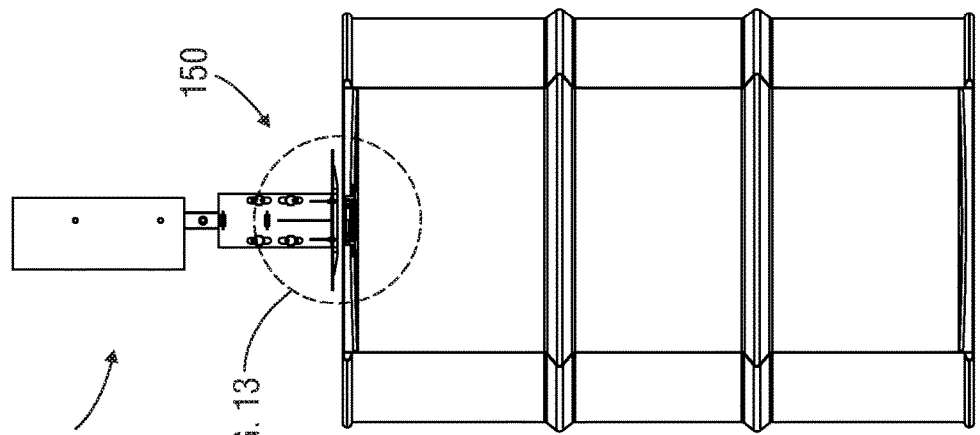
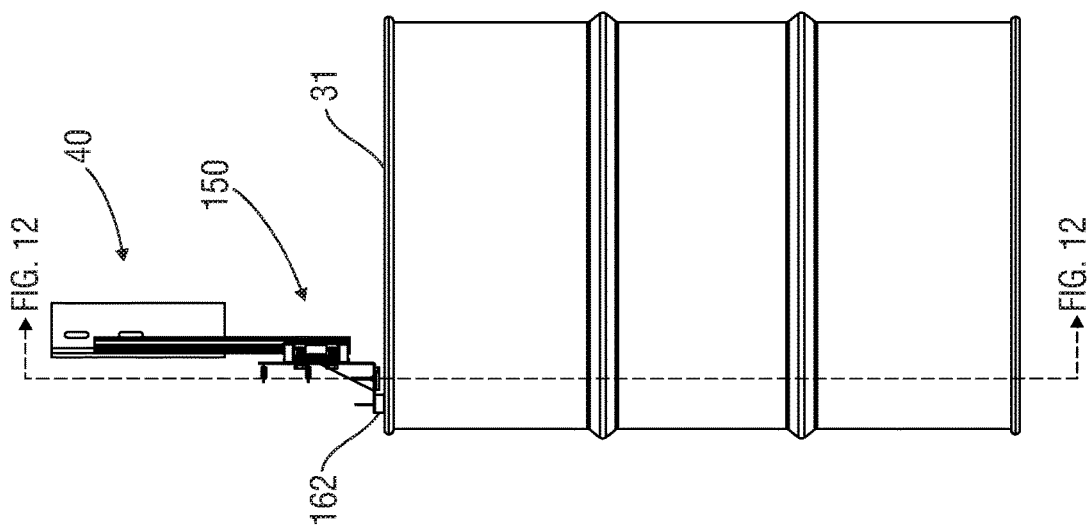

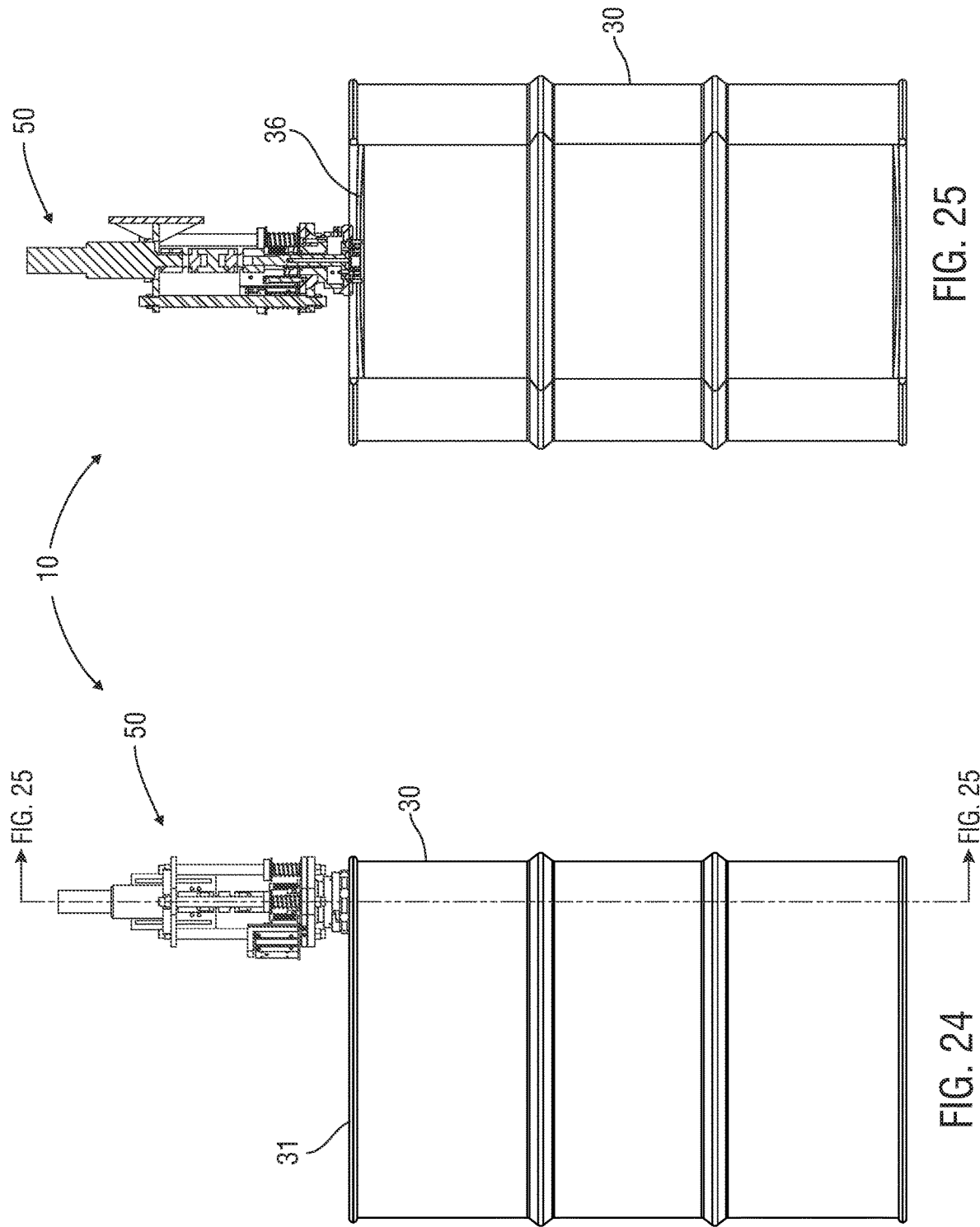

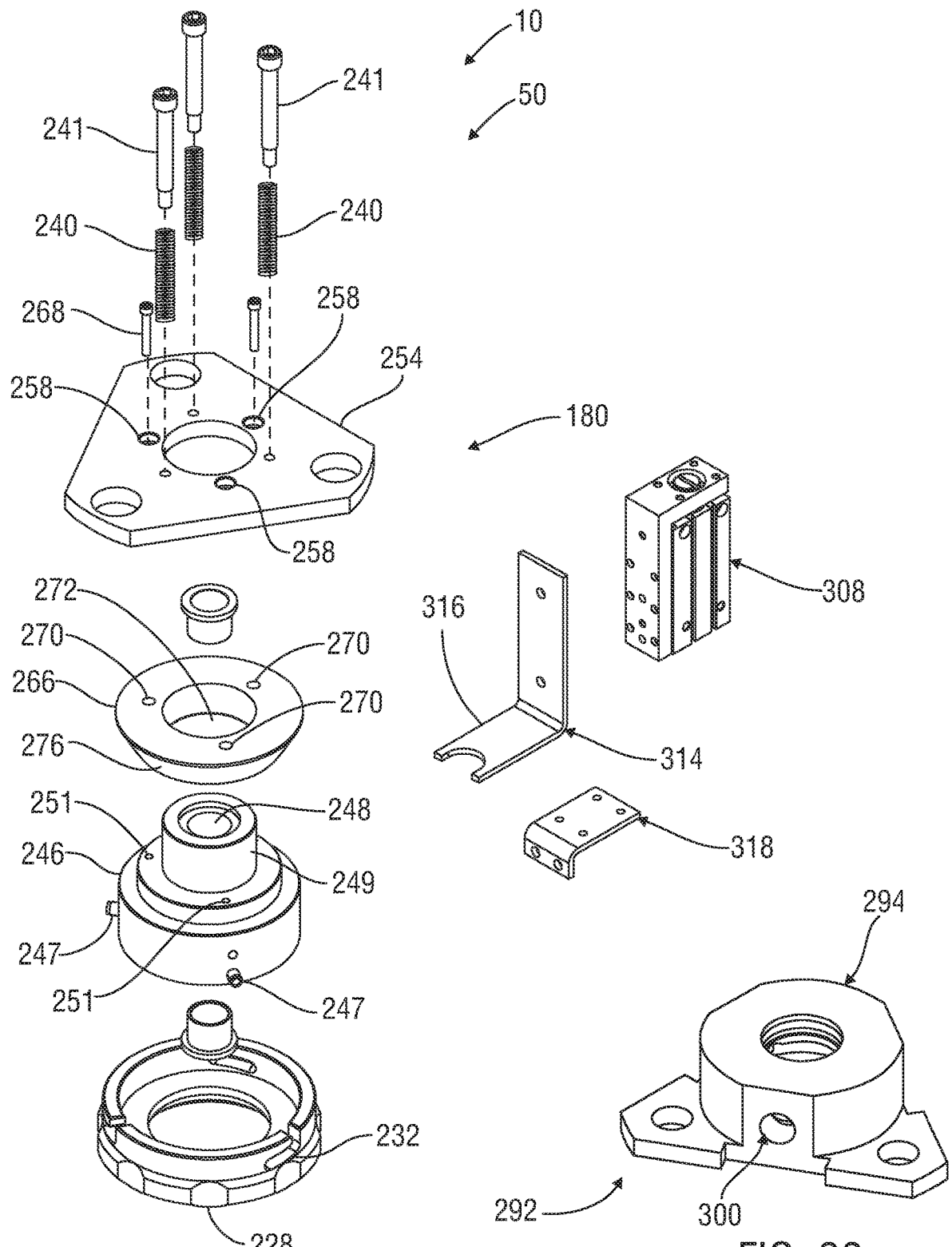

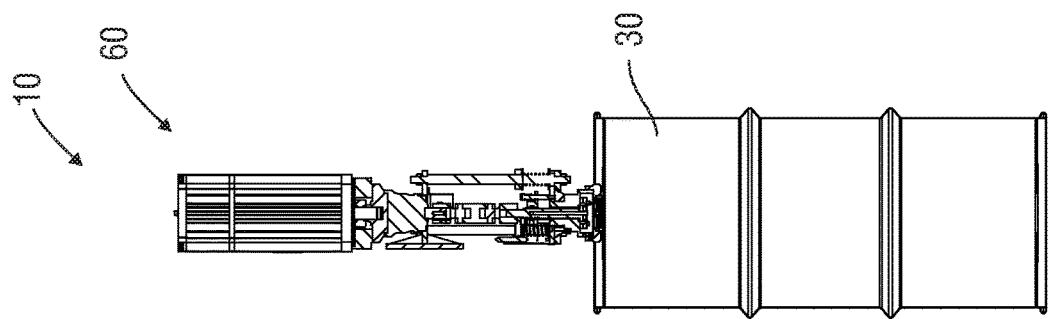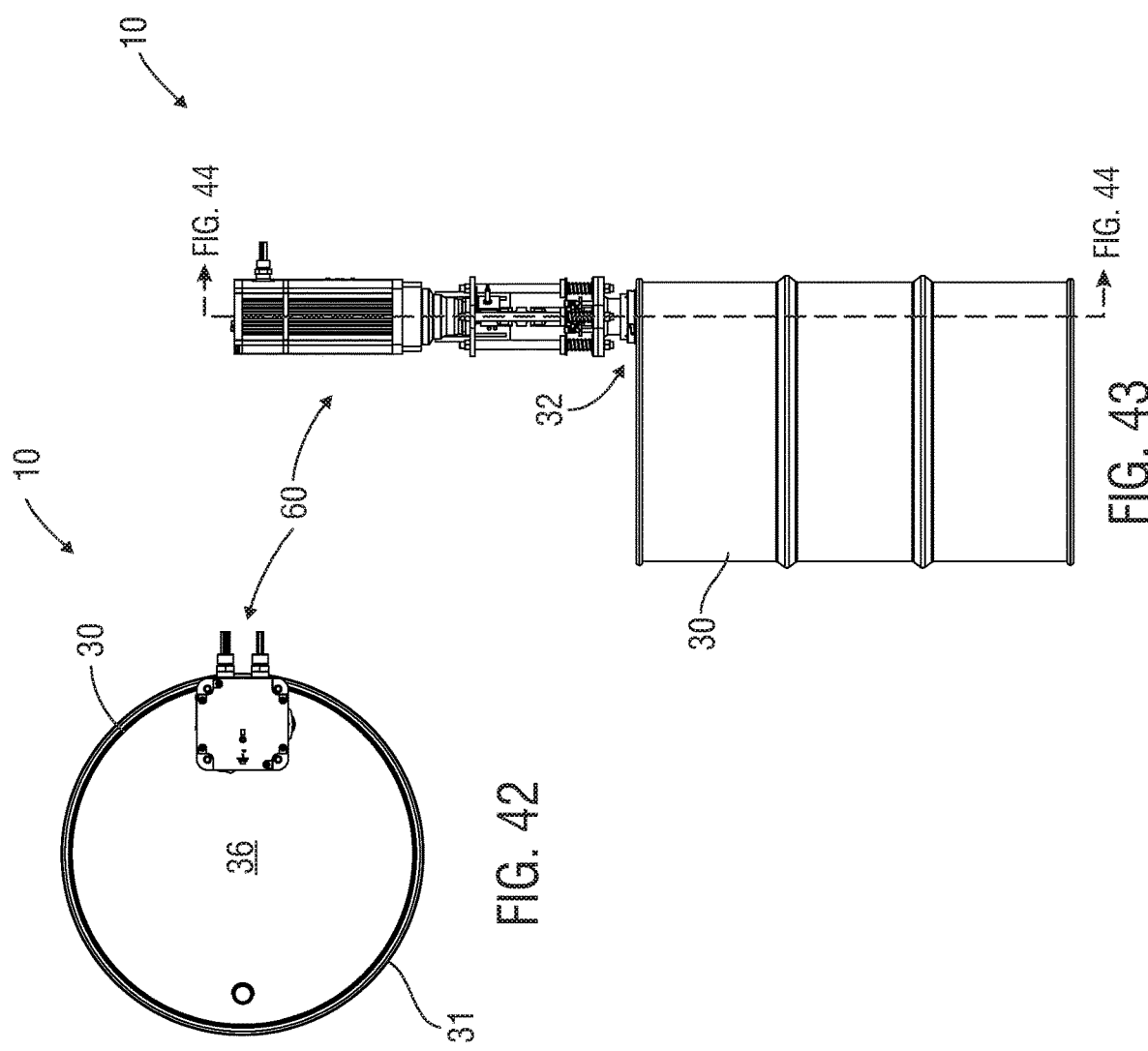

SYSTEMS, APPARATUS AND METHODS FOR ROTATING A CONTAINER IN A CONTAINER MANIPULATION SYSTEM

CROSS REFERENCE TO RELATED APPLICATIONS

The present application is a continuation application of and claims priority to U.S. patent application Ser. No. 17/492,644, filed on Oct. 3, 2021, entitled "Systems, Apparatus and Methods for Engaging a Cap Releasably Secured in a Container" and issued as U.S. Pat. No. 11,780,614 on Oct. 10, 2023, which is a continuation application of and claims priority to U.S. patent application Ser. No. 17/073,328 filed on Oct. 17, 2020, entitled "Apparatus for Installing a Bung Plug in and/or Extracting a Bung Plug from a Container" and issued as U.S. Pat. No. 11,136,150 on Oct. 5, 2021, which is a continuation application of and claims priority to U.S. patent application Ser. No. 16/190,647, filed on Nov. 14, 2018, entitled "Apparatus, Systems & Methods for Manipulating a Drum or other Container" and which issued on Oct. 20, 2020 as U.S. Pat. No. 10,807,744, all of which are hereby incorporated by reference herein in their entireties.

FIELD OF THE DISCLOSURE

The present disclosure relates generally to apparatus and methods for rotating containers in a container manipulation system.

BACKGROUND

In various industries, containers (such as 55 gallon drums) are commonly used to store, transport and dispense materials and fluids. During the life of many such containers, after the containers have been initially filled or used, they are often refilled and reused many times. Other container processing activities may involve testing, cleaning, maintenance, retrofitting, etc. Automated or partially-automated systems and techniques have been developed for performing such container processing ("manipulation") activities, which often include the removal and/or installation of the "bung plug" (or other closure) of the container.

Presently known systems and techniques for manipulating containers are believed to have one or more disadvantages. For example, many known systems and techniques that require rotation of the container to move the container fill-hole to a desired position are ill-equipped to automatically, effectively and efficiently rotate the container, stop the container's rotation at a desired time, accurately position the fill hole or a combination thereof. For another example, many systems and techniques that involve removal and/or replacement of the bung plug are unable to effectively engage their bung plug extractor and/or installer with the container for extraction or installation when the container is not perfectly aligned therewith or has moved out of alignment. For yet another example, many known systems and techniques involving the replacement of threadably engaged bung plugs to various types of containers lack the ability to automatically, effectively, properly or efficiently thread the bung plugs or avoid frequent cross-threading. For still a further example, many such systems and techniques are not equipped to automatically, effectively, accurately or efficiently measure and/or report whether or not the bung plug has been properly installed in the container (e.g. whether an unacceptable or excessive amount of torque was applied to the installed bung plug or other variables), such as for Six Sigma, DOT or other requirements or certifications. With many known systems and techniques, it is believed to be difficult or impossible to perform one or more of the above operations (e.g. automatic, proper or effective container rotation, fill-hole positioning, bung plug extraction, bung plug installation, bung plug threading, measurement and reporting of bung plug installation variables) on a continuous supply of containers without frequent interruption, or with minimal or no human involvement. For still another example, various know systems and techniques are not equipped to automatically remove and install the same bung plug for each respective container. Further disadvantages are believed to exist with respect to various known systems or devices used for manipulating containers.

It should be understood that the above-described examples, disadvantages, features and capabilities are provided for illustrative purposes only and are not intended to limit the scope or subject matter of this disclosure or the appended claims. Thus, none of the appended claims or claims of any patent or patent application related hereto should be limited by the above discussion or construed to address, include or exclude each or any of the above-cited examples, disadvantages, features and capabilities merely because of the mention thereof in this patent.

Accordingly, there exists a need for improved systems, articles and methods useful for manipulating containers having one or more of the attributes or capabilities described or shown in, or as may be apparent from, the various parts of this patent.

BRIEF SUMMARY OF THE DISCLOSURE

In various embodiments, the present disclosure involves apparatus for rotating a container in a container manipulation system. The container is delivered to the container manipulation system on a conveyor having first and second sides and front and rear ends. The apparatus includes first and second carriages positioned proximate to opposite sides of the conveyor, respectively, so that the first carriage is closer to the first side of the conveyor and the second carriage is closer to the second side of the conveyor. Each carriage carries respective forward and rear clamps arms, the rear clamp arm of each carriage being closer to the rear end of the conveyor than the respective associated front clamp arm. Each clamp arm is selectively independently moveable toward and away from the container on the conveyor and carries at least first and second vertically spaced-apart wheels. The wheels on the respective rear clamp arms are rearward of the wheels on the corresponding associated front clamp arms relative to the conveyor. All of the wheels are engageable with the container on the conveyor. At least two of the wheels on the first carriage are power-driven and selectively rotatable. The remaining wheels on the first and second carriages are free-spinning.

In some embodiment, the present disclosure involves apparatus for extracting a bung plug from and installing a bung plug into a container, the container having a bung opening formed in and facing upwardly from an upper surface thereof, the bung opening configured to contain the bung plug therein. A carrier is selectively movable up and down relative to the container. A bung plug engagement tool carried by the carrier includes at least one shaft having upper and lower ends and a bung plug wrench disposed at or proximate to the lower end of the at least one shaft. At least one vacuum source is associated with the bung plug engagement tool, whereby a vacuum may be selectively provided proximate to the bung plug wrench to retain the bung plug after it is extracted from the drum. A centering collar is carried by the carrier and at least partially encapsulates the bung plug wrench. The bung plug wrench and centering collar are both biased downwardly relative to the carrier and container and the bung plug wrench is additionally biased downwardly relative to the centering collar, carrier and container during use of the apparatus.

If desired, the vacuum source may include at least one air compressor, vacuum generator or vacuum pump or a combination thereof. The vacuum source may be releasably fluidly coupled to the bung plug engagement tool. The centering collar may engage the container during bung plug installation and extraction.

At least two spaced-apart outer springs may be positioned radially outwardly of the shaft(s) of the bung plug engagement tool, respectively, to provide downward biasing forces upon the centering collar and bung plug wrench relative to the carrier and container. The container may have a vertical axis that extends through the center of the bung opening and the carrier may have a vertical axis. The centering collar may engage the container during bung plug installation and extraction and the outer springs may allow the centering collar and bung plug wrench to concurrently tilt in any direction around 360° relative to the vertical axis of the carrier and automatically align in the vertical axis of the container during bung plug installation and extraction.

At least two spaced-apart inner springs, separate and distinct from the outer springs, may also be positioned radially outwardly of the at least one shaft, respectively, and which provide downward biasing forces upon the bung plug wrench relative to the centering collar, carrier and container. The downward biasing forces of each outer spring may be greater than the downward biasing forces of each inner spring to retain the centering collar engaged with the container as desired during bung plug installation and extraction even if the bung plug wrench is pushed up. The inner springs may be configured to provide downward biasing forces on the bung plug wrench relative to the carrier, centering collar and container to assist in maintaining engagement of the bung plug wrench with the bung plug and container as desired during bung plug installation and extraction.

In some embodiments, a method of extracting a bung plug from and installing a bung plug in a container is provided. The container has a bung opening formed in and facing upwardly from an upper surface thereof and the bung opening is configured to contain the bung plug therein. A carrier of the apparatus is selectively moved downwardly relative to the container and over the bung opening and bung plug contained therein. A centering collar carried by the carrier is downwardly biased into contact with the upper surface of the container around the bung opening and a bung plug wrench carried by the carrier is downwardly biased into contact with the bung plug. The bung plug wrench is separately downwardly biased to ensure it stays in contact with the bung plug regardless of the position of the centering collar. At least one vacuum is associated with the bung plug wrench to retain the bung plug in contact with the bung plug wrench. The carrier bung plug carried thereby are selectively moved away from the container. The carrier is selectively moved downwardly relative to the container and over the bung opening. The centering collar is downwardly biased into contact with the upper surface of the container around the bung opening and the bung plug wrench is downwardly biased over the bung opening. The bung plug wrench aligns the bung plug with the bung opening. The vacuum associated with the bung plug wrench is released and the bung plug wrench engages the bung plug with the bung opening.

In various embodiments, the present disclosure involves apparatus for extracting a bung plug from and installing a bung plug into a container having a bung opening formed in and facing upwardly from at least one surface thereof. The bung opening is configured to contain the bung plug therein. The apparatus includes a carrier selectively movable up and down relative to the container. A bung plug engagement tool is carried by the carrier and includes at least one shaft a bung plug wrench disposed at or proximate to the lower end thereof. A centering collar is also carried by the carrier. During use of the apparatus, the bung plug wrench and centering collar are both biased downwardly relative to the carrier and container and the bung plug wrench is additionally biased downwardly relative to the centering collar, carrier and container. At least two spaced-apart outer springs are positioned radially outwardly of the shaft(s) of the bung plug engagement tool, respectively, and provide downward biasing forces upon the centering collar and bung plug wrench relative to the carrier and container.

If desired, at least two spaced-apart inner springs, separate and distinct from the outer springs, may also be positioned radially outwardly of the shaft(s) and provide downward biasing forces upon the bung plug wrench relative to the centering collar, carrier and container. The centering collar may engage at least one surface of the container during bung plug installation and extraction and the downward biasing forces of each outer spring may be greater than the downward biasing forces of each inner spring. The springs may take the form of resilient members, elastic members, coil springs, swivel joint, bearings, non-resilient members, a motor or any other form.

The container may have a vertical axis that extends through the center of the bung opening and the carrier may have a vertical axis. During bung plug installation and extraction, the centering collar may engage the container and the outer springs may allow the centering collar and bung plug wrench to concurrently tilt in any direction around 360° relative to the vertical axis of the carrier and automatically align in the vertical axis of the container.

In many embodiments, the present disclosure involves apparatus for extracting a bung plug from and installing a bung plug into a container. The container has a bung opening formed in at least one surface thereof and which is configured to contain the bung plug therein. The apparatus includes a carrier selectively movable up and down relative to the container. A bung plug engagement tool is carried by the carrier and includes at least one shaft and a bung plug wrench disposed at or proximate to the lower end thereof. A centering collar is carried by the carrier. Both the bung plug wrench and centering collar are biased downwardly relative to the carrier and container during use of the apparatus. The bung plug wrench is additionally biased downwardly relative to the centering collar, carrier and container. At least two spaced-apart inner springs provide downward biasing forces upon the bung plug wrench relative to the centering collar, carrier and container. If desired, the inner springs may be are configured to assist in maintaining engagement of the bung plug wrench with the bung plug as desired during bung plug installation and extraction.

Certain embodiments involve methods of engaging a bung plug extractor/installer with a bung plug that is releasably secured to a container. The container includes a bung opening formed in and facing upwardly from at least one surface thereof and which is configured to contain the bung plug therein. The method includes selectively moving a carrier of the bung plug extractor/installer over the bung opening and bung plug contained therein. The carrier carries a centering collar and bung plug engagement tool, the bung plug engagement tool including at least one shaft and at least one bung plug wrench. At least first and second spaced-apart springs are positioned radially outwardly of at least one shaft of the bung plug engagement tool and assist in biasing the centering collar downwardly into contact with at least one surface of the container around the bung opening and biasing at least one bung plug wrench downwardly into contact with the bung plug. At least third and fourth spaced-apart springs separately downwardly bias the bung plug wrench relative to the centering collar, carrier and container.

If desired, these methods may include actuating the bung plug wrench to disconnect the bung plug from the container. Suction pressure may be provided in at least one passageway formed in at least part of the shaft(s) of the bung plug engagement tool to retain the bung plug in contact with the bung plug wrench. The carrier and bung plug carried thereby may be selectively moved away from and/or over the bung opening of the container. A centering assembly carried by the carrier may align the bung plug with the bung opening. The centering collar may be biased into contact with at least one surface of the container around the bung opening and the bung plug may be biased onto the bung opening. Suction pressure in the at least one passageway may be released and the bung plug secured in the bung opening.

There are embodiments of the present disclosure that involves apparatus for extracting a cap from a fill hole of a container with the use of at least one vacuum source that provides suction pressure. The fill hole is formed in at least one surface of the container. The apparatus includes a carrier selectively movable up and down relative to the container. A cap engagement tool is carried by the carrier and selectively at least partially engageable with the cap. When the cap engagement tool engages the cap, at least one space is formed between at least part of the cap engagement tool and the cap. A centering collar is carried by the carrier and positioned at least partially radially outwardly of at least part of the cap engagement tool. A first plurality of spaced-apart biasing members is positioned radially outwardly of at least part of the cap engagement tool and provides downward biasing forces upon the centering collar and at least part of the cap engagement tool relative to the carrier and container. At least one passageway fluidly couples one or more of the spaces and vacuum source and allows suction pressure to be selectively provided to the space(s) to retain the cap with the cap engagement tool after the cap is extracted from the container.

If desired, the cap engagement tool may include at least one shaft and a cap extraction wrench disposed at or proximate to the lower end thereof and the fluid passageway(s) may extend at least partially through the shaft(s) and cap extraction wrench. A second plurality of spaced-apart biasing members, separate and distinct from the first plurality of spaced-apart biasing members, may be provided to provide downward biasing forces upon at least part of the cap engagement tool relative to the centering collar, carrier and container. The first and/or second pluralities of spaced-apart biasing members may include three spaced-apart biasing members. If desired, each biasing member may include at least one among at least one coil spring, resilient member, non-resilient member, swivel and bearing.

The present disclosure also includes embodiments of apparatus for extracting a cap from a fill hole of a container with the use of at least one vacuum source that provides suction pressure. The fill hole is formed in at least one surface of the container. The apparatus includes a carrier selectively movable up and down relative to the container. A cap engagement tool is carried by the carrier and selectively at least partially engageable with the cap. When the cap engagement tool engages the cap, at least one space is formed between at least part of the cap engagement tool and the cap. A centering collar is carried by the carrier and positioned at least partially radially outwardly of at least part of the cap engagement tool. A first plurality of spaced-apart biasing members provides downward biasing forces upon at least part of the cap engagement tool relative to the centering collar, carrier and container. At least one passageway fluidly couples one or more of the spaces and vacuum source and allows suction pressure to be selectively provided to the space(s) to retain the cap with the cap engagement tool after the cap is extracted from the container.

If desired, a second plurality of spaced-apart biasing members which are separate and distinct from the first plurality of spaced-apart biasing members may provide downward biasing forces upon the centering collar relative to the carrier and container. The downward biasing forces of each of the second plurality of biasing members may be greater than the downward biasing forces of each of the first plurality of biasing members. If desired, each biasing member may include at least one among at least one coil spring, resilient member, non-resilient member, swivel and bearing.

In some embodiments, the present disclosure involves apparatus for installing a removable bung plug in and/or extracting a removable bung plug from a container positioned below the apparatus. The container has a bung opening formed in and facing upwardly from an upper surface thereof. The bung opening is configured to contain the bung plug therein. The apparatus includes a carrier selectively movable up and down relative to the container. The carrier includes a base plate having a central bore with (i) a conically-shaped inner surface and (ii) minimum and maximum inner diameters. A downwardly-biased, power-driven bung plug engagement tool is carried by the carrier and has a bung plug wrench at the lower end thereof. A downwardly-biased centering assembly is also carried by the carrier and has (i) a conically-shaped outer surface extending at least partially therearound closer to the upper end than the lower end thereof and (ii) a centering collar located proximate to the lower end thereof. The centering collar extends at least partially around the bung plug wrench and is concurrently moveable laterally and angularly therewith relative to the carrier and container. The conically-shaped outer surface of the centering assembly is shaped and sized to seat within the bore of the base plate and be moveable up and then down therein and relative to the base plate, carrier and container. The width or outer diameter of the centering assembly immediately below the conically-shaped outer surface is smaller than the minimum inner diameter of the bore of the base plate so that after the conically-shaped outer surface of the centering assembly moves up relative to the bore of the base plate, the centering assembly and bung plug wrench are concurrently movable laterally relative to the carrier and container.

In various embodiments, the present disclosure involves an apparatus for installing a bung plug in and/or extracting a bung plug from a container positioned below the apparatus. The container includes a bung opening formed in and facing upwardly from an upper surface thereof. The bung opening is configured to contain the bung plug therein. The apparatus include a carrier selectively movable up and down relative to the container. A power-driven bung plug engagement tool is carried by the carrier and includes (i) an elongated, vertically-oriented shaft having upper and lower ends and (ii) a bung plug wrench disposed at the lower end of the shaft and configured to engage the bung plug in the bung opening of the container during installation of the bung plug and/or disengage the bung plug from the bung opening during extraction of the bung plug. A centering collar is also carried by the carrier and at least partially encapsulates the bung plug wrench. At least two spaced-apart outer springs are positioned radially outwardly of the shaft, respectively, and provide downward biasing forces upon the centering collar and bung plug wrench relative to the carrier and container. At least two spaced-apart inner springs, separate and distinct from the outer springs, are also positioned radially outwardly of the shaft, respectively, and provide downward biasing forces upon the bung plug wrench relative to the centering collar, carrier and container.

The present disclosure includes embodiments of apparatus for installing a bung plug in and/or extracting a bung plug from a container positioned below the apparatus. The container has a bung opening formed in and facing upwardly from an upper surface thereof and an upwardly protruding bung opening lip extending at least partially around the bung opening. The bung opening lip has an outer diameter and the bung opening is configured to contain the bung plug therein. The apparatus includes a carrier selectively movable up and down relative to the container and including a base plate having a central bore with a conically-shaped inner surface. A downwardly-biased, power-driven bung plug engagement tool is carried by the carrier and includes a bung plug wrench proximate to the lower end thereof. A downwardly-biased centering collar is also carried by the carrier, has a lowermost edge and an inner diameter. The centering collar extends at least partially around the bung plug wrench and is concurrently moveable laterally and angularly therewith relative to the carrier and container. A downwardly-biased centering cone is coupled to the centering collar and has a conically-shaped outer surface extending at least partially around the perimeter thereof and which is shaped and sized to seat within the bore of the base plate and be moveable up and then down therein and relative to the base plate and the carrier. The conically-shaped outer surface of the centering cone is spaced upwardly from the lowermost edge of the centering collar no greater than twice the smaller of the outer diameter of the bung opening lip or inner diameter of the centering collar.

There are also embodiments herein of apparatus for installing a removable, threaded bung plug in a container positioned below the apparatus. The container has a vertical axis, an upper surface and a threaded bung opening formed in and facing upwardly from the upper surface. The vertical axis of the container extends through the center of the bung opening. The threads of the bung opening are perpendicular to the vertical axis of the container and configured to engage threads of the bung plug. The apparatus includes a carrier selectively movable up and down relative to the container. A downwardly-biased, power-driven, rotatable bung plug engagement tool is carried by the carrier and includes a bung plug wrench at the lower end thereof. The bung plug wrench is configured to threadably engage the bung plug in the bung opening of the container. A positionally self-adjusting, downwardly-biased centering assembly is also carried by the carrier and includes a centering collar located proximate to the lower end thereof. The centering collar extends at least partially around the bung plug wrench and is concurrently moveable laterally and angularly with the bung plug wrench relative to the carrier and container. As the carrier is moved down to the container, the centering assembly will automatically align the centering collar and bung plug wrench in the vertical axis of the container and perpendicular to the threads of the bung opening. At least one displacement sensor is coupled to the centering assembly and moveable concurrently therewith so that as the carrier is moved down to the container, the centering assembly will automatically position the displacement sensor(s) to accurately measure the amount of vertical movement of the bung plug in the bung opening during installation thereof.

In many embodiments, the present disclosure involves apparatus for installing a removable bung plug in a container positioned below the apparatus. The container has a bung opening formed in and facing upwardly from an upper surface thereof and an upwardly protruding bung opening lip extending at least partially around the bung opening. The bung opening is configured to contain the bung plug therein. The apparatus includes a carrier selectively movable up and down relative to the container. A downwardly-biased bung plug engagement tool is carried by the carrier and has a bung plug wrench at the lower end thereof. A downwardly-biased centering assembly is also carried by the carrier and includes a centering collar located proximate to the lower end thereof. The centering collar extends at least partially around the bung plug wrench and is positioned to sit down upon the bung opening lip during bung plug installation without directly abutting the upper surface of the container. At least one displacement sensor is rigidly coupled to the centering assembly so that as the carrier is moved down to the container, the displacement sensor(s) will be positioned to accurately measure the depth of the bung plug in the bung opening throughout installation thereof on a continuing basis in real time.

In some embodiments, the present disclosure includes apparatus for extracting a removable bung plug from a container positioned below the apparatus. The container has a bung opening formed in and facing upwardly from an upper surface thereof and an upwardly protruding bung opening lip extending at least partially around the bung opening. The bung opening is configured to contain the bung plug therein. The apparatus includes a carrier selectively movable up and down relative to the container. A downwardly-biased, power-driven bung plug engagement tool is carried by the carrier and includes (i) an elongated, vertically-oriented shaft having upper and lower ends and (ii) a bung plug wrench disposed at the lower end of the shaft. After the carrier is moved down to the container, the bung plug engagement tool is configured to engage and remove the bung plug from the container and thereafter carry the bung plug as the carrier is moved up away from the container. A bung plug engagement tool retractor is operatively coupled to the bung plug engagement tool. A downwardly-biased centering assembly is carried by the carrier includes a centering collar located proximate to the lower end thereof and extending at least partially around the bung plug wrench. After the bung plug engagement tool removes the bung plug from the container and before the carrier is moved up away from the container, the bung plug engagement tool retractor is configured to move the bung plug engagement tool and bung plug upwardly relative to the centering assembly, carrier and container and clear of the bung opening lip.

In various embodiments, apparatus for installing a threaded bung plug in a container positioned below the apparatus includes a carrier selectively movable up and down relative to the container. The carrier includes a base plate having a central bore with a conically-shaped inner surface. A power-driven bung plug engagement tool is carried by the carrier and includes a rotatable bung plug wrench at the lower end thereof. A centering assembly is carried by the carrier and includes a conically-shaped outer surface extending at least partially therearound closer to the upper end than the lower end thereof. The conically-shaped outer surface of the centering assembly is shaped and sized to seat within the bore of the base plate and is moveable up and then down therein and relative to the base plate, carrier and container. The centering assembly also includes a centering collar located proximate to the lower end thereof. The centering collar extends at least partially around the bung plug wrench and is concurrently moveable side-to-side and angularly therewith relative to the carrier and container. Whenever the conically-shaped outer surface of the centering assembly moves up relative to the bore of the base plate during bung plug installation, the centering assembly and bung plug wrench are concurrently movable side-to-side and angularly relative to the carrier and container. At least one automated torque sensor is operatively coupled to the bung plug wrench and configured to measure torque placed upon, and count the number of revolutions of rotation of, the bung plug during installation thereof in real time.

In some embodiments, apparatus for installing a threaded bung plug in a container positioned below the apparatus includes a carrier selectively movable up and down relative to the container. The carrier includes a base plate having a central bore with a conically-shaped inner surface. A power-driven bung plug engagement tool is carried by the carrier and includes a bung plug wrench. A centering collar is carried by the carrier and extends at least partially around the bung plug wrench. A centering cone has a conically-shaped outer surface extending at least partially around the perimeter thereof, is shaped and sized to seat within the bore of the base plate and moveable up and then down therein and relative to the base plate and the carrier. At least one displacement sensor is arranged to accurately measure the amount of vertical movement of the bung plug in the bung opening during installation thereof. At least one electronic controller is electronically coupled to the displacement sensor(s) to receive measurements taken thereby in real-time during installation of the bung plug and, based at least partially upon at least one such measurement, determines if the bung plug has been cross-threaded in the threaded bung opening and, if so, stops installation of the bung plug.

In many embodiments, apparatus for installing a removable, threaded bung plug in a container positioned below the apparatus and having a vertical axis, an upper surface and a threaded bung opening formed in and facing upwardly from the upper surface. The vertical axis of the container extends through the center of the bung opening. The threads of the bung opening are perpendicular to the vertical axis of the container and configured to engage threads of the bung plug. The apparatus includes a carrier selectively movable up and down relative to the container. A rotatable bung plug engagement tool is carried by the carrier and includes a bung plug wrench at the lower end thereof. The bung plug wrench is configured to threadably engage the bung plug in the bung opening of the container. A positionally self-adjusting centering assembly carried by the carrier has a centering collar located proximate to the lower end thereof. The centering collar extends at least partially around the bung plug wrench and is concurrently moveable side-to-side and angularly therewith relative to the carrier and container. As the carrier is moved down to the container, the centering assembly will automatically align the centering collar and bung plug wrench in the vertical axis of the container and perpendicular to the threads of the bung opening. At least one linear encoder is coupled to the centering assembly and moveable concurrently therewith, whereby as the carrier is moved down to the container, the centering assembly will automatically position the at least one linear encoder to accurately measure the amount of vertical movement of the bung plug in the bung opening during installation thereof.

In certain embodiments, apparatus for installing a removable bung plug in a container positioned below the apparatus includes a carrier selectively movable up and down relative to the container. A bung plug engagement tool is carried by the carrier and includes a bung plug wrench. A centering assembly is also carried by the carrier and includes a centering collar located proximate to the lower end thereof. The centering collar extends at least partially around the bung plug wrench and is positioned to at least partially sit down upon the bung opening lip during bung plug installation. At least one displacement sensor is configured to measure the depth of the bung plug in the bung opening during installation thereof. At least one torque sensor is operatively coupled to the bung plug wrench and configured to measure torque placed upon the bung plug as the bung plug wrench installs the bung plug in the bung opening and count the number of revolutions of rotation of the bung plug as it is installed in the container.

This disclosure includes apparatus for installing a bung plug in a drum positioned below the apparatus. The drum has a bung opening formed in and facing upwardly from an upper surface thereof. The bung opening is configured to contain the bung plug therein. The apparatus includes a carrier selectively movable up and down relative to the drum. A bung plug engagement tool carried by the carrier includes at least one shaft a bung plug wrench disposed proximate to the lower end of the shaft. A centering collar is also carried by the carrier and at least partially encapsulates the bung plug wrench. At least two spaced-apart outer biasing members are positioned radially outwardly of the shaft and provide downward biasing forces upon the centering collar and bung plug wrench relative to the carrier and drum. At least two spaced-apart inner biasing members, separate and distinct from the outer biasing members, are also positioned radially outwardly of the shaft and provide downward biasing forces upon the bung plug wrench relative to the centering collar, carrier and drum.

In many embodiments, apparatus for extracting a bung plug from a drum positioned below the apparatus can be used with a drum having a bung opening formed in and facing upwardly from an upper surface thereof. The bung opening is configured to contain the bung plug therein. The apparatus includes a carrier selectively movable up and down relative to the drum. A bung plug engagement tool is carried by the carrier and including at least one shaft having a bung plug wrench disposed proximate to the lower end thereof. A centering collar is also carried by the carrier and at least partially encapsulates the bung plug wrench. At least two spaced-apart outer biasing members are positioned radially outwardly of the shaft, respectively, and provide downward biasing forces upon the centering collar and bung plug wrench relative to the carrier and drum. At least two spaced-apart inner biasing members, separate and distinct from the outer biasing members, are also positioned radially outwardly of the shaft, and provide downward biasing forces upon the bung plug wrench relative to the centering collar, carrier and drum.

In many embodiments, the present disclosure involves apparatus for installing a removable, threaded bung plug in a container positioned below the apparatus. The container has a vertical axis, an upper surface and a threaded bung opening formed in and facing upwardly from the upper surface. The vertical axis of the container extends through the center of the bung opening, while the threads of the bung opening are perpendicular to the vertical axis of the container and configured to engage threads of the bung plug. The apparatus includes a carrier selectively movable up and down relative to the container. A bung plug engagement tool is carried by the carrier and includes a rotatable bung plug wrench. A positionally self-adjusting centering assembly is also carried by the carrier and includes centering collar located proximate to the lower end thereof. The centering collar extends at least partially around the bung plug wrench. At least one displacement sensor is arranged to measure the amount of vertical movement of the bung plug in the bung opening during installation thereof. At least one torque sensor is associated with the bung plug wrench and arranged to measure torque placed upon, and count the number of revolutions of rotation of, the bung plug during installation thereof.

The present disclosure includes embodiments of an automated system for removing a bung plug from a drum and installing a bung plug in the drum. The drum is movable on a conveyor to and from at least first and second stations associated with the system. The first and second stations may or may not be immediately adjacent to one other and there may be one or more intermediate stations between the first and second stations. The drum includes a bung opening formed in and facing upwardly from an upper surface thereof and an outer rim extending around the upper surface. The bung opening is configured to contain a removable bung plug therein. The center of the bung opening is spaced inwardly from the outer rim of the drum by a distance. The bung opening has an upwardly protruding lip extending therearound and a diameter measured between opposing sides of the lip.

The automated system of these embodiments includes an automated drum rotator and an automated, power-driven, up-and-down moving bung locator at the first station. The bung locator has at least first and second downwardly-facing bung location sensors spaced apart the same distance as the diameter of the bung opening. The bung locator also carries at least one downwardly-extending foot spaced outwardly relative to the bung location sensors and configured to rest upon the outer rim of the drum. The bung locator is configured to be lowered down over the drum until at least one foot thereof contacts the outer rim of the drum, whereby the positioning of at least one foot of the bung locator in contact with outer rim will position each of the bung location sensors radially inwardly of the outer rim the same distance as the distance between the outer rim and the center of the bung opening. As the drum is rotated below the bung locator, the bung location sensors will concurrently detect the presence of opposing sides of the lip of the bung opening thereunder, respectively.

The automated system of these embodiments also includes an automated, power-driven, downwardly-facing bung plug extractor at the first station. The bung plug extractor includes an automated, power-driven, bung plug wrench and a centering collar extending at least partially around the bung plug wrench. The bung plug extractor further includes at least two outer springs providing downward biasing forces upon the centering collar thereof and positioned radially outwardly of and above the centering collar. When there is a bung plug in the bung opening of the drum at the first station and the bung plug extractor is aligned with and lowered over the bung opening, the centering collar thereof will rest at least partially upon the lip of the bung opening and the bung plug wrench thereof will be positioned to engage and loosen the bung plug from the drum. If the bung plug extractor and bung opening are not aligned as the bung plug extractor is lowered, one or more of the outer springs of the bung plug extractor may deflect to allow the centering collar and bung plug wrench of the bung plug extractor to tilt relative to the drum to align the bung plug wrench over the bung plug and allow its engagement therewith.

The automated system of these embodiments also includes an automated, power-driven, downwardly-facing bung plug installer at the second station. The bung plug installer is distinct from the bung plug extractor and includes an automated, power-driven, bung plug wrench and a centering collar extending at least partially around the bung plug wrench. The bung plug installer further includes at least two outer springs providing downward biasing forces upon the centering collar thereof and positioned radially outwardly of and above the centering collar. When the bung plug installer is aligned and lowered over the bung opening of the drum, the centering collar thereof will rest at least partially upon the lip of the bung opening and the bung plug wrench thereof will be radially inwards thereof and selectively power-driven to install a bung plug in the bung opening. If the bung plug installer and bung opening are not aligned as the bung plug installer is lowered, one or more of the outer springs of the bung plug installer may deflect to allow the centering collar and bung plug wrench of the bung plug installer to tilt relative to the drum to align the bung plug wrench over the bung opening for installation of a bung plug therein.

If desired, the automated drum rotator may include front and rear wheeled carriages positioned on opposing sides of the conveyor at the first station. Each carriage may include at least a first automated, power-driven clamp arm, each clamp arm having at least one rotatable wheel mounted thereon. Each clamp arm may be independently selectively moveable inwardly relative to the conveyor and the drum positioned at the first station until at least one wheel thereof contacts the drum. At least one of the wheels of the front and/or rear wheeled carriages may be automated and power-driven to selectively rotate the drum. Each carriage may include automated outer and inner, independently moving, power-driven clamp arms, respectively. Each clamp arm may include at least two spaced-apart wheels thereon. Each wheel may be engageable with the drum. Some or all of the wheels of the front wheeled carriage may be power-driven to selectively rotate the drum.

If desired, the system may include a rotation platform positioned under the drum at the first station and selectively moveable up and down relative to the conveyor. The rotation platform can be lifted with the drum on it during rotation of the drum. The bung location sensors may be fiber optics sensors. At least one optic amplifier may be associated with the bung location sensors and configured to cause one or more light signals to project down through each bung location sensor onto the upper surface of the rotating drum, receive light signals reflected up off the upper surface the drum through the bung location sensors and determine when reflected light signals are concurrently received through both bung location sensors to indicate the bung location sensors are simultaneously positioned over respective opposing edges of the lip of the bung opening.

The bung locator may not engage or ride across the upper surface of the drum. The foot or feet of the bung locator may be rigidly coupled to the bung locator and not include any moving parts. The bung plug extractor and/or bung plug installer may include three outer springs evenly spaced-apart around the centering collar thereof and configured to allow the centering collar and bung plug wrench thereof to concurrently tilt in any direction around 360° relative to the drum. The bung plug extractor and/or installer may be configured to allow up to ¼" displacement of the centering collar and bung plug wrench thereof in any direction around 360° relative to the drum.

The system may include an electronic controller electronically coupled to the bung locator, bung plug extractor and bung plug installer and configured to automatically control the movement thereof, respectively. The bung locator may be configured to emit a series of reflective signals through the bung location sensors onto the upper surface of the drum, retrieve at least some of the reflective signals and communicate data relating thereto to the electronic controller. The system may include an air motor electronically coupled to the electronic controller and operatively coupled to the bung plug wrench of the bung plug extractor and configured to selectively rotate the bung plug wrench and bung plug to automatically loosen the bung plug from the drum. A servo-motor may be electronically coupled to the electronic controller and operatively coupled to the bung plug wrench of the bung plug installer and configured to selectively rotate the bung plug wrench and bung plug to automatically install the bung plug in the bung opening of the drum.

If desired, a vacuum source may be associated with the system. The bung plug wrench of the bung plug extractor and/or installer may include upper and lower ends and at least one vacuum space proximate to its lower end. The vacuum space of the bung plug wrench of the bung plug extractor may be fluidly coupled to the vacuum source to provide suction in the vacuum space so the bung plug wrench of the bung plug extractor can be used to effectively lift up the bung plug after it is removed from the drum and effectively carry it to a bung plug depository and selectively release suction in the vacuum space when the bung plug wrench and bung plug carried thereby are positioned over the bung plug depository. The vacuum space of the bung plug wrench of the bung plug installer may be fluidly coupled to the vacuum source to provide suction in the vacuum space of the bung plug installer so the bung plug wrench of the bung plug installer can be used to effectively lift a bung plug from the bung plug depository and effectively carry it to the bung opening of the drum and install it therein.

The present disclosure also includes embodiments of an automated system for installing a bung plug in a drum. The drum is movable on a conveyor into and through the system. The drum includes a bung opening formed in and facing upwardly from an upper surface thereof and an outer rim extending around the upper surface. The bung opening is configured to contain a releasable bung plug threadably engageable therein and the bung opening has an upwardly protruding lip extending therearound. The system includes an electronic controller and automated drum rotator electronically coupled to the electronic controller. The electronic controller controls use of the drum rotator to selectively rotate the drum in the system. An automated, power-driven, up-and-down moving bung locator is electronically coupled to the controller and carries at least one downwardly-facing bung location sensor. The bung locator includes at least one downwardly-extending foot spaced outwardly relative to the bung location sensor(s) and configured to rest at least partially upon the outer rim of the drum. The bung locator is configured to be lowered down over the drum until at least one foot thereof contacts the outer rim of the drum. As the drum is rotated below the bung locator, the bung location sensor(s) will detect the presence of the lip of the bung opening thereunder.

In these embodiments, an automated, power-driven, downwardly-facing bung plug installer is also electronically coupled to the electronic controller. The bung plug installer includes an automated, power-driven, bung plug wrench selectively rotatable to install a bung plug in the bung opening. An automated torque sensor is operatively coupled to the bung plug wrench of the bung plug installer and electronically coupled to the electronic controller. The torque sensor is configured to measure torque placed upon the bung plug as the bung plug wrench of the bung plug installer installs the bung plug in the bung opening in real-time as often as desired. An automated displacement sensor is coupled to the bung plug installer and electronically coupled to the electronic controller. The displacement sensor is configured to measure the amount of vertical movement of the bung plug in the bung opening during installation thereof. Based at least partially upon at least one measurement taken by the torque sensor and/or the displacement sensor, the electronic controller will stop the installation of the bung plug by the bung plug wrench of the bung plug installer and/or determine if the amount of torque applied to the bung plug meets, exceeds or falls below a desired torque value.

If desired, the displacement sensor may include at least one linear encoder. The bung plug installer may further include a servo-motor electronically coupled to the electronic controller and operatively coupled to the bung plug wrench of the bung plug installer and configured to selectively rotate the bung plug wrench and bung plug to install the bung plug in the bung opening of the drum. The automated torque sensor may include at least one encoder disposed within the servo-motor. The automated torque sensor may be configured to count the number of revolutions of rotation of the bung plug as it is installed in the drum.

In some embodiments, the present disclosure involves an automated method of removing a bung plug from a drum and installing a bung plug in the drum with the use of an automated drum manipulation system. The drum has a bung opening formed in and facing upwardly from its upper surface and an outer rim extending around the upper surface. The bung opening is configured to contain a bung plug therein. The center of the bung opening is spaced inwardly from the outer rim of the drum by a distance. The bung opening has an upwardly protruding lip extending therearound.

In these embodiments, after the drum with a bung plug in its bung opening arrives in the system, at least one automated, power-driven, clamp arm of a front and/or a rear wheeled carriage moves inwardly toward the drum until at least one wheel thereof contacts the drum. At least two automated, power-driven wheels of at least one of the carriages rotate the drum. An automated bung locator moves down to position at least one foot extending downwardly therefrom upon the outer rim of the drum to automatically position first and second downwardly-facing, spaced-apart bung location sensors carried by the bung locator radially inwardly of the outer rim of the drum the same approximate distance as the distance between the outer rim and the center of the bung opening. As the drum is rotated below the bung locator, the first and second bung location sensors automatically detect when opposing sides of the lip of the bung opening are concurrently positioned thereunder. The power-driven wheel(s) of the front and/or rear carriages automatically cease rotating the drum when or after the first and second bung location sensors detect opposing sides of the lip of the bung opening are concurrently positioned thereunder.

An automated downwardly-facing bung plug extractor moves down over the bung hole to position a centering collar thereof atop the lip of the bung opening and an automated, power-driven bung plug wrench of the bung plug extractor radially inwards of the lip. The bung plug wrench loosens the bung plug from the drum and the bung plug is removed from the drum. An automated downwardly-facing bung plug installer (separate and distinct from the bung plug extractor) moves down over the bung hole of the drum to position a centering collar thereof atop the lip of the bung opening and an automated, power-driven bung plug wrench of the bung plug installer radially inwards of the lip. The bung plug wrench of the bung plug installer installs a bung plug in the bung opening of the drum. If desired, during installation of the bung plug in the bung opening, an automated torque sensor operatively coupled to the bung plug wrench of the bung plug installer may measure torque placed upon the bung plug by the bung plug wrench of the bung plug installer during installation thereof in real-time. Based at least partially upon at least one measurement taken by the automated torque sensor, an electronic controller electronically coupled to the automated torque sensor may determine if the amount of torque applied to the bung plug meets, exceeds or falls below a desired torque value.

Accordingly, the present disclosure includes features and advantages which are believed to enable it to advance container manipulation technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 11 is a side view of the exemplary bung locator of FIG. 9;

FIG. 12 is a sectional view of the exemplary bung locator of FIG. 11 taken along lines FIG. 12-FIG. 12;

FIG. 24 is a side view of the exemplary bung plug extractor of FIG. 22;

FIG. 25 is a cross-sectional view of the exemplary bung plug extractor of FIG. 24 taken along lines FIG. 25-FIG. 25;

FIG. 32 is an exploded view of the exemplary bung plug extractor components shown in FIG. 30;

FIG. 33 is a perspective view of the vacuum fitting of the exemplary bung plug extractor of FIG. 17A in accordance with one or more embodiments of the present disclosure;

FIG. 42 is a top view of the exemplary bung plug installer of FIG. 41;

FIG. 43 is a side view of the exemplary bung plug installer of FIG. 41;

FIG. 44 is a cross-sectional view of the exemplary bung plug installer of FIG. 43 taken along lines FIG. 44-FIG. 44;

DETAILED DESCRIPTION OF PRESENTLY PREFERRED EMBODIMENTS

Figure 1A:
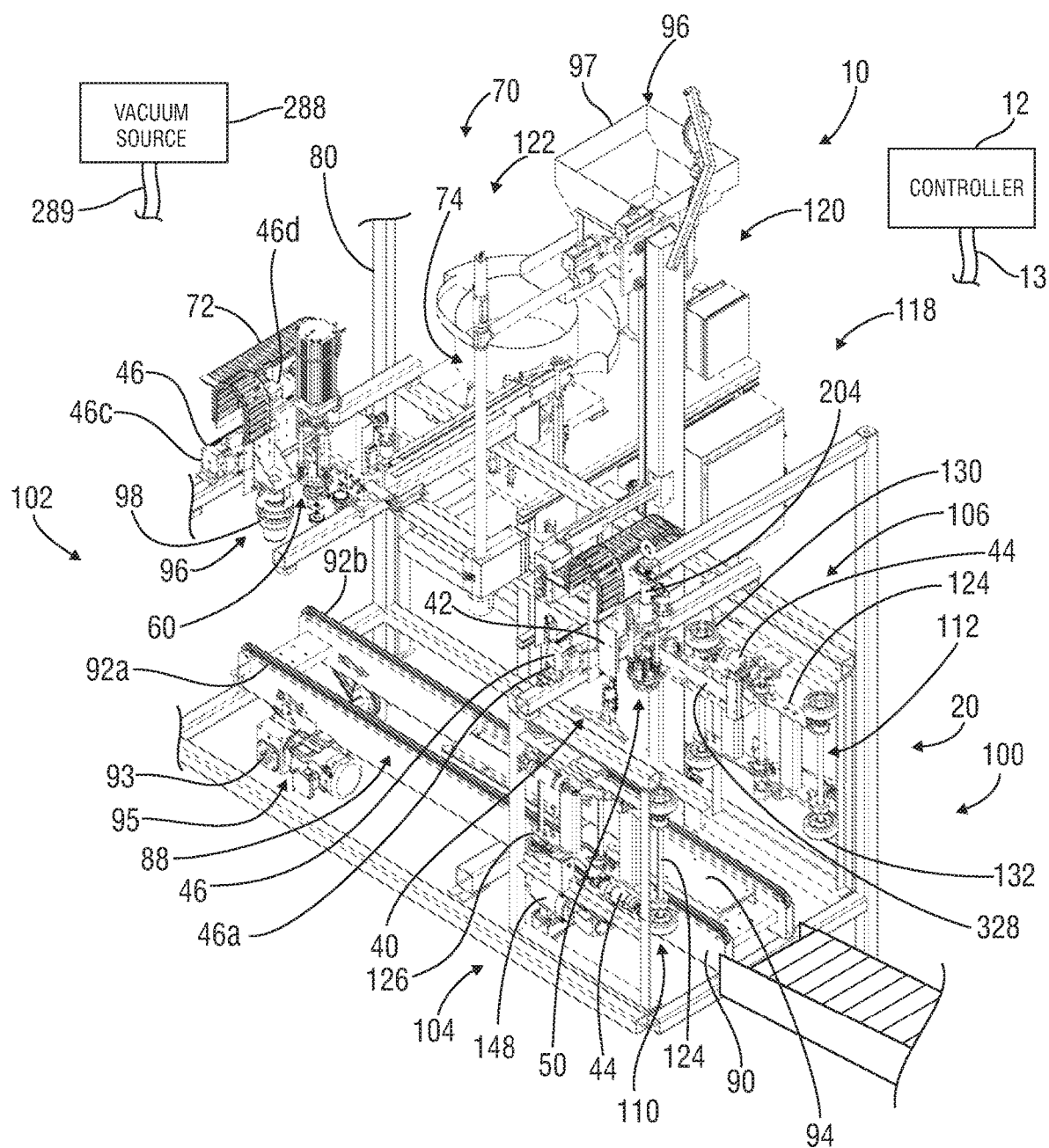
FIG. 1A is a perspective view of an embodiment of a drum manipulation system shown with an exemplary drum filling system in accordance with the present disclosure.

Characteristics and advantages of the present disclosure and additional features and benefits will be readily apparent to those skilled in the art upon consideration of the following detailed description of exemplary embodiments and/or referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of this disclosure and appended claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent (including the claims), the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. The use of a particular or known term of art as the name of a component herein is not intended to limit that component to only the known or defined meaning of such term (e.g. bar, rod, cover, panel, spring, plate, bolt). Further, this document does not intend to distinguish between components that differ in name but not function. Also, the terms "including" and "comprising" are used herein and in the appended claims in an open-ended fashion, and thus should be interpreted to mean "including, but not limited to . . . ". Further, reference herein and in the appended claims to components, feature, actions, aspects etc. in a singular tense does not limit the present disclosure or appended claims to only one such component or aspect, but should be interpreted to mean one or more, except and only to the extent as may be expressly limited to one in a particular claim hereof and only for such claim(s) and any claim(s) depending therefrom As used herein and in the appended claims, the following terms have the following meanings, except and only to the extent as may be expressly specified differently in a particular claim hereof and only for such claim(s) and any claim(s) depending therefrom:

The term "and/or" as used herein provides for three distinct possibilities: one, the other or both. All three possibilities do not need to be available-only any one of the three. For example, if a component is described as "having a collar and/or a coupling", some embodiments may include a collar, some embodiments may include a coupling and some embodiments may include both. Since the use of "and/or" herein does not require all three possibilities, a claim limitation herein that recites "having a collar and/or a coupling" would be literally infringed by a device including only one or more collars, one or more couplings or both one or more couplings and one or more collars.

The terms "automated" and variations thereof as used herein mean capable of operating or performing one or more tasks without human intervention. One example of automation is with the use of one or more electronic devices.

The terms "bung opening" and variations thereof as used herein mean and include a fill hole or orifice formed in a drum or other container (e.g. in the top of thereof and facing generally upwardly) useful for filling the drum or other container with desired contents and often surrounded by a flange or other closure attachment (e.g. with receiving threads) for receiving a bung plug.

The terms "bung plug" and variations thereof as used herein mean and include one or more caps, covers, closures or plugs releasably engageable with a bung opening, such as by threadable engagement, other mateable engagement, snapping engagement or any other type of releasable engagement and constructed of any suitable material(s) (e.g. steel, plastic, composite, wood, etc.).

The terms "coupled", "connected" and the like, and variations thereof, as used herein mean either an indirect or direct connection or engagement, except and only to the extent as may be expressly recited and explicitly required in a particular claim hereof and only for such claim(s) and any claim(s) depending therefrom. Thus, if a first device couples to a second device, that connection may be through a direct connection, or through an indirect connection via other devices and connections (except and only to the extent as may be expressly recited and explicitly required in a particular claim hereof and only for such claim(s) and any claim(s) depending therefrom).

The terms "electronically coupled" and variations thereof as used herein mean in electronic communication, whether by physical connection (e.g. cable, wiring, bus-bar, switch, etc.), non-physical communication (e.g. wireless, such as Wi-Fi, LAN, other), a combination thereof or both, or otherwise.

The terms "deflect" and variations thereof as used herein mean bend, twist, stretch, compress, expand, deform and the like, such as the action of a typical spring.

The terms "drum" and variations thereof as used herein mean and include fifty-five (or more or less) gallon drums, pails, barrels or any other form of container having a bung opening formed therein (e.g. in the top thereof) and constructed of any suitable material(s) (e.g. steel, plastic, woods, etc.).

The terms "drum manipulation operation", "drum manipulation activity" and variations thereof as used herein mean and include any one or more activities that relate to manipulating a drum such as, without limitation, activities associated with rotating a drum, selectively locating and positioning a bung opening (or bung plug therein) of a drum, removing and/or installing a bung plug in the bung opening of a drum or a combination thereof.

The terms "elongated" and variations thereof as used herein mean, include and refer to an item having an overall length (during the intended use of the item) that is greater than its average width.

The terms "generally", "substantially" and variations thereof as used herein mean and include (i) completely, or 100%, of the referenced parameter, variable, value, event etc. and (ii) a range of values less than 100% based upon the typical, normal or expected degree of variation or error for the referenced parameter, variable, value, event, etc. in the context of the particular embodiment or use thereof, such as, for example, 90-100%, 95-100% or 98-100%.

The terms "operator" and variations thereof as used herein mean and include one or more humans, robots or robotic components, artificial intelligence-driven components/circuitry, other components and the like.

Any component identified as a "plate" herein includes, but is not limited to, a plate as that term is commonly understood (e.g. a thin, flat sheet or strip of metal or other material, typically used to join or strengthen things or forming part of a machine), and may have non-planar surfaces or construction, may not be thin per se, may have any other form suitable for use in the particular configuration in which it is used (e.g. may be a curved or curvilinear-shaped member, housing, cone, sleeve, flange, collar, etc.) may be comprised of multiple parts or a combination thereof.

The terms "power-driven", "power-operated" and variations thereof as used herein mean driven or operated by one or more motors, engines, electronic devices or the like to perform one or more subject tasks or activities without manual effort by a human operator to perform the subject tasks or activities.

The terms "rigidly coupled" and variations thereof as used herein mean connected together in a manner that is intended not to allow any, or more than an insubstantial or minimal amount of, relative movement therebetween during typical or expected operations. In other words, if components A and B are rigidly coupled together, they are not movable relative to one another (more than a minimal or insubstantial amount) during typical or expected operations.

As used herein, when a component is "spring-biased", the component is arranged to be pressed in one general direction by one or more springs and/or other mechanisms, and can be moved back (in the opposite general direction) upon the application of force(s) to the component sufficient to overcome the pressing forces of the spring(s) and/or other mechanism(s). Spring(s) and/or other mechanisms mentioned herein may be referred to as "biasing" the associated component(s) or providing "biasing force(s)" upon or to the associated component(s). The use of the terms "spring-biased", "biasing", "biasing force(s)" and variations thereof herein and in the appended claims does not require the use of one or more actual springs to provide the biasing force(s); any desired or suitable mechanism or arrangement of parts may be used, except and only to the extent as may be expressly recited and explicitly required in a particular claim hereof and only for such claim(s) and any claim(s) depending therefrom.

The terms "spring" and variations thereof as used herein mean and include one or more resilient members (e.g. compression or torsion springs, coil springs, helical springs, Bellville-washers, leaf springs, disc springs) or non-resilient members capable of providing biasing forces upon one or more other members or components. Thus the "spring" may be a spring (in its literal sense) or any other component or combination of components configured to spring-bias one or more other members or components.

The terms "swivel", "swiveling", "swiveling movement", "relative angular movement" and variations thereof as used herein mean moveable around 360° relative to a vertical axis.

The terms "upright", "vertical", "vertically-oriented" and variations thereof as used herein mean and include oriented perfectly or substantially vertically, angularly relative to a vertical axis or non-horizontally.

It should be noted that any of the above terms may be further explained, defined, expanded or limited below or in other sections of this patent. Further, the above list of terms is not all inclusive and other terms may be defined or explained below or in other sections of this patent.

Figure 1B:
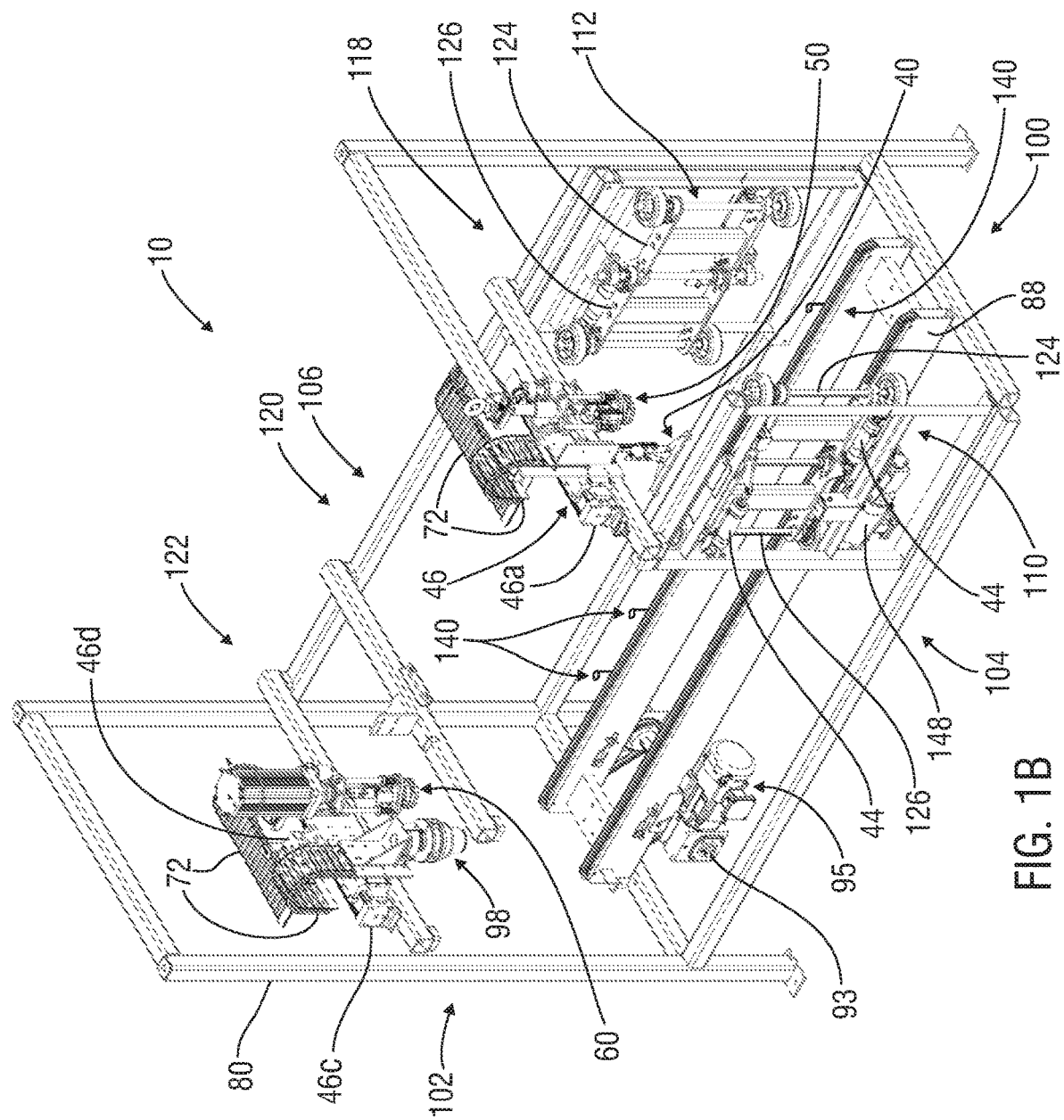
FIG. 1B is a perspective view of various exemplary components of the drum manipulation system of FIG. 1A.
Figure 1C:
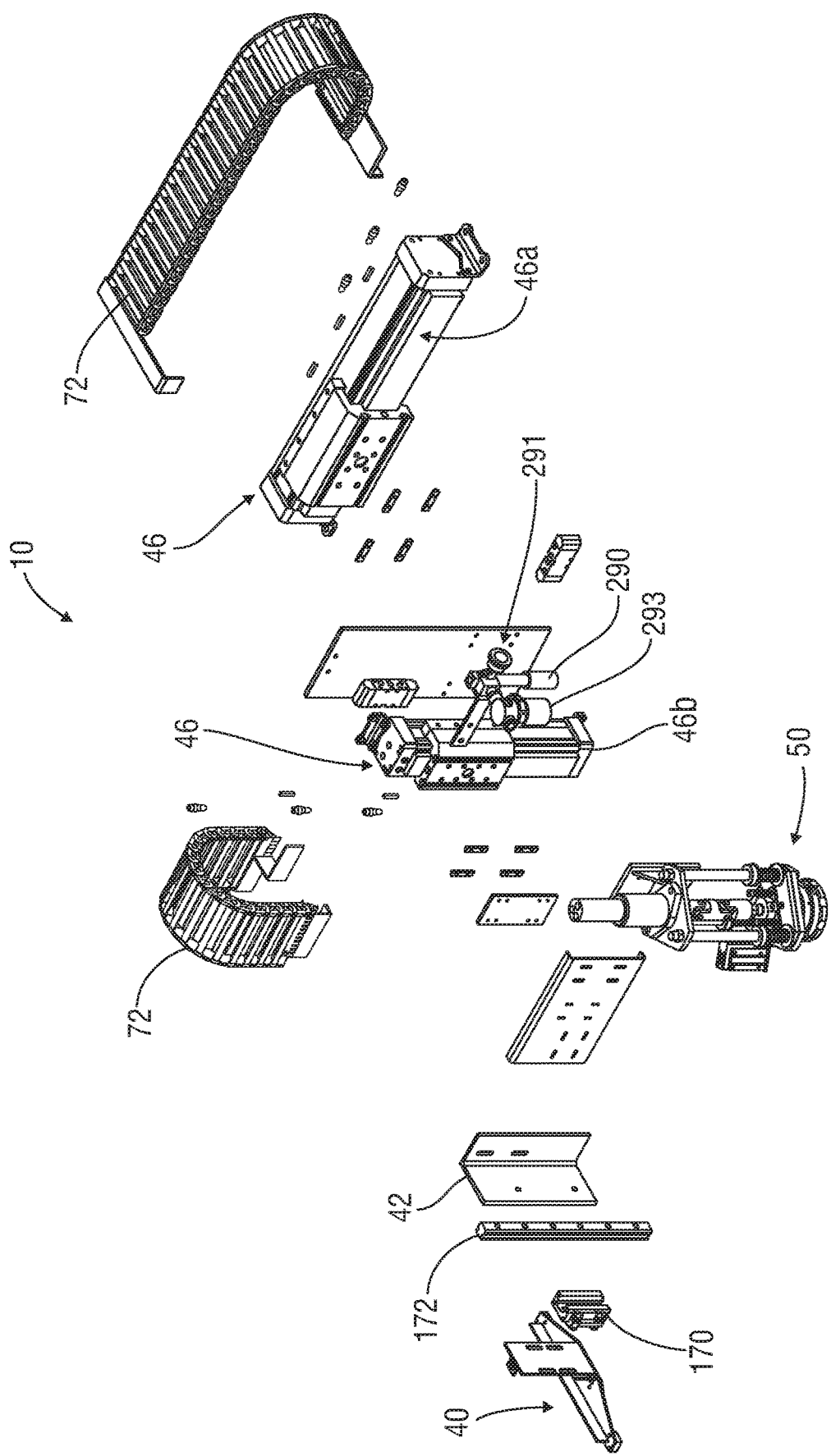
FIG. 1C is an exploded view of various exemplary components of the drum manipulation system of FIG. 1A including the bung locator and bung plug extractor in accordance with one or more embodiments of the present disclosure.
Figure 2:
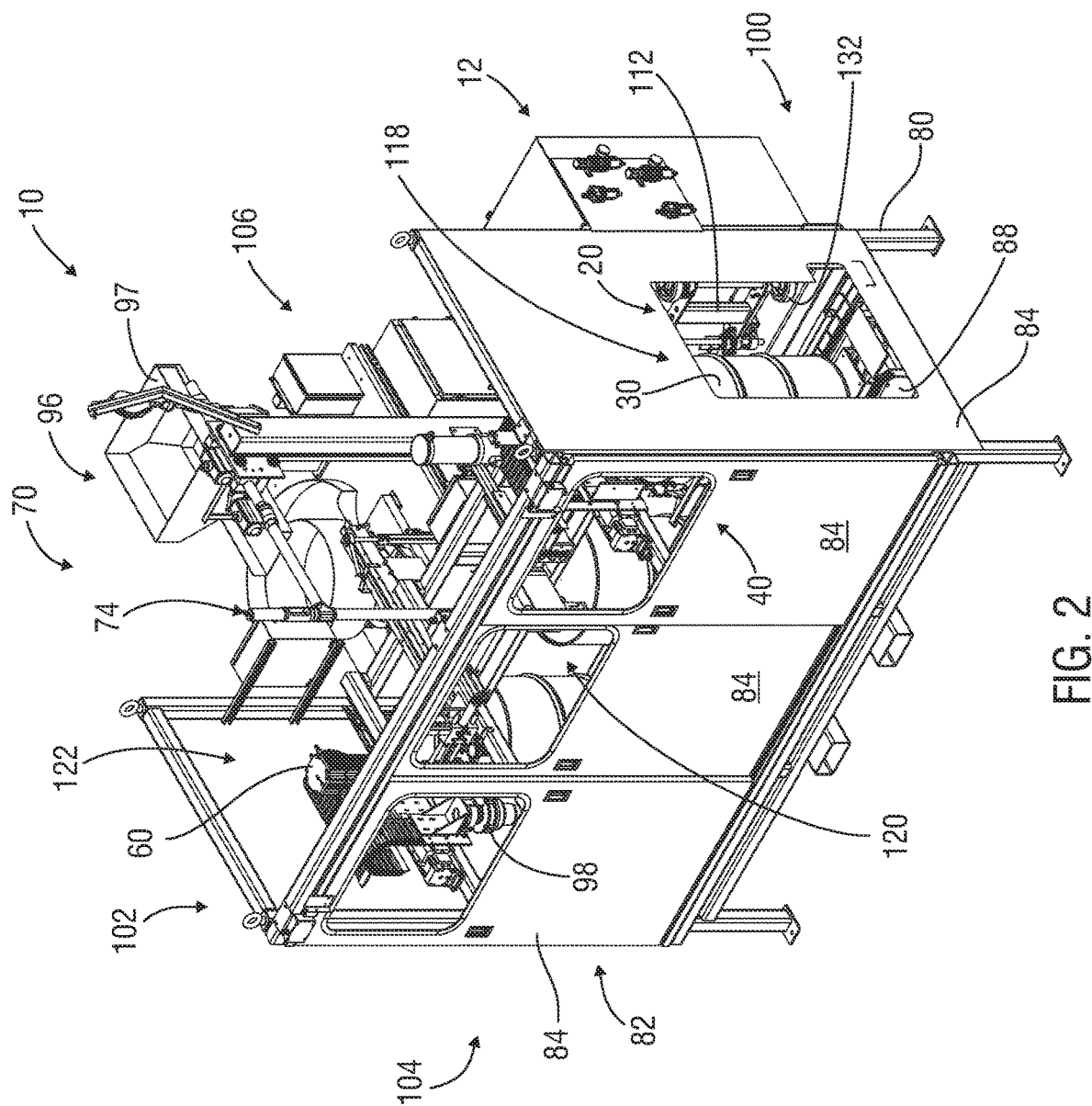
FIG. 2 is a perspective view of the exemplary drum manipulation system and drum filling system of FIG. 1A along with an exemplary framework and enclosure in accordance with one or more embodiments of the present disclosure.
Figure 4:
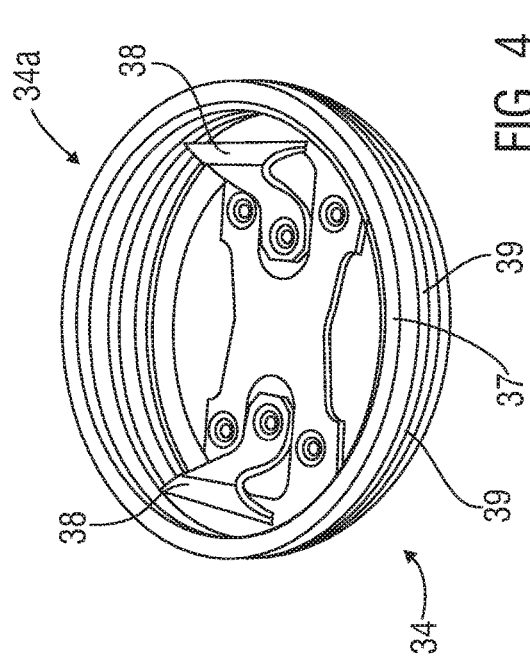
FIG. 4 is a perspective view of an exemplary metallic bung plug.
Figure 5:
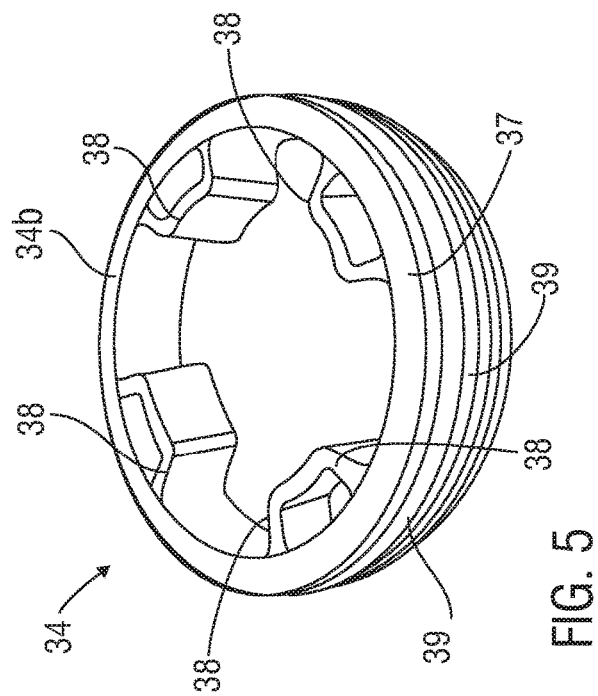
FIG. 5 is a perspective view of an exemplary plastic bung plug.
Figure 3:
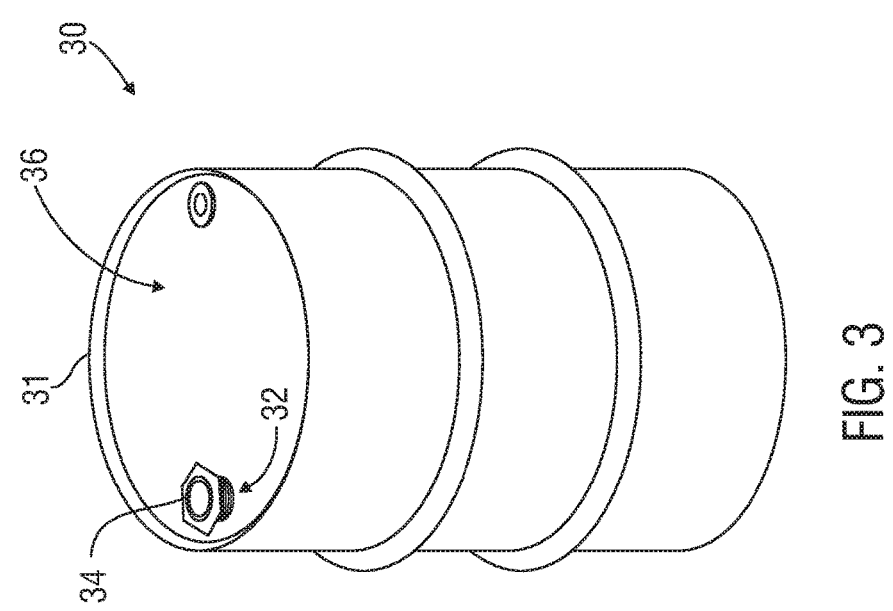
FIG. 3 is a perspective view of an exemplary steel drum.

Referring initially to FIGS. 1A-2, an embodiment of a drum manipulation system 10 of the present disclosure is shown. It should be noted at the outset that FIG. 1B is the same as FIG. 1A but with some of the subject matter of FIG. 1A removed to provide clarity to the remaining components. Thus, when reference is made herein to FIG. 1A, the reader is invited to also refer to FIG. 1B. The illustrated drum 30 (e.g. FIG. 3) is a steel drum, but the drum manipulation system 10 can be used with drums constructed of polyethylene, or other forms of thermoplastic or plastic material, or of any other material(s). The illustrated exemplary drum manipulation system 10 includes at least one drum rotator 20 useful to rotate a drum 30 to a desired position, at least one bung locator 40 useful to locate (e.g. and selectively position) at least one bung opening 32 of the drum 30 and/or a bung plug 34 therein (see e.g. FIGS. 3-5), at least one bung plug extractor 50 useful to remove a bung plug 34 engaged in the bung opening 32 and at least one bung plug installer 60 useful to install a bung plug 34 in the bung opening 32. However, other embodiments of the drum manipulation system 10 may include any combination of one or more such components and/or any of those components may be combined. For example, some embodiments may not include any one or more of the drum rotator(s) 20, bung locator(s) 40, bung plug extractor(s) 50 or bung plug installer(s) 60. For other examples, some embodiments may include a combined bung locator 40/bung plug extractor 50, bung plug extractor 50/bung plug installer 60, etc.

Referring still to FIGS. 1A-2, the exemplary drum manipulation system 10 is shown being used with, or as part of, an exemplary overall drum filling system 70. The illustrated drum filling system 70 is automated and includes at least one drum filler 74 useful for filling the drums 30 with desired material (e.g. liquid). At least one exemplary drum conveyor 88 is useful to generally carry the drums 30 into and through the drum manipulation system 10 and drum filling system 70. One or more exemplary dust cap, or cap seal, systems 96 may be used with or incorporated into the drum manipulation system 10 or drum filling system 70, such as to affix a dust cap over the bung plug 34 after it is installed in the drum 30. The illustrated drum manipulation system 10 and drum filling system 70 are shown at least partially supported and/or surrounded by a framework 80. Cables and wiring for various components of the drum manipulation system 10 and drum filling system 70 are shown at least partially contained in cable carriers 72.

The drum filling system 70, drum filler 74, framework 80, drum conveyor 88 and dust cap system 96 may have any suitable form, construction, components, configuration and operation and are in no way limiting upon the present disclosure or appended claims, except and only to the extent as may be expressly recited and explicitly required in a particular claim hereof and only for such claim(s) and any claim(s) depending therefrom. For example, the drum filler 74 may include the system disclosed in U.S. Pat. No. 6,543,494 issued on Apr. 8, 2003 to Bellin et al. and entitled "Apparatus & Method for Filling Liquid Containers", the entire contents of which are hereby incorporated by reference herein in its entirety, any version of liquid lance filler (e.g. model DF 5510 single drum filler) offered by the Assignee hereof or any other type of filler. For other examples, the framework 80 may support various components of the drum manipulation system 10 and drum filling system 70 and/or an enclosure 82 having one or more panels 84 (e.g. stainless steel doors with glass) for providing protection, shielding various components of the drum manipulation system 10 and/or drum filling system 70, allowing selective operator access, any other desired purpose(s) or a combination thereof. For yet a further example, the illustrated drum conveyor 88 may automatically move the drums 30 through the drum manipulation system 10 and drum filling system 70 and may include one or more chain conveyors 90 (e.g. with chains 92a, 92b) configured to convey the drums 30 to, between and from one or more positions, or stations, of the drum filling system 70 and/or drum manipulation system 10. For still another example, the dust cap system 96 may include a vibratory dust cap feeder 97 and cap seal crimping tool 98 or similar components.

Still referring to FIGS. 1A-2, in the preferred embodiment, the drum manipulation system 10 (and drum filling system 70) includes three successive linearly-aligned stations 118, 120, 122 along the path of the drum conveyor 88. A first exemplary (e.g. bung plug removal) station 118 is closest to the entrance end 100 of the drum manipulation system 10 and drum filling system 70, followed by a second (e.g. filling) station 120, which is followed by a third (e.g. bung plug installation) station 122 closest to the exit end 102 of the drum manipulation system 10 and drum filling system 70. The exemplary stations 118, 120, 122 may be spaced apart as desired. For certain types of drums 30 (e.g. steel 55 gallon drums), for example, the position of a drum 30 at each station may be spaced approximately or exactly 40" apart, but could be spaced closer or farther apart or unevenly spaced apart as desired. Further, some embodiments may include only one or two, or more than three, stations (e.g. four, five, six, etc.) and any desired activities may occur at each station. In the preferred embodiment, one or more sensors 93 (e.g. radial encoders, linear encoders) are associated with the drum conveyor 88 to determine when the drum conveyor 88 has moved the desired distance (e.g. 40") to/from each station 118, 120, 122 and assist in causing the drum conveyor 88 to stop, such as via an electric VFD motor 95 or other component(s).

It should be understood that the drum filling system 70 may have more or fewer components than those illustrated and described herein. Additionally, the drum manipulation system 10 of the present disclosure may be used as part of or associated with any other systems, components or apparatus (other than the drum filling system 70) where it is desirable or necessary to rotate a drum 30, locate or position a bung opening 32 or bung plug 34 of a drum 30, remove or replace a bung plug 34 from a drum 30, or a combination thereof. For example, the drum manipulation system 10 may be used with equipment configured or used for manufacturing, assembling, cleaning, retrofitting, testing, measuring, filling or emptying drums 30, or may be used alone. Thus the environment, overall system and application with which the drum manipulation system 10 of the present disclosure may be used (including the nature, type, construction, configuration and components of the drum 34), and the details thereof as provided herein or shown in the appended drawings, are in no way limiting upon the present disclosure or appended claims, except and only to the extent as may be expressly recited and explicitly required in a particular claim hereof and only for such claim(s) and any claim(s) depending therefrom.

Still referring to FIGS. 1A-2, in some embodiments, the drum manipulation system 10 of the present disclosure may be fully, or nearly-fully, automated to perform the desired drum manipulation operations with minimal or no human intervention. For example, the drum manipulation system 10 may be configured to automatically process a continuing supply of drums 30 with minimal or no human involvement during rotation of each drum 30 to position the bung opening 32 as desired, removal of the bung plug 34 therefrom and installation of a bung plug 34 back in the bung opening 32 (e.g. after filling the drum 30 and/or other activities). If desired, the drum manipulation system 10 may allow other activities to be automatically performed, such as placement and engagement (e.g. crimping via crimping tool 98) of a dust cap over the bung plug 34. Absent the occurrence of any fault events, the exemplary drum manipulation system 10 may be configured to run continuously as long as drums 30 are provided on the drum conveyor 88 at the entrance end 100 of the drum manipulation system 10 and removed from the drum conveyor 88 (or directed otherwise) at the exit end 102. It should be noted that, in various instances, some human involvement may be necessary, such as, for example, to load dust caps into the dust cap system 96, to perform other tasks or a combination thereof. Further, human involvement may be necessary in response to the occurrence of any, or, certain fault events (e.g. which may stop the operation of the drum manipulation system 10).

Minimal, limited or no human involvement in the operation of various embodiments of the drum manipulation system 10 during drum manipulation operations may provide one or more benefits, such as reducing manpower requirements and the time and expenses associated therewith, reducing the potential for on-site safety issues, improving the efficiency and effectiveness of drum manipulation operations and processing of drums, etc. Many embodiments of the drum manipulation system 10 could be used to automatically and continuously process a large quantity of drums 30 (e.g. without any or minimal need for on-site personnel), saving extensive time and cost and improving efficiency and capacity, as compared to prior systems and techniques. For example, when the preferred embodiment of the drum manipulation system 10 is used as part of a drum filling system 70 used for filling 55 gallon drums 30 with low viscosity fluid (e.g. water), the drum manipulation system 10 could process approximately one or more drums per minute indefinitely. Other embodiments or applications of the drum manipulation system 10 could process drums 30 at a quicker rate.

Still referring to FIGS. 1A-2, to provide the desired automation of the drum manipulation system 10, any suitable configuration, combination and type of components may be used. For example, all, or some, of the components of the drum manipulation system 10 may be electronically controlled (and thus automated) with the use of one or more electronic (e.g. PLC) controllers 12 electronically coupled thereto (e.g. via cable 13, wireless communication, or in any other manner). In some embodiments, the controller 12 includes at least one personal computer having computer software (e.g. operating system(s), application software, etc.), one or more processors (e.g. microprocessors, CPU), circuitry, screens/displays, etc. In the preferred embodiment, all of the drum manipulation operations of the drum manipulation system 10 may be automatically controlled and/or performed via one or more central controllers 12 without any or minimal human involvement (except as may be specified otherwise herein).

In many applications, particular variables and/or parameters affecting the operation or actions of one or more of the components of the drum manipulation system 10 may need to be set, or introduced, by one or more operators before or during operation of the drum manipulation system 10. For example, certain data may need to be provided into the controller 12 before the start of drum manipulations operations, such as information relating to the type of bung plug 34, drum 30 and/or material to be inserted in the drum 30 and the filling of the drum 30. For another example, in some embodiments, an operator can select (via the controller 12) the desired torque to be applied to the bung plug 34 during installation based upon the type of bung plug 34, type of seal on the bung plug 34 (e.g. Teflon, rubber, Viton) or other variable.

In some scenarios, the controller 12 or drum manipulation system 10 may be configured to measure or determine certain variables/parameters or automatically set, or introduce, them without human involvement. In various embodiments, one or more operators may be able to remotely supervise, monitor and control operation of the drum manipulation system 10 and/or adjust one or more variables/parameters affecting the operation of one or more components of the drum manipulation system 10 through the electronic controller 12 and/or other components. If desired, one or more cameras may be used to assist in off-site monitoring. However, in various embodiments, only some of the drum manipulation operations performed by the drum manipulation system 10 may be automated or the entire system may not be automated.

Still referring to FIGS. 1A-2, the arrival of the drum 30 at the exemplary first station 118 may be accomplished in any suitable manner. For example, as the drum 30 is transported to the entrance end 100 of the drum manipulation system 10 (and/or drum filling system 70) on the drum conveyor 88, one or more sensors 93 may be configured to detect the arrival of the drum 30 at the particular position along the length of the drum conveyor 88 that represents the first station 118 and cause the drum conveyor 88 to stop or otherwise deposit the drum 30 at that location. In the preferred embodiment, upon detection of the drum 30 at the desired position, one or more sensors 93 signal the electronic controller 12, which signals the drum conveyor 88 to stop moving. If desired, the drum manipulation system 10 may include one or more other sensors 140 (e.g. photo-eye sensors) to confirm (e.g. to the controller 12) that the drum 30 is at the desired location (e.g. after the drum conveyor 88 stops). This exemplary configuration and operation of parts (e.g. sensor(s) 93, 140) may, if desired, be duplicated and/or used similarly for moving the drum 30 to other locations (e.g. the second station 120, the third station 122, etc.). However, in some embodiments, the sensor(s) 93 may directly cause the drum conveyor 88 to stop, or any other components may be used to stop the drum conveyor 88 and/or determine when the drum 30 has arrived at a desired location.

Referring still to FIGS. 1A-2, the drum rotator 20 may have any suitable form, configuration, operation and benefits. For example, the drum rotator 20 may be configured to provide improved control in the rotation of the drum 30 as compared to other known systems. Better control in the rotation of the drum 30 may save time in the processing of the drums 30, allow for more effective and accurate positioning of the bung opening 32 (e.g. FIG. 3), automation (without human involvement) of bung opening 32 positioning or bung plug 34 removal or installation operations, provide other advantages or a combination thereof.

In the preferred embodiment, the drum rotator 20 includes front and rear wheeled carriages 110, 112 typically positioned on the front and rear sides 104, 106 of the drum manipulation system 10 (on opposing sides of the drum conveyor 88) and capable of selectively engaging each drum 30 that arrives at the first station 118. For example, the front wheeled carriage 110 may have one or more "home" positions closest to the front side 104 of the drum manipulation system 10 and the rear wheeled carriage 112 may have one or more "home" positions closest to the rear side 106 of the drum manipulation system 10. At least one of the exemplary front and rear wheeled carriages 110, 112 is configured to selectively rotate the drum 30 (e.g. in both directions) to position the bung opening 32 as desired for removal of the bung plug 34 therefrom, filling the drum 30, installing a bung plug 34, any other desired purpose(s) or a combination thereof.

Figure 6:
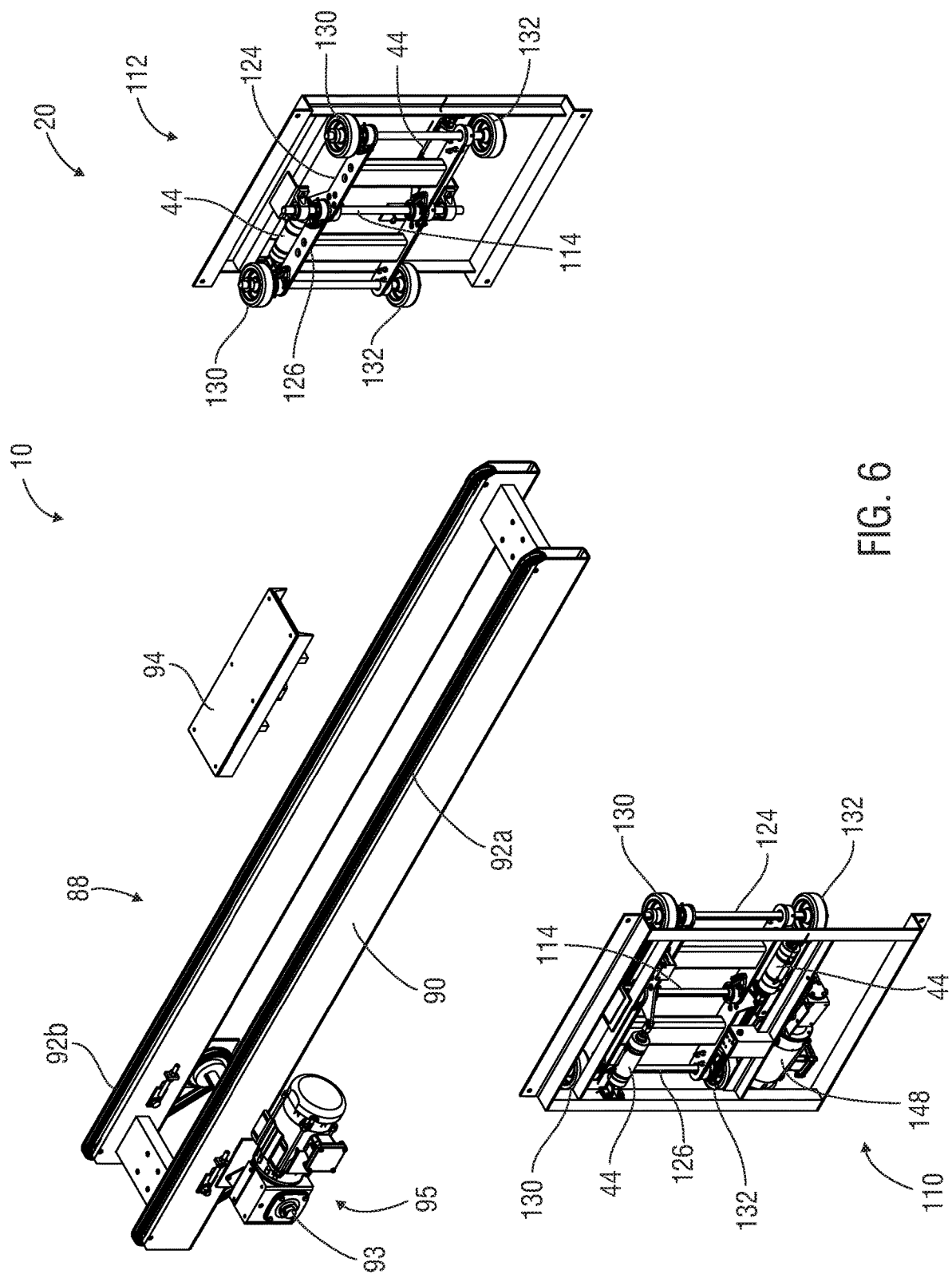
FIG. 6 is an exploded view of various components of the exemplary drum manipulation system of FIG. 1A including the exemplary drum rotator in accordance with one or more embodiments of the present disclosure.

The wheeled carriages 110, 112 may have any suitable form, construction, configuration and operation. Referring particularly to FIG. 6, for example, each carriage 110, 112 may include first (outer) and second (inner) upright clamp arms 124, 126, each having at least one upper wheel 130 and at least one lower wheel 132, respectively. While components 130, 132 are called "wheels" herein and the exemplary embodiments show them as actual wheels in the literal sense, the term "wheel" as used herein encompasses any suitable component(s) useful for engaging and rotating or allowing rotation of the drum 30, such as a gripper, roller, rotator or similar component. In the preferred embodiment, each clamp arm 124, 126 is selectively independently movable inwardly and outwardly relative to the drum 30 at the first station 118 between at least first and second positions. In at least one first (home) position, the respective illustrated clamp arm 124, 126 will be out of the path of any drums 30 on the drum conveyor 88. In a least one second (engaged) position, one of more of the wheels 130, 132 of the respective illustrated clamp arm 124, 126 should contact (engage) the drum 30 at the first station 118.

The exemplary clamp arms 124, 126 may be movable between positions in any suitable manner. For example, each respective pair of illustrated clamp arms 124, 126 is selectively pivotable within a desired arc around and relative to a pivot pin, or rod, 114 or other component(s) between positions. Preferably, a distinct, selectively controllable driver 44 (e.g. pneumatic or hydraulic cylinder) is configured to be selectively actuated, such as by signal from the controller 12, to pivot a corresponding clamp arm 124, 126 between positions within a desired range of motion.

However, any other arrangement of components and techniques may be used to rotate the drum 30. For example, each clamp arm 124, 126 may have only one, or more than two (e.g. three, four, five, etc.), wheels 130, 132 and/or may be moveable in another manner (e.g. linearly) between positions. Moreover, each carriage 110, 112 may include only one, or more than two (e.g. three, four, five, etc.) clamp arms 124, 126 or may not include any clamp arms 124, 126. Thus, the details of the construction and operation of the carriages 110, 112 and clamp arms 124, 126 are in no way limiting upon the present disclosure or appended claims, except and only to the extent as may be expressly recited and explicitly required in a particular claim hereof and only for such claim(s) and any claim(s) depending therefrom.

Referring again to FIGS. 1A-2, in some embodiments, before, at or after the arrival of a drum 30 at the first station 118, the inner clamp arm 126 of at least one of the wheeled carriages 110, 112 may be initially moved inwardly relative to or over the drum conveyor 88 until one or more of the wheels 130, 132 thereon engages the drum 30 at the first station 118. For example, the inner clamp arm 126 of both wheeled carriages 110, 112 may initially be pivoted inwardly into an engaged position as the drum 30 moves toward them from the entrance end 100 of the drum manipulation system 10 on the drum conveyor 88 and stops upon contacting one or more (e.g. all four) of the wheels 130, 132 thereon. Thus, in such embodiments, the stopping of the drum conveyor 88 to stop movement of the drum 30 at the first station 118 may be generally synchronized, or concurrent, with the drum 30 contacting the wheels 130, 132 of the inner clamp arms 126. However, in other embodiments, any desired number of wheels 130, 132 of only one inner clamp arm 126 or one or both outer clamp arms 124, 126 may initially engage the drum 30, or any other combination of wheels 130, 132 of clamp arms 124 and/or 126 or sequence may be used.

In the preferred embodiment, after the wheels 130, 132 of the inner clamp arms 126 engage the drum 30 and the drum 30 stops moving on the drum conveyor 88, an exemplary rotation platform 94 is raised up to support the drum 30 and lift it off the drum conveyor 88. When included, the rotation platform 94 may have any suitable form, configuration and operation. For example, the rotation platform 94 may be used to support the drum 30 (off the drum conveyor 88) while the drum 30 is rotated, include a non-metallic plate (e.g. plastic) to avoid causing sparks during rotation of the drums 30, avoid causing wear to the drum conveyor 88 (e.g. chains 92a, 92b) during rotation of the drum 30, avoid the production of metal shavings due to metal-on-metal friction during rotation of the drum 30, for any other purpose(s) or a combination thereof. In other embodiments, a different mechanism may be used to lift the drum 30 or the drum 30 may not be lifted.

Still referring to FIGS. 1A-2, in the preferred embodiment, after the drum 30 is lifted and before it is rotated, the outer clamp arm 124 of at least one of the wheeled carriages 110, 112 can be pivoted inwardly relative to the drum 30 into an engaged position until one or more (e.g. both) of their respective wheels 130, 132 contacts the drum 30. For example, the outer clamp arms 124 of both carriages 110, 112 may be moved into an engaged position so that all of their wheels 130, 132 contact the drum 30 prior to rotation. Thus, in this embodiment, the wheeled carriages 110, 112 provide a total of up to four points of rotational contact with and around the drum 30 at two different heights on the drum 30 to help secure the desired vertical upright position of the drum, provide effective rotation of the drum (e.g. to help avoid losing a grip on the drum 30 or ability to rotate the drum 30, avoid drum slippage or shifting), provide improved precision and control of rotation of the drum 30 (e.g. stopping rotation at a precise position of the drum 30, slowing rotation in either direction, controlled speed of rotation), for any other purpose(s) or a combination thereof. However, in other embodiments, any combination of the clamp arms 124, 126 of the wheeled carriages 110, 112 may be moved into engagement or contact with the drum 30 in any order and at any desired time. For example, both of the clamp arms 124, 126 of both wheeled carriages 110, 112 may be moved into engaged positions simultaneously.

If desired, the drum manipulation system 10 may be configured so that one or more clamp arms 124, 126 of the exemplary front or rear wheeled carriage 110, 112 are capable of adjusting the position of the drum 30 on the drum conveyor 88. For example, one or more clamp arms 124, 126 of the exemplary front and/or rear wheeled carriages 110, 112 may (e.g. via the associated driver(s) 44) be selectively actuated to push, or shift, the drum 30 so it is upright, centered over the rotation platform 94 and/or on the drum conveyor 88 (e.g. between chains 92a, 92b of the chain conveyor 90), for any other purpose(s) or a combination thereof.

Still referring to FIGS. 1A-2, when the drum 30 at the exemplary first station 118 is ready to be rotated, it may be rotated in any suitable manner. For example, at least one of the front and rear wheeled carriages 110, 112 may be configured to selectively rotate the drum 30. In the preferred embodiment, at least one of the wheels 130, 132 on the exemplary front and/or rear wheeled carriages 110 is power-driven and selectively rotated to rotate the drum 30 in a desired direction and for a desired amount of rotation. For example, all four wheels 130, 132 of the front wheeled carriage 110 may be power-driven (e.g. FIG. 6), such as by an electronically controllable motor 148 (e.g. electric VFD motor) operatively coupled thereto to selectively rotate all four wheels 130, 132 and the drum 30 as desired (e.g. in both directions) to provide enhanced rotational effectiveness (e.g. avoid losing grip on the drum 30 or ability to rotate the drum 30, avoid drum slippage or shifting), improved precision and control of rotation of the drum 30 (e.g. stopping rotation at a precise position of the drum 30, slowing rotation in either direction, controlled speed of rotation), for any other purpose(s) or a combination thereof. Thus, the exemplary front wheeled carriage 110 represents the powered side of the illustrated drum rotator 20 and the rear wheeled carriage 112 is the non-powered side. The non-powered wheels 130, 132 of the exemplary drum rotator 20 are free-spinning, such as to assist in or allow rotation of the drum 30, for any other suitable purpose(s) or a combination thereof. However, in other embodiments, a distinct motor 148, or other form of driver, may be used to drive one, two or three of the wheels 130, 132 of the front and/or rear wheeled carriage 110, 112 (e.g. one driver for each wheel 130, 132). Moreover, more or fewer of the wheels 130, 132 on the front wheeled carriage 110 and/or rear wheeled carriage 112 may be selectively rotated to rotate the drum 30. Thus, any suitable component(s) may be used to rotate any combination of the wheels 130, 132 (or other components) of the carriages 110, 112 in order to rotate the drum 30, or the drum 30 may be rotated in a different manner (e.g. by rotating the rotation platform 94 or otherwise). Further, the components and technique for rotating the drum 30 are in no way limiting upon the present disclosure or appended claims, except and only to the extent as may be expressly recited and explicitly required in a particular claim hereof and only for such claim(s) and any claim(s) depending therefrom.

Still referring to FIGS. 1A-2, in the preferred embodiment, the controller 12 directs operation of all of the drivers 44 (to selectively direct movement of the clamp arms 124, 126) and the motor 148 (to selectively rotate and stop rotation of the drum 30). However, in other embodiments, the motor 148 and/or one or more drivers 44 may be controlled by any other components (e.g. sensors) or directly by an operator. If desired, one or both of the exemplary carriages 110, 112 or one or more components thereof may be selectively adjustable (e.g. by the controller 12, manually, etc.) to accommodate different sizes and types of drums 30, for any other purpose(s) or a combination thereof. For example, the positions, or range of motion, of any of the clamp arms 124, 126 may be adjustable, the spacing between the clamp arms 124, 126 may be adjustable, the height of the wheels 130, 132, and/or spacing between wheels 130, 132 may be adjustable or a combination thereof. Furthermore, one or more components (e.g. the motor 148) of the drum rotator 20 may be selectively controllable (e.g. via the controller 12 and/or one or more operators) to control the timing, direction, speed and amount of rotation of the drum 30, or a combination thereof.

The exemplary drum rotator 20 provides one or more advantages. In some embodiments of the drum rotator 20, the use of a total of eight wheels (e.g. four upper wheels 130 and four lower wheels 132), allows for more points of contract with the drum 30 and more effective and reliable drum rotation as compared to other drum rotation systems having fewer wheels. For example, when one or more wheels encounters an uneven outer surface (dents, concave portions) of the drum 30, the wheel could become ineffective at rotating the drum 30 and the drum 30 could stop or slip. In some embodiments of the drum rotator 20, the use of four independently moving clamp arms 124, 126 provides for improved engagement with and positioning of the drum 30 because each clamp arm 124, 126 can independently engage the drum 30. One or more of the clamp arms 124, 126 can be used to move or push the drum 30 into proper engagement with other clamp arms 124, 126 and/or center, or position, the drum 30 in the precise desired location (e.g. within 1/32" or more or less). For another example, the use of all (e.g. four) four wheels 130, 132 of the front wheeled carriage 110 as power-driven wheels may provide for more reliable rotation of the drum 30 (e.g. less chance for slippage) and better speed control of drum rotation (e.g. to ramp up and/or down the speed of rotation).

Referring again to FIGS. 1A-2, as the drum 30 is rotated, the exemplary bung locator 40 is configured to locate at least one bung opening 32 formed in an upper surface, or top, 36 (e.g. FIG. 3) of the drum 30 (and/or a bung plug 34 therein), position the bung opening 32 (and/or bung plug 34 therein) as desired for further operations or both. For example, the bung locator 40 may be selectively positioned at least partially over the top 36 of the drum 30 as the drum 30 is rotated (e.g. FIGS. 9-16). In various embodiments, the bung locator 40 may be initially positioned at a desired location over the top 36 of the drum 30 or shuttled or moved into (and out of) a desired position, or the drum 30 may be moved relative to the bung locator 40. When the bung locator 40 is moved relative to the drum 30, any suitable components and technique may be used. For example, one or more drivers 46 may be operatively coupled to the bung locator 40 (e.g. via one or more bracket mounts 42, FIG. 7) for selectively shuttling the bung locator 40 in one or more linear, arc-like, angular or other paths back and forth between at least one "home" position (away from the drum 30) and at least one "operating" position (proximate to the drum 30). In a preferred "home" position, the exemplary bung locator 40 is sufficiently clear of the drum 30 to allow one or more other components (e.g. bung plug extractor 50) to be shuttled into position over the drum 30, to allow the drum 30 to be moved to a different location, for any other desired purpose(s) or a combination thereof. In a preferred "operating" position, the exemplary bung locator 40 is positioned so that when the bung opening 32 (and/or bung plug 34 therein) of the rotating drum 30 is at a particular position below it (e.g. FIGS. 14-16), the drum 30 will be in the desired position for further operations, such as bung plug 34 removal, bung plug 34 installation, drum filling, testing, other operation(s) or purpose(s) or a combination thereof. In the preferred embodiment, the bung locator 40 is moved into the preferred operating position during rotation of the drum 30, but could instead be moved before rotation of the drum 30.

Still referring to FIGS. 1A-2, in the preferred embodiment, the bung locator 40 is moveable between home and operating positions by a first driver 46a (e.g. linear pneumatic or hydraulic cylinder) in a linear path sideways (e.g. horizontally) relative to the drum 30 and a second driver 46b (e.g. linear pneumatic or hydraulic cylinder, FIG. 1C) in a linear path up and down relative to the drum 30. The exemplary drivers 46 are preferably electronically coupled to and controlled by the electronic controller 12. For example, the bung locator 40 may be moved from one or more preferred "home" positions first in a horizontal path toward the drum 30 by actuation of the first driver 46*a* and then in a vertical path down to one or more preferred "operating" positions by actuation of the second driver 46*b*. It should be noted that the opposite sequence could instead be used. Further, the same technique and components may be used when it is desired to move the exemplary bung locator 40 away from the drum 30 but in the opposite order or direction (e.g. after locating and positioning the bung opening 32 or at any other desired time). Also, a similar arrangement of parts and techniques can be used to shuttle other components (e.g. the exemplary bung plug extractor 50 and bung plug installer 60) toward and away from the drum 30 as desired. However, in other embodiments, the bung locator 40 (bung plug extractor 50 and bung plug installer 60) may be moveable toward and away from the drum 30 in any other desired manner, along only a single path or one or more non-linear paths (e.g. an arc-like motion or angular motion), with the use of any other form or combination of driver(s) or other components controlled by the controller 12, other component(s) (e.g. sensor(s)), one or more operators or a combination thereof. Thus, the details, nature and characteristics of components used for shuttling, or moving, the bung locator 40 (bung plug extractor 50 and bung plug installer 60) are not limiting upon the present disclosure and appended claims, except and only to the extent as may be expressly recited and explicitly required in a particular claim hereof and only for such claim(s) and any claims depending therefrom.

Figure 7:
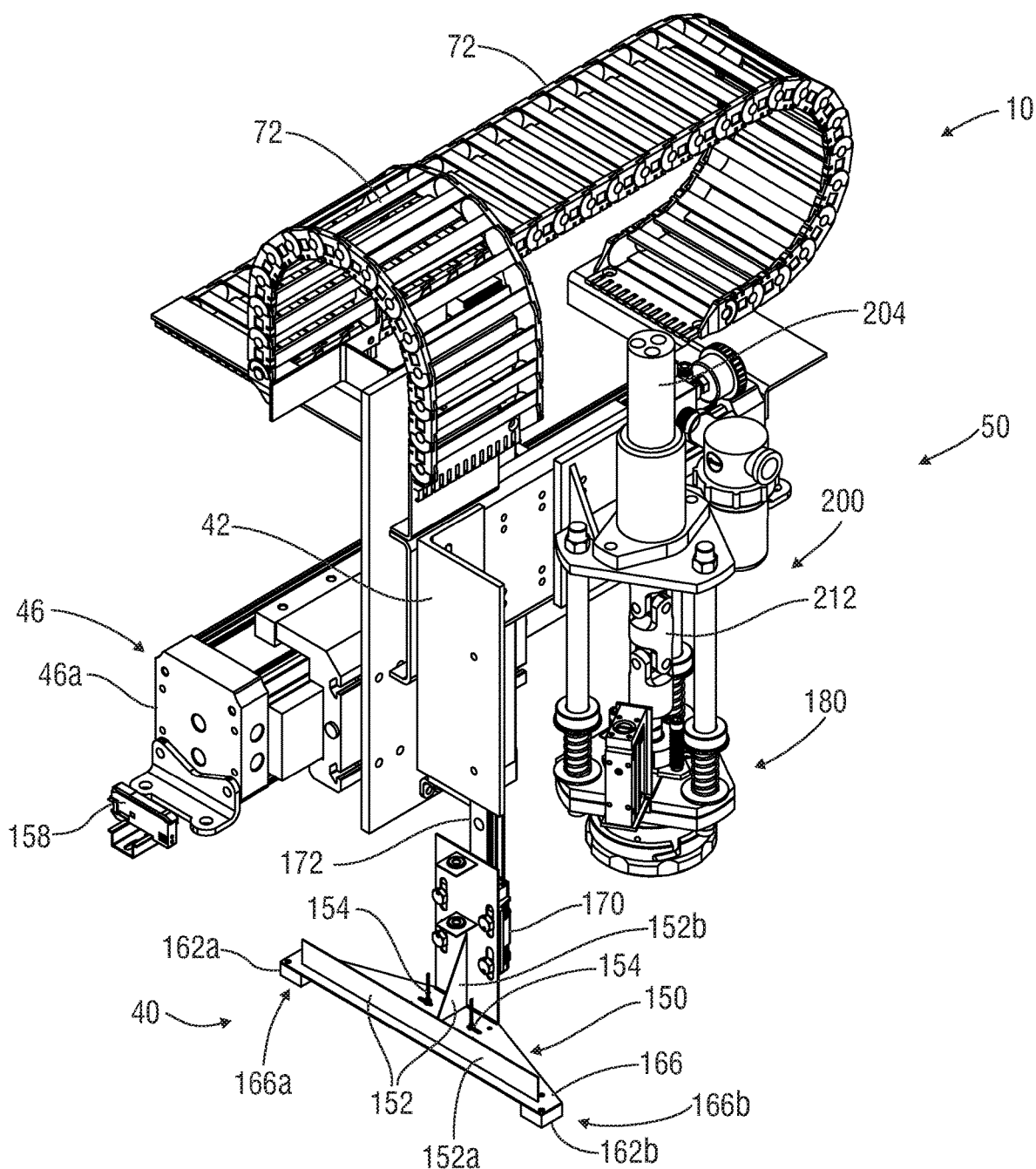
FIG. 7 is a perspective view of various components of the exemplary drum manipulation system of FIG. 1A including the exemplary bung locator and bung plug extractor in accordance with the present disclosure.
Figure 8:
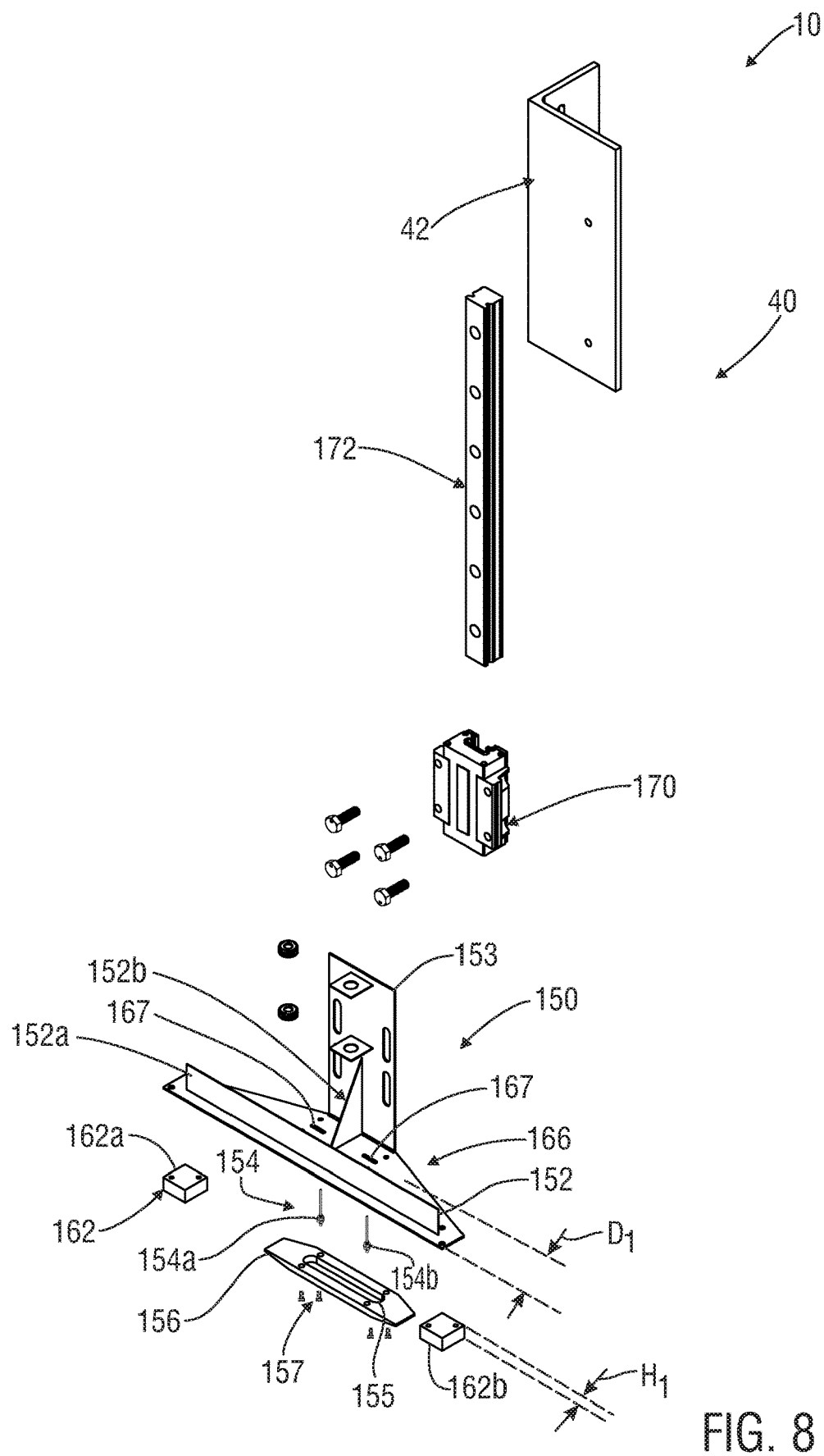
FIG. 8 is an exploded view of the exemplary bung locator shown in FIG. 7.
Figure 10:
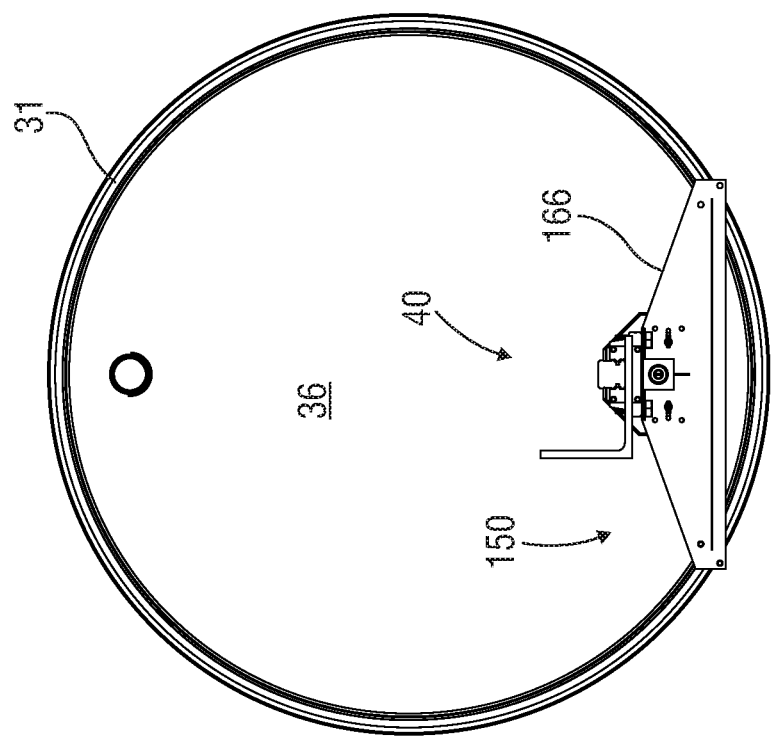
FIG. 10 is a top view of the exemplary bung locator of FIG. 9.
Figure 9:
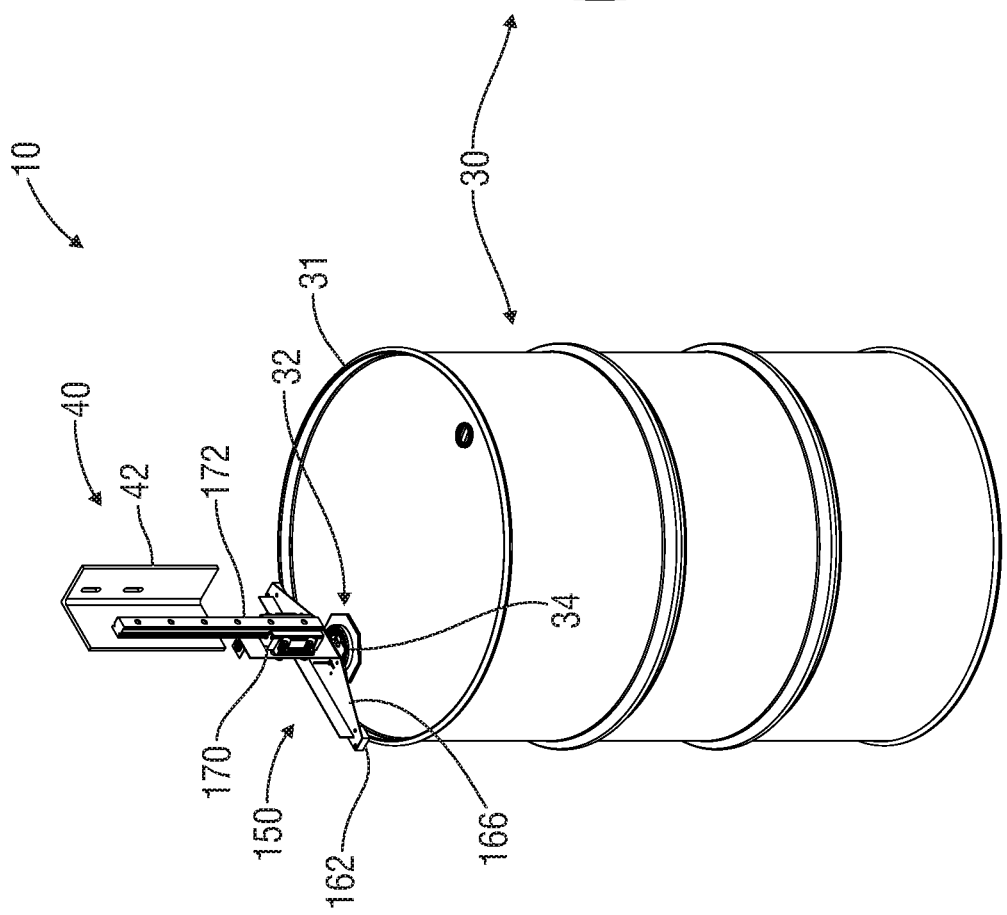
FIG. 9 is a perspective view of the exemplary bung locator of FIG. 7 shown engaging an exemplary drum.
Figure 13:
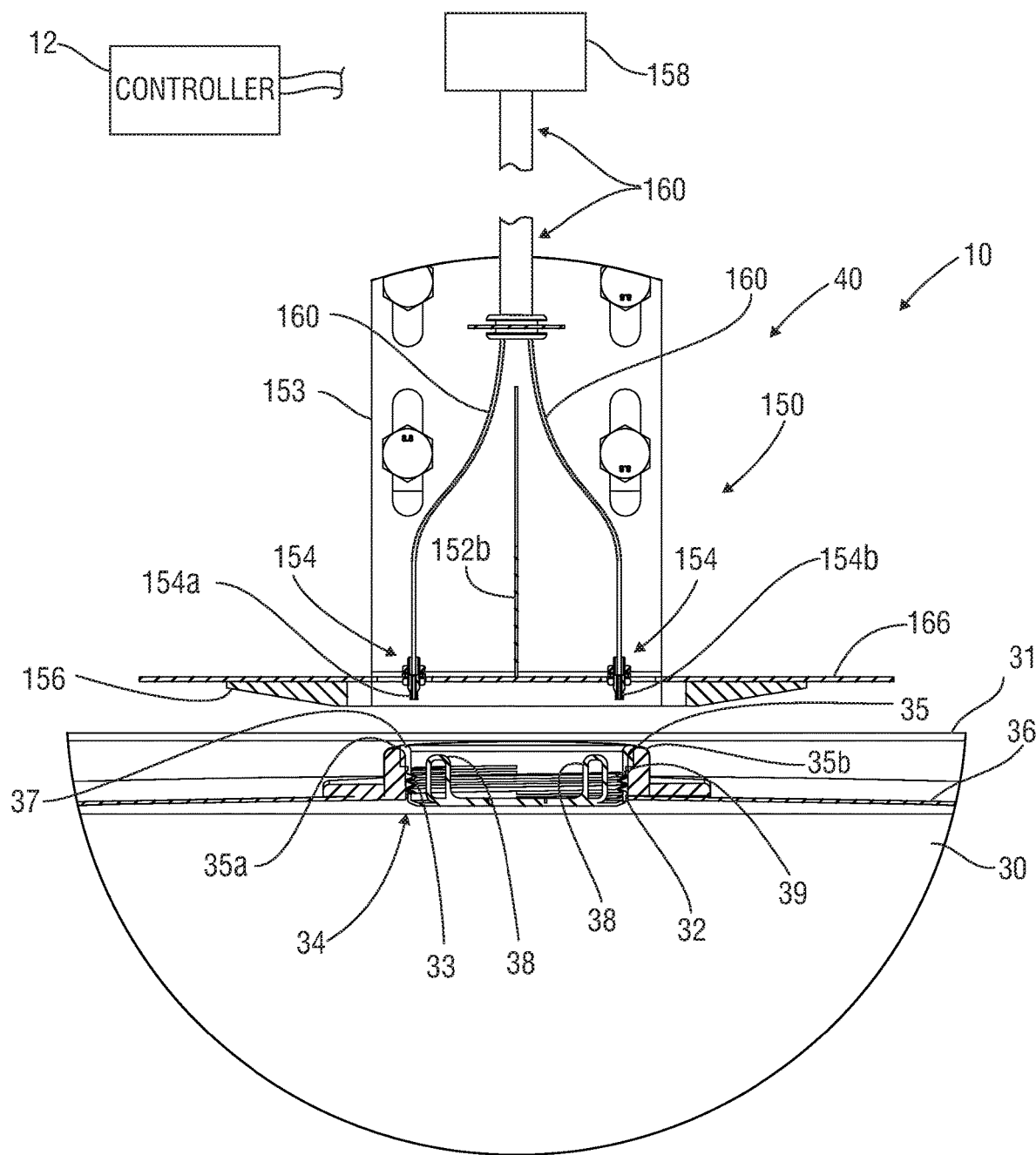
FIG. 13 is an exploded view of the exemplary bung locator of FIG. 12.
Figure 14:
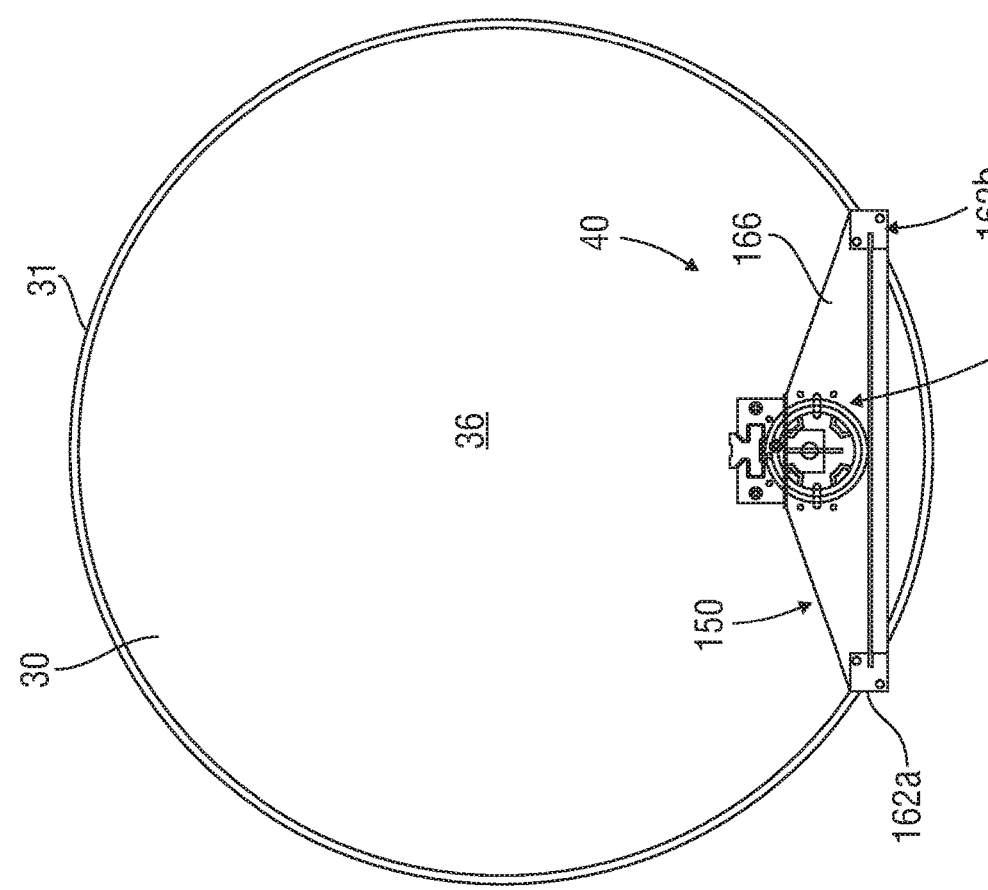
FIG. 14 is a top view of an exemplary bung locator engaging an exemplary drum in accordance with one or more embodiments of the present disclosure.

The bung locator 40, such as shown in FIGS. 7-16, may have any suitable form, configuration, components and operation and may locate the bung opening 32 (and/or bung plug 34) in any suitable manner. Referring particularly to FIGS. 7, 8 & 13, preferably, the bung locator 40 includes a carrier 150 that houses at least one bung location sensor 154 configured to sense the location of the bung opening 32 (or bung plug 34 therein) beneath it. For example, referring to FIG. 13, the carrier 150 may carry first and second downwardly facing, fiber optics sensors 154*a*, 154*b*, which are spaced-apart the same distance as the distance between opposing edges 35*a*, 35*b* of an upwardly protruding (e.g. outer) lip 35 of the bung opening 32 or, in some instances, opposing edges 37 (e.g. FIG. 4) of the bung plug 34. However, any number (e.g. 1, 3, 4, etc.) of any type of bung location sensors 154 may be used in any desired configuration and with or without the use of a carrier 150.

Referring to FIGS. 7 and 8, the carrier 150, when included, may have any suitable form, configuration and operation. In the preferred embodiment, the carrier 150 includes a main body 166 having a respective orifice, or slot, 167 formed therein for each bung location sensor 154 and that allows light beams to pass between the corresponding bung location sensor 154 and the top 36 of the drum 30 (e.g. FIG. 13). For example, the illustrated main body 166 is a generally rigid (e.g. metal), horizontally-extending plate, but could have any other form and configuration. If desired, the carrier 150 may include one or more stabilizing members 152 to add rigidity to the main body 166, help maintain the desired position of the bung location sensor(s) 154, for any other suitable purpose(s) or a combination thereof. For example, the illustrated embodiment shows a first stabilizing member 152*a* in the form of a generally rigid (e.g. metal) plate extending upwardly from the top and across substantially the entire length of the main body 166, and a second stabilizing member 152*b* in the form of a generally rigid (e.g. metal) plate extending upwardly between the top of the main body 166 and a mounting plate 153 coupled to or integral with the main body 166. However, the stabilizing member(s) 152, when included, may have any other suitable form, configuration and location.

In some embodiments, one or more sensor guards 156 may be provided proximate to the bung location sensors 154 to assist in shielding them from damage due to inadvertent contact with other items, for any other purpose(s) or a combination thereof. The sensor guards 156 may have any suitable form, configuration and operation. For example, the sensor guard(s) 156 may protect the bung location sensors 154 from contact with tools or other items left on the top 36 of the drum 30, which could damage or destroy the sensors 154 as the drum 30 is rotated under the bung locator 40. In the preferred embodiment, the bung locator 40 includes a single sensor guard 156 affixed to the bottom of the main body 166, such as with releasable connectors 157 (e.g. screws, bolts, pins, etc.), and extending at least partially around the bung location sensors 154. The exemplary sensor guard 156 is shown having a slot 155 into, or through, which the bung location sensors 154 extend or project light. The sensor guards 154 may also be constructed of any suitable material, such as durable and/or lightweight material (e.g. plastic, aluminum). In other embodiments, the sensor guard(s) 156, when included, may be integral with the carrier 150 (or other component), include multiple parts or have any other form, configuration, operation and function.

Any suitable "operating position" of the bung locator 40 may be used. In various embodiments, the bung locator 40 is configured to ride on the outer rim, or chime, 31 (or other part) of the drum 30 (e.g. FIGS. 9-12) to assist in accurately positioning the carrier 150 and/or bung location sensor(s) 154 carried thereby in one or more operating positions over the drum 30 as desired and/or for any other purposes. For example, as shown in FIGS. 7 & 8, the carrier 150 may include one or more feet 162 configured to rest (and ride) upon the outer rim 31 of the drum 30 after the bung locator 40 is lowered into the desired position over the drum 30. In the preferred embodiment, the main body 166 of the carrier 150 includes at least first and second spaced-apart feet 162*a*, 162*b* (e.g. plastic shoes) extending downwardly from the main body 166. For example, the feet 162*a*, 162*b* may be (i) releasably rigidly coupled (e.g. with bolts, pins or the like) to the main body 166 (e.g. at or proximate to the respective ends 166*a*, 166*b* thereof) or integral therewith, (ii) configured to rest and ride upon the outer rim 31 (e.g. FIGS. 9-11, 14), or another part, of the drum 30, (iii) spaced a desired distance Di (e.g. FIG. 15) radially outwardly relative to the bung location sensors 154, (iv) formed with a desired height H1 (e.g. FIG. 15) to accurately position the bung location sensors 154 over the bung opening 32 (and/or bung plug 34) of the rotating drum 30, or a combination thereof.

Figures 15, 16:
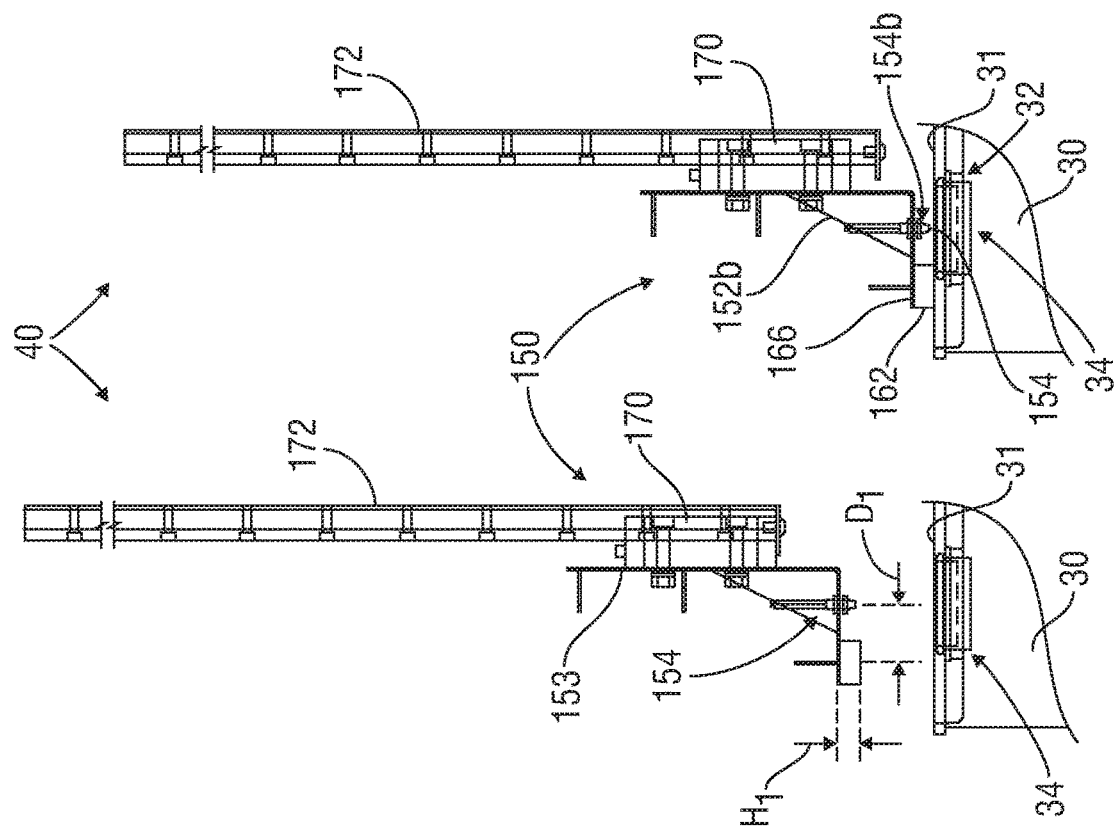
FIG. 15 is a side view of the exemplary bung locator of FIG. 14 before engaging the drum.
FIG. 16 is a side view of the exemplary bung locator of FIG. 14 engaging the drum.

Still referring to FIGS. 7 & 8, if desired, the carrier 150 may be configured to effectively float, or be spring-biased downwardly, on the outer rim 31 (or other part) of the drum 30 to allow it to engage drums 30 having (or at) different heights, accommodate misalignment of the bung locator 40, accommodate misalignment or imperfections of the drum 30 or misalignment of its position as the drum rotates, avoid jamming or damaging the bung locator 40 or disrupting operations, for any other purpose(s) or a combination thereof. This may be accomplished in any suitable manner. In the preferred embodiment, the carrier 150 effectively floats via one or more linear bearings 170 rigidly coupled thereto and movable on an upright linear bearing rail 172 (e.g. mounted to bracket mount 42). For examples, FIG. 16 shows the exemplary carrier 150 of FIG. 15 after being lowered down into an operating position (with its feet 162 riding on the outer rim 31 of the drum 30) and floating up on the linear bearing rail 172 via the linear bearing 170. However, any other suitable components (e.g. springs, flexible members, shock absorbers, etc.) and techniques may be used to float or spring-bias the carrier 150 downwardly relative to the drum 30 and/or provide one or more operating positions of the bung locator 40. Further, the bung locator 40 may have any other suitable form configuration, components and operation. For example, the bung locator 40 may, in some embodiments, ride on the top 36 of the drum 30 (instead of the outer rim 31).

Referring now to FIGS. 7 & 13, the bung location sensors 154 may have any suitable form, configuration and operation. In the preferred embodiment, light beams are projected down through the exemplary fiber optics sensors 154a, 154b to the top 36 of the drum 30 and reflected up from the drum 30 through the sensors 154a, 154b to determine the presence of the bung opening 32 (or bung plug 34) at the desired location below the bung locator 40. This may be performed in any suitable manner. For example, one or more optic amplifiers 158 (and/or or other suitable components) may be associated with or coupled to the exemplary sensors 154a, 154b (e.g. with wires 160) to (i) cause one or more (e.g. red) light signals to project down through each sensor 154a, 154b onto the top 36 of the rotating drum 30, (ii) receive light signal(s) reflected up off the top 36 the drum 30 through the sensors 154a, 154b, (iii) determine when reflected light signals received through both sensors 154a, 154b indicate the sensors 154a, 154b are simultaneously positioned over respective opposing edges 35a, 35b of the lip 35 of the bung opening 32 (or similar edges of the bung plug 34) (e.g. based upon amplitude and/or intensity of the reflected light signals), (iv) signal the electronic controller 12 (other component or operator) to cease rotation of the drum 30, for any other purpose(s) or a combination thereof. However, other embodiments may include only one or more than two (e.g. three, four, etc.) bung location sensors 154 or other components for determining the position of the bung opening 32 (and/or bung plug 34). Further, any other types, or combinations of types, of bung location sensors 154 may be used (e.g. electronic proximity sensors, inductive sensors, image sensors (e.g. cameras)). Moreover, the bung location sensors 154 may communicate with the electronic controller 12, motor 148 (e.g. FIG. 1A) other component or one or more operators (e.g. without the use of an optic amplifier 158) directly or through one or more other component(s)).

In accordance with various embodiments of the drum manipulation system 10, the bung locator 40 may provide one or more advantages. For example, by engaging the chime 31 instead of the top 36 of the drum 30, various embodiments of the bung locator 40 will avoid scratching, creating wear marks or other visual impairments to the top 36 of the drum 30. In contrast, the chime 31 of many versions of drums 30 is intended to be scratched, nicked, etc. For another example, the bung locator 40 may be lightweight and engage the drum 30 with minimal friction, improving the longevity of and reducing the occurrence of wear to the bung locator 40 (e.g. feet 162) and the part of the drum 30 (e.g. chime 31) engaged thereby. In the preferred embodiment, the main body 166 and stabilizing members 152 of the carrier 150 are constructed of lightweight aluminum plates, the bung location sensors 154 are lightweight and the sensor guards 156 are lightweight plastic. For yet another example, the bung locator 40 may be easily assembled and repaired, constructed with few or no moving or mechanical parts, have minimal parts that could malfunction, wear or become damaged or a combination thereof. For still a further example, the embodiments of the bung locator 40 not having components (e.g. wheels) that ride across the top 36 of the drum 30, will not pick up dirt, debris, liquid and like from the top 36 of the drum 30 and become damaged or clogged thereby and/or malfunction.

Referring back to FIGS. 1A-2, in the preferred embodiment, after the desired rotation of the drum 30 and positioning of bung opening 32 and/or bung plug 34, the exemplary bung locator 40 may be selectively shuttled, or moved, away from the drum 30. For example, the bung locator 40 may be moved back to one or more home positions, such as in the same or similar manner described above (e.g. in the reverse order). If the drum 30 was previously raised up off the drum conveyor 88, it may be lowered back down onto the drum conveyor 88. In the preferred embodiment, the exemplary rotation platform 94 is lowered to set the drum 30 back down on the drum conveyor 88. However, there may be instances or embodiments in which the drum 30 remains in a raised position, is not lowered down onto the drum conveyor 88, is moved to a different location or a combination thereof.

The exemplary bung plug extractor 50 (e.g. FIGS. 17A-33) will now be described. Referring to FIGS. 1A-2, to remove a bung plug 34 from the drum 30 with the drum manipulation system 10, such as after the bung opening 32 has been suitably positioned, the exemplary bung plug extractor 50 may be shuttled, or moved, into position relative to the drum 30, the drum 30 may be moved in a desired position relative to the bung plug extractor 50, any other technique may be used to position the bung plug extractor 50 or a combination thereof. For example, the bung plug extractor 50 may be moved from at least one "home" position (e.g. away from the drum 30, similar to the home position of the exemplary bung locator 40 as described above) to an "operating" position over and/or in contact with the drum 30 (e.g. FIGS. 22-25). In such instances, the bung plug extractor 50 may be selectively moveable relative to the drum 30 in any suitable manner. For example, one or more drivers 46 may be operatively coupled to the bung plug extractor 50 and, if desired, electronically coupled to electronic controller 12, for selectively moving the bung plug extractor 50 in one or more linear, arc-like and/or angular paths back and forth between positions, similarly as described above with respect to the movement of the exemplary bung locator 40. In the preferred embodiment, the bung plug extractor 50 is moveable between home and operating positions by the first driver 46a (e.g. linear pneumatic or hydraulic cylinder; FIG. 1C) in a first linear path sideways (e.g. horizontally) toward the drum 30 and then by the second driver 46b (e.g. linear pneumatic or hydraulic cylinder) in a linear vertical path down to the drum 30. However, in other embodiments, the bung plug extractor 50 may be moveable toward and away from the drum 30 in any other desired manner, along a single path or one or more non-linear paths (e.g. an arc-like motion, angular motion, etc.), with the use of any other form or combination of driver(s) or other components controlled by the controller 12, other component(s) (e.g. sensor(s)) or one or more operators, or a combination thereof.

Figure 17A:
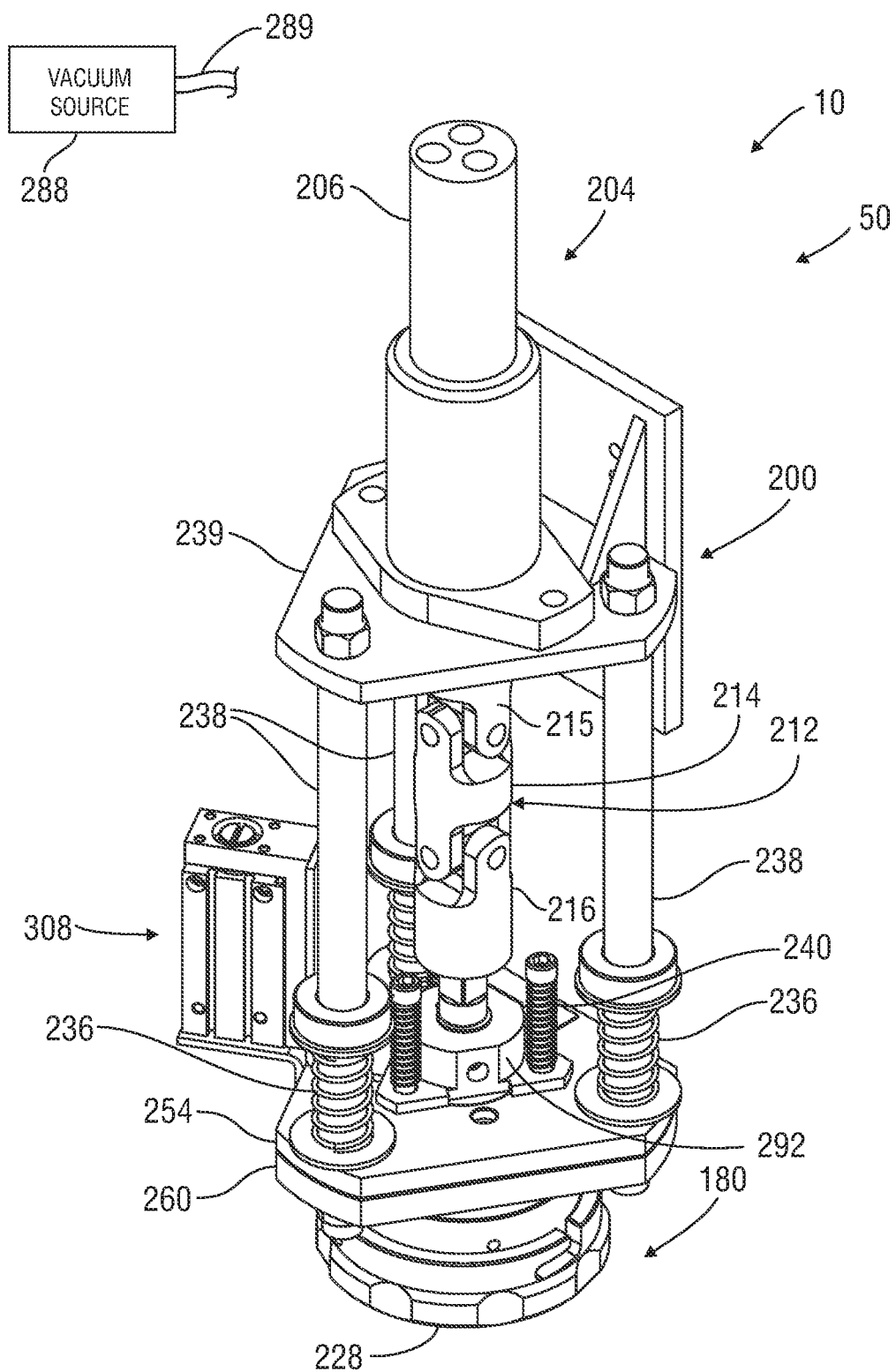
FIG. 17A is a perspective view of the exemplary bung plug extractor shown in FIG. 1A in accordance with one or more embodiments of the present disclosure.
Figures 17B, 17C:
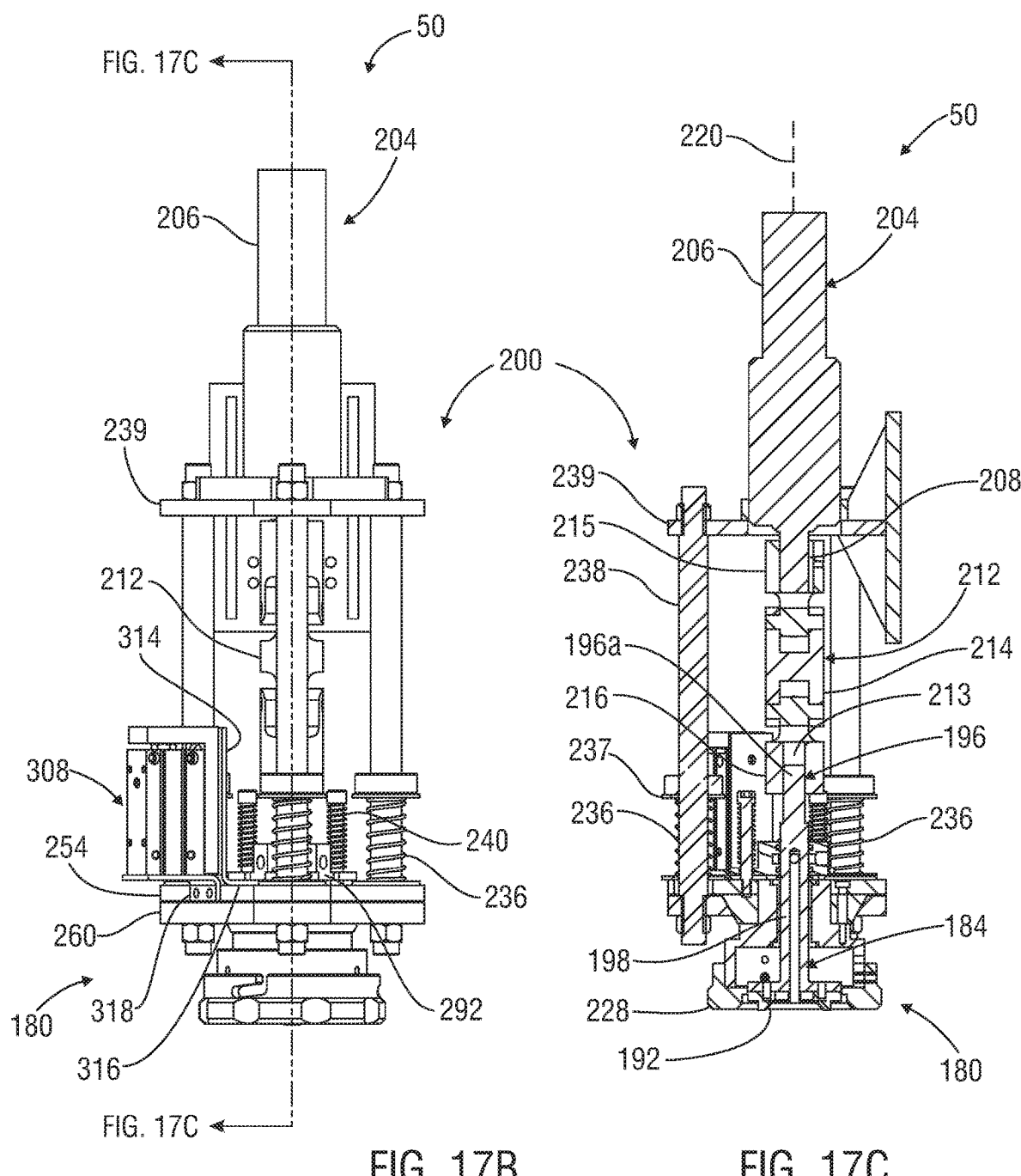
FIG. 17B is a side view of the exemplary bung plug extractor of FIG. 17A in accordance with one or more embodiments of the present disclosure.
FIG. 17C is a cross-sectional view of the exemplary bung plug extractor of FIG. 17B taken along lines FIG. 17C-FIG. 17C.
Figure 18:
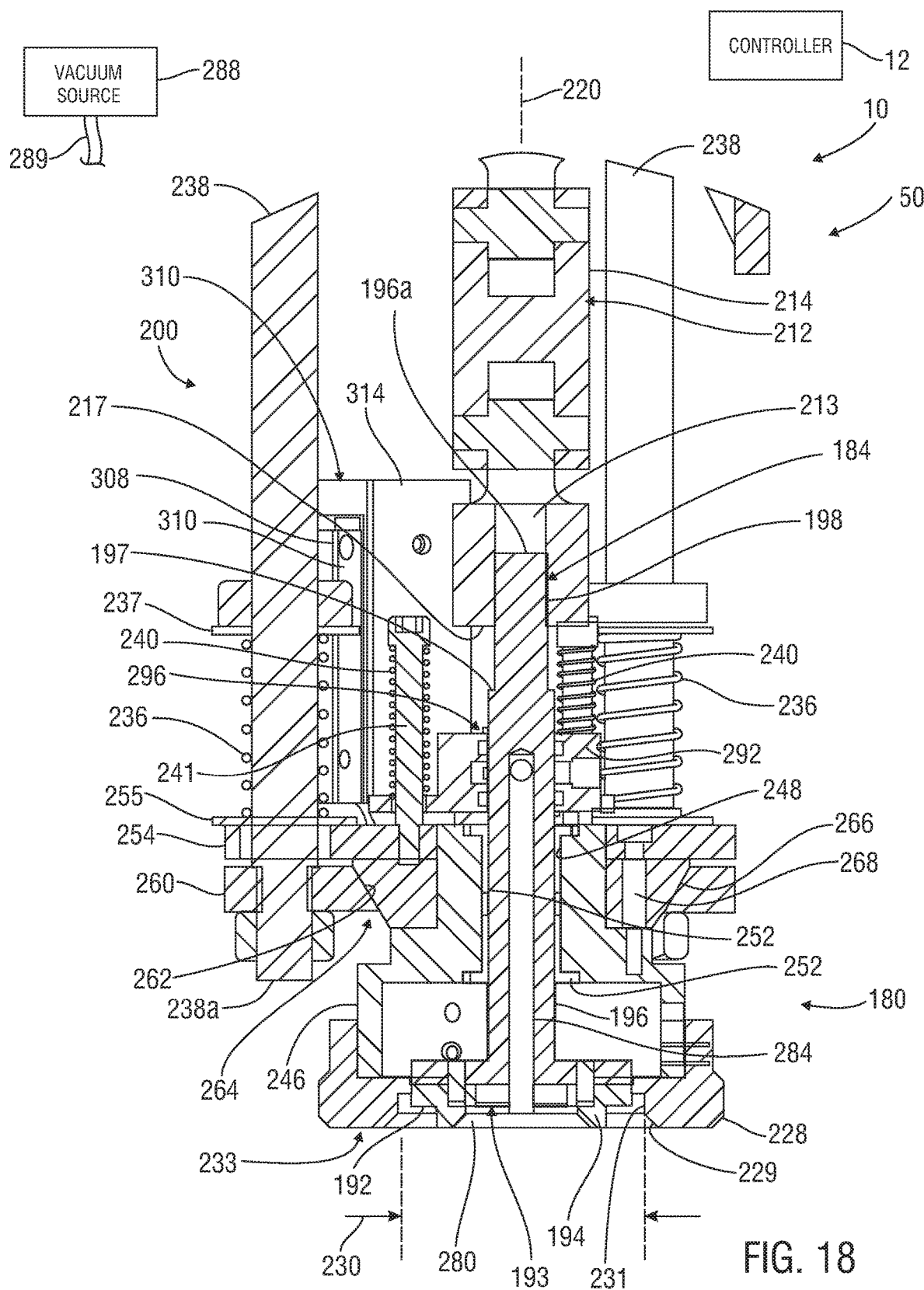
FIG. 18 is a cross-sectional view of the exemplary bung plug extractor of FIG. 17A in an exemplary home position, or before engaging an exemplary drum, in accordance with one or more embodiments of the present disclosure.
Figure 21:
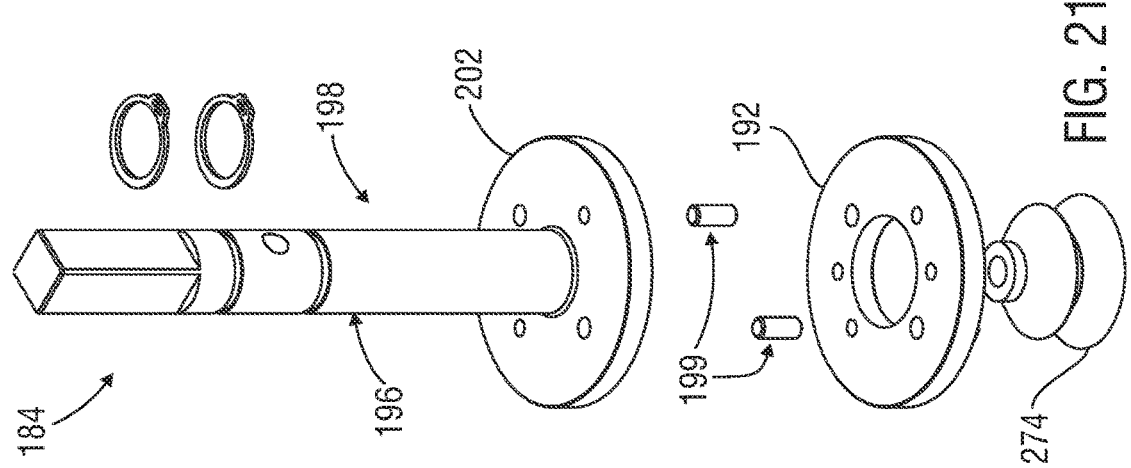
FIG. 21 is an exploded view of another exemplary bung plug engagement tool in accordance with one or more embodiments of the present disclosure.

The bung plug extractor 50 may have any suitable form, configuration, components and operation. Referring to FIGS. 17A-18, in the preferred embodiment, for example, the bung plug extractor 50 includes a bung plug engagement tool 184, a centering assembly 180 and a frame, or carrier, 200. The exemplary bung plug engagement tool 184 is useful to disconnect the bung plug 34 from the drum 30, the illustrated centering assembly 180 is useful to assist in centering the bung plug engagement tool 184 over the bung opening 32 and the carrier 200 carries the centering assembly 180 and bung plug engagement tool 184. However, these components may have one or more additional or different purposes, or a combination thereof. Further, one or more of these components may be combined and some embodiments may include only one or two of these components or additional components.

Referring still to FIGS. 17A-18, the carrier 200 may have any suitable form, configuration, components and operation for carrying the centering assembly 180 and bung plug engagement tool 184. In many embodiments, the carrier 200 includes at least one outer spring support rod, or linear bearing shaft, 238 engaged between at least one upper plate 239 and at least one lower plate 260. In such embodiments, at least one outer spring 236 (e.g. coil spring, helical compression spring) extends around each respective rod 238 and biases at least one exemplary floating plate 254 downwardly on the spring support rod(s) 238 toward and relative to the lower plate 260. However, the components of the carrier 200 may vary in form from such embodiments. For example, any of the plates 239, 254, 260 may not be plates per say, but instead be in any other desired form and may be comprised of multiple parts. Moreover, the carrier 200 may include only some of these components and/or may have additional or different components and functions. Thus, the form, components, configuration and operation of the carrier 200 are in no way limiting upon the present disclosure or appended claims, except and only to the extent as may be expressly recited and explicitly required in a particular claim hereof and only for such claim(s) and any claim(s) depending therefrom.

When included, the bung plug engagement tool 184 may have any suitable form, configuration, components and operation for assisting in disconnecting the bung plug 34 from the drum 30. For example, referring to FIGS. 18-20, the bung plug engagement tool 184 may include at least one bung plug mating portion, or wrench, 192 disposed at its lower end and configured to engage the bung plug 34 (e.g. FIG. 26) and disconnect it from the drum 30, and at least one guide 196 extending upwardly from the mating portion 192. The mating portion(s) 192 may have any suitable form, configuration, components and operation. In instances in which the bung plug 34 is threadably engaged with the drum 30 (e.g. rotated clockwise for engagement and counterclockwise for removal), the mating portion 192 may be used to rotate the bung plug 34 in any suitable manner. For example, the mating portion 192 may include at least one tab 194 extending (e.g. downwardly) therefrom and configured to engage and facilitate rotation of the bung plug 34.

The tab(s) 194 may have any suitable form, configuration and operation. In the preferred embodiment, the mating portion 192 includes first and second tabs 194 each engageable with a distinct protrusion 38 (e.g. FIG. 26) extending (e.g. upwardly) from the bung plug 34. For example, the first and second tabs 194 may be configured to be moved into abutting contact with the respective protrusions 38 of the bung plug 34 (e.g. metallic bung plug 34a, FIG. 4) to push them in a rotational path to rotate the bung plug 34. In other embodiments, the mating portion 192 may include only one, or more than two, tabs 194 as necessary (e.g. depending upon the configuration of the bung plug 34). For example, the bung plug engagement tool 184 may have four tabs 194 that engage four respective protrusions 38 of bung plug 34 (e.g. plastic bung plug 34b, FIG. 5). If desired, at least one (e.g. inner) edge 194a of each tab 194 may be tapered, such as to properly register with, or engage, the bung plug 34 (e.g. plastic bung plug 34b) and/or for any other desired purpose(s).

In other embodiments, the tab(s) 194 (or other components) of the mating portion 192 may instead physically or mechanically mate with, grip or otherwise engage the bung plug 34 to facilitate engagement with the bung plug 34 (e.g. for disconnection from or installation in the drum 30). For example, if the bung plug 34 includes one or more socket-like recesses having a particular cross-sectional shape (e.g. square, hexagonal, octagonal, rectangular, slotted, etc.), the mating portion 192 of the bung plug engagement tool 184 may include one or more tabs 194 in the form of a bit, pin, blade, spade, etc. (e.g. having a complimentary cross-sectional shape, such as square, hexagonal, rectangular, octagonal, etc.) that are insertable into the socket-like recess(es) of the bung plug 34. For another example, if the bung plug 34 includes one or more protrusions 38 (e.g. bolt heads, bits, pins, blades, spades, etc.) having a particular cross-sectional shape (e.g. square, hexagonal, octagonal, rectangular, etc.), the mating portion 192 of the bung plug engagement tool 184 may include one or more socket-like recesses having a complimentary cross-sectional shape and being engageable around the corresponding protrusion(s) 38. For still further examples, the mating portion 192 may instead or also include one or more clips, claws, grippers, suction members or the like for engaging the bung plug 34 (e.g. for disconnection from or installation in the drum 30).

Figure 20:
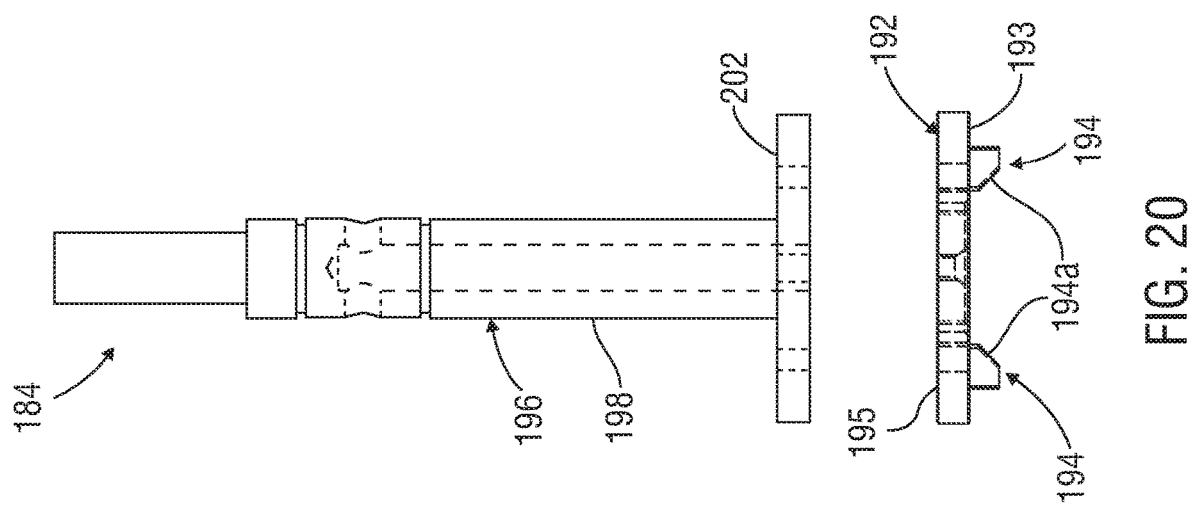
FIG. 20 is a side view of the exemplary bung plug engagement tool of FIG. 19.
Figure 19:
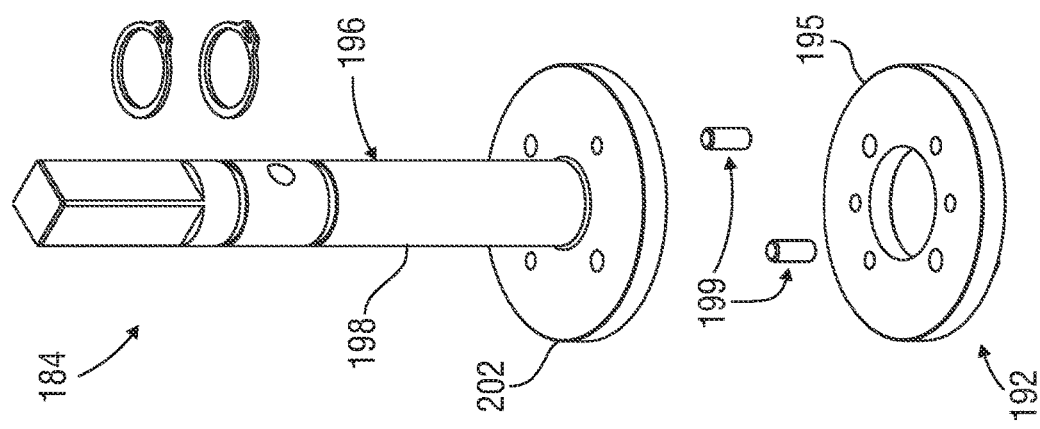
FIG. 19 is an exploded view of an exemplary bung plug engagement tool in accordance with one or more embodiments of the present disclosure.
Figure 23:
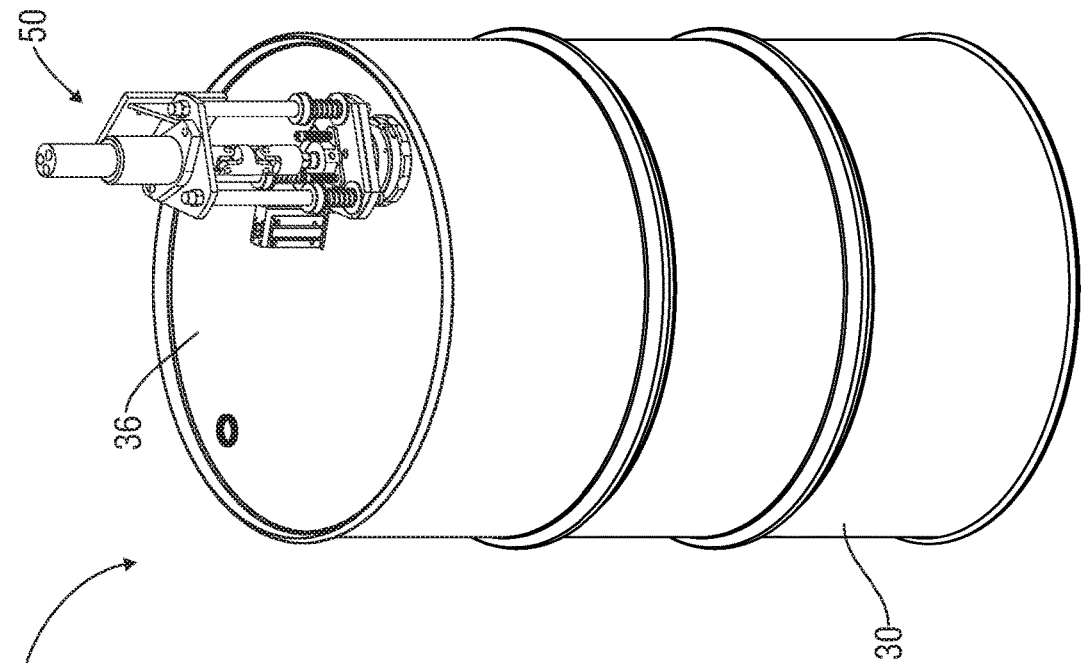
FIG. 23 is a perspective view of the exemplary bung plug extractor of FIG. 22.
Figure 22:
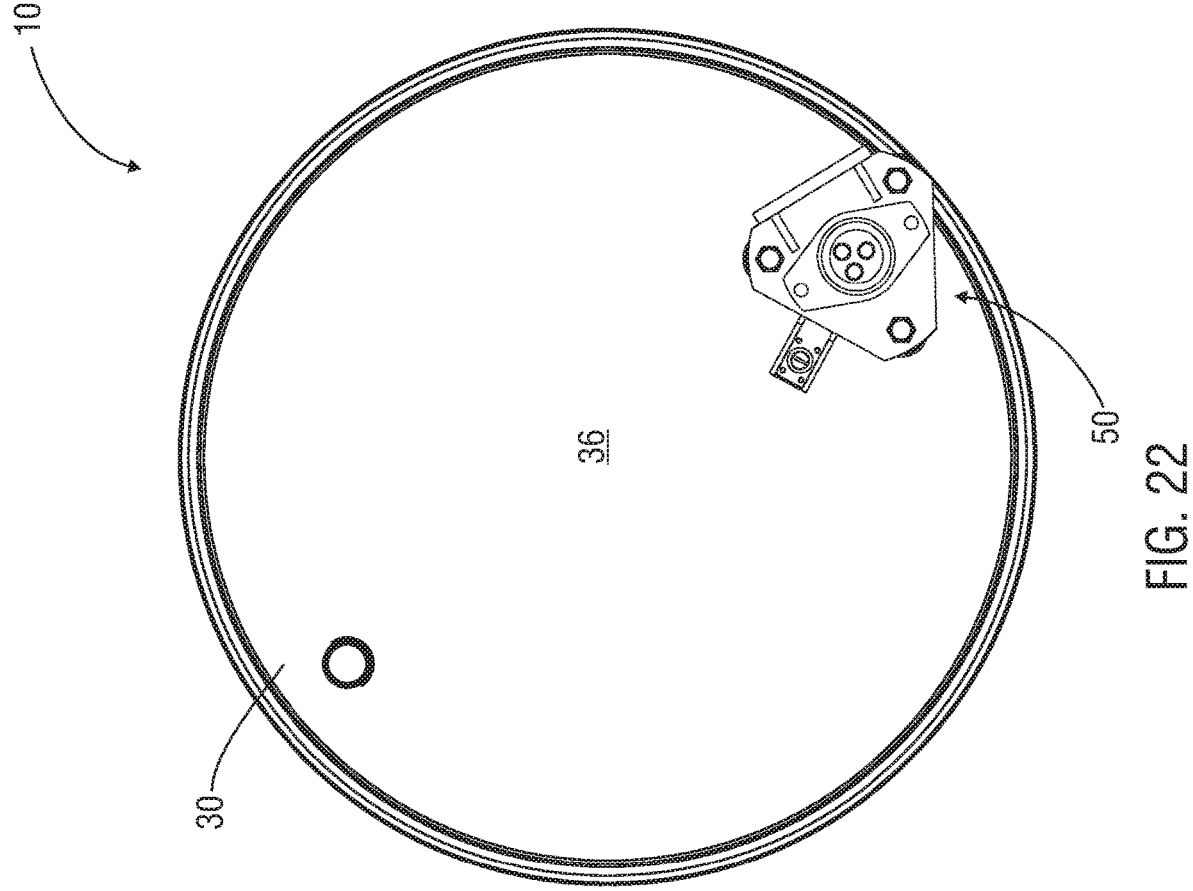
FIG. 22 is a top view of the exemplary bung plug extractor of FIG. 17A shown engaging an exemplary drum.

Still referring to FIGS. 18-20, the guide(s) 196, when included as part of the bung plug engagement tool 184, may have any suitable form, configuration, components and operation. For example, the guide 196 may be an elongated control rod 198 coupled to or integral with the mating portion 192 and configured to assist in moving the mating portion 192 as desired to disconnect the bung plug 34. In the preferred embodiment, the guide 196 includes a mounting plate 202 (e.g. coupled thereto by weld and/or shrink-fitting) to which the mating portion 192 is mounted.

In embodiments configured to disconnect a rotatable bung plug 34 from the drum 30, the exemplary guide 196 may be secured to, or integral with, the mating portion 192 and selectively rotatable to rotate the mating portion 192. For example, the exemplary guide 196 may be operatively coupled to a driver 204 (FIG. 17A) for selective concurrent rotation of the guide 196 and mating portion 192 in either direction (e.g. counterclockwise for unscrewing the bung plug 34 and clockwise for installing the bung plug 34). As the preferred bung plug engagement tool 184 is rotated during normal operating conditions, sufficient rotational pressure and/or torque should be applied by the mating portion 192 to the bung plug 34 (e.g. FIG. 27) to unscrew it from the drum 30. If the exemplary guide 196 and mating portion 192 are not integrally formed, they should preferably be sufficiently rigidly coupled together to ensure they withstand the expected forces applied thereto during rotation of the bung plug 34. For example, the mating portion 192 may be releasably rigidly coupled to the guide 196 (e.g. via mounting plate 202) with one or more (e.g. two) pins 199 (or other connectors) to provide the desired rigid connection, for any other purpose(s) or a combination thereof. However, the mating portion 192 and guide 196 may include any other arrangement of components and configuration. For example, if the mating portion 192 is configured to grip the bung plug 34, the guide 196 may include an actuator (e.g. handle, trigger, up-and-down sliding member(s), etc.) to move the mating portion 192 into and out of gripping engagement with the bung plug 34.

Referring to FIGS. 19 & 20, in some embodiments, the bung plug engagement tool 184 (or one or more portions thereof) may be removable from the drum manipulation system 10, such as to switch out match the mating portion 192 with the particular type of bung plug 34 being removed or drum 30 being serviced, for maintenance, repair or replacement, for any other purpose(s) or a combination thereof. For example, the bung plug mating portion 192 may comprise a bung plug engagement plate 195 that is releasable from the bung plug engagement tool 184 via the pins 199 (e.g. dowel pins) or other releasable connectors. In some embodiments, it may be required or desirable to use a mating portion 192 (e.g. engagement plate 195) that is constructed at least partially of non-spark material (e.g. bronze), such as when filling the drum with flammable fluid or materials. Thus, a typical metallic mating portion 192 may be switched out and replaced with a non-spark version as desired. However, the bung plug engagement tool 184 may have any other configuration of components and operation. Thus, the details, nature and characteristics of the bung plug engagement tool 184 are not limiting upon the present disclosure and appended claims, except and only to the extent as may be expressly recited and explicitly required in a particular claim hereof and only for such claim(s) and any claims depending therefrom.

Referring now to FIGS. 17A-18, when included, the driver 204 for actuating the exemplary guide 196 of the bung plug engagement tool 184 may have any suitable form, configuration and operation. In many embodiments, the driver 204 is an air motor 206 having a rotatable shaft 208 operatively coupled to the upper end of the guide 196 and configured to rotate it. However, any other forms of the driver(s) 204 (e.g. pneumatic or hydraulic cylinder, servo-motor, etc.) may be used for actuating the guide 196. The exemplary driver 204 is controlled by the electronic controller 12, but may be controlled by any other component(s), one or more operators or a combination thereof.

If desired, one or more flexible couplers 212 may be coupled between the driver 204 (e.g. air motor 206) and the guide 196 to help facilitate selective movement of the guide 196, provide flexibility in engaging the bung plug engagement tool 184 with the bung plug 34, help avoid jamming or damaging the bung plug 34, the bung plug engagement tool 184 or other components and/or disrupting operations during engagement and positioning of the bung plug engagement tool 184, for any other purpose(s) or a combination thereof. When included, the flexible coupler(s) 212 may have any suitable form, configuration and operation. For example, the flexible coupler 212 may include one or more universal joints 214 disposed between the driver 204 and the guide 196. In the preferred embodiment, the flexible coupler 212 includes a universal joint 214 having an upper link 215 for engaging the shaft 208 of the driver 204 and a lower link 216 for engaging the guide 196 (e.g. control rod 198). The illustrated universal joint 214 may be configured, for example, to allow the guide 196 the ability to "flex", or pivot, around 360° up to approximately ¼" displacement relative to the vertical axis 220 of the bung plug extractor 50 and/or the drum 30. If desired, the upper end 196a (e.g. FIG. 17C) of the guide 196 may be slideable up and down within a bore 213 of the flexible coupler 212 in a limited range of motion to allow some limited up-and-down movement of the guide 196 relative thereto and to the drum 30. However, other embodiments may involve the use of one or more flexible couplers 212 (e.g. universal joints 214) or other components that allow the guide 196 to move in a range of motion less than 360° and/or more or less than ¼" displacement (e.g. ⅛", ½", ¾", 1", etc.), or do not allow flexing or up-and-down movement of the guide 196 relative to the coupler 212. Moreover, the flexible coupler(s) 212, when included, may have any other suitable form and operation. Thus, the details, nature and characteristics of the flexible coupler(s) 212 are not limiting upon the present disclosure and appended claims, except and only to the extent as may be expressly recited and explicitly required in a particular claim hereof and only for such claim(s) and any claims depending therefrom.

Figure 26:
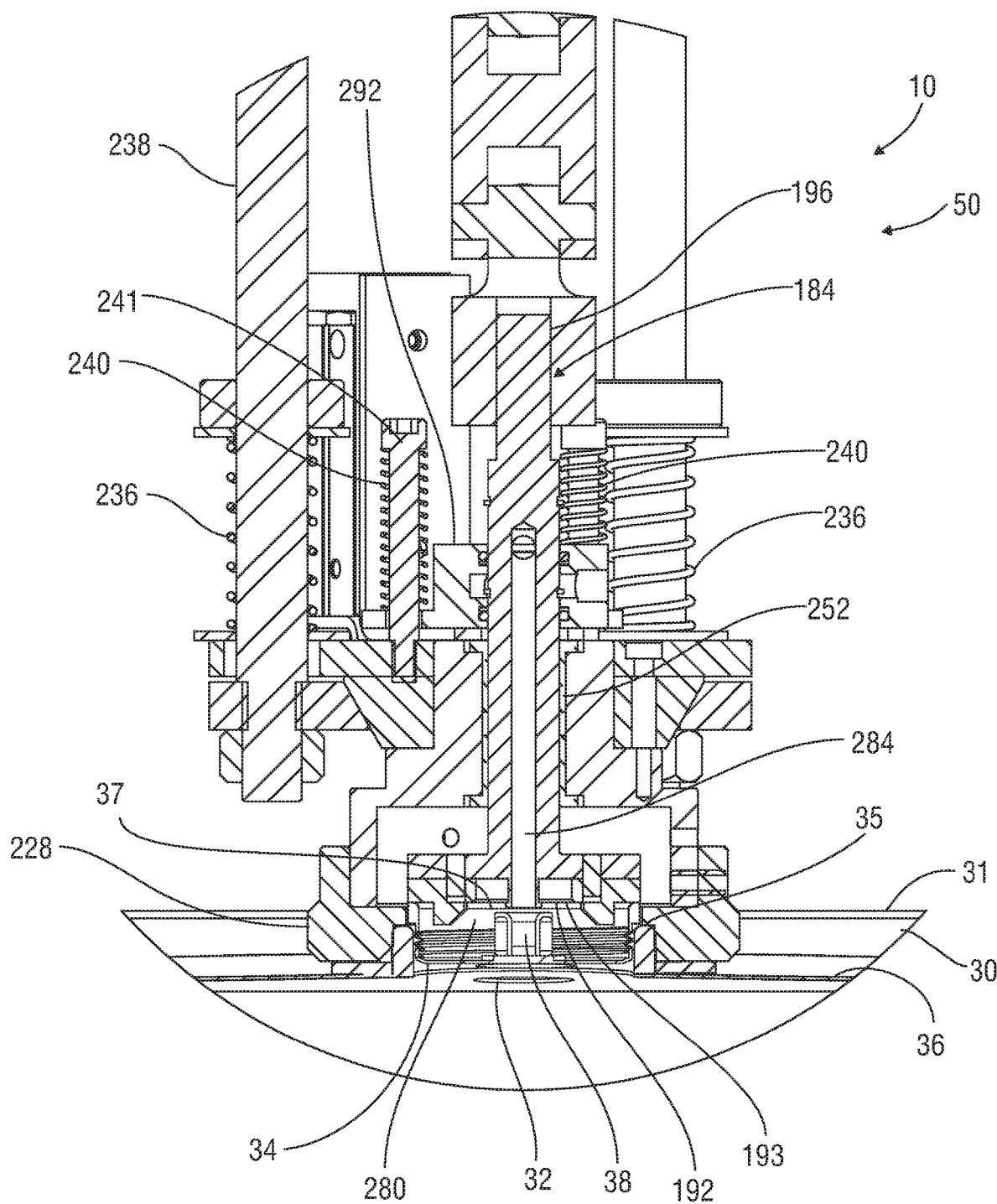
FIG. 26 is a cross-sectional view of the exemplary bung plug extractor of FIG. 17A contacting an exemplary drum and bung plug therein in accordance with one or more embodiments of the present disclosure.

Referring still to FIGS. 17A-18, the centering assembly 180, when included in the bung plug extractor 50, may have any suitable form, configuration, components and operation to assist in centering the bung plug engagement tool 184 over the bung opening 32 (e.g. FIG. 26). For example, the centering assembly 180 may include a centering collar 228 configured to at least partially surround the mating portion 192 of the bung plug engagement tool 184 and assist in positioning the bung plug engagement tool 184 over the bung plug 34 as desired. In the preferred embodiment, the mating portion 192 is essentially nested within the centering assembly 180 and the centering collar 228 substantially or entirely surrounds the mating portion 192 and is configured to rest at least partially upon, or engage, the lip 35 of the bung opening 32 (e.g. FIG. 26). When the exemplary centering collar 228 engages the lip 35 around the circumference of the bung opening 32 during normal operating conditions, the bung plug engagement tool 184 should typically be properly (e.g. perfectly) aligned over the bung plug 34 for disconnecting it from the drum 30.

Referring now to FIGS. 18 & 26, if desired, the centering collar 228 may be configured to sit substantially perfectly flat on the lip 35 of the bung opening 32 (or other part of the drum), form a partial, substantial or entire fluid-tight seal around the bung opening 32 (e.g. with the lip 35), for any other purpose(s) or a combination thereof. In some embodiments, the centering collar 228 may include a taper 229 around its inner edge 233 and/or a ledge 231 formed inwards of the inner edge 233 to match, mate with or seat around the circumference of the lip 35, such as to help the centering collar 228 sit substantially perfectly flat on the lip 35, form a substantially or entirely fluid-tight seal with the lip 35 around the bung opening 32, for any other purpose(s) or a combination thereof. In other embodiments, the centering collar 228 may engage any other part (e.g. the top 36) of the drum 30 to achieve the same or other purpose(s). Moreover, the centering collar 228 may have any other configuration and operation. Thus, the details of the construction and operation of the centering collar 228 are in no way limiting upon the present disclosure or appended claims, except and only to the extent as may be expressly recited and explicitly required in a particular claim hereof and only for such claim(s) and any claim(s) depending therefrom.

Figure 27:
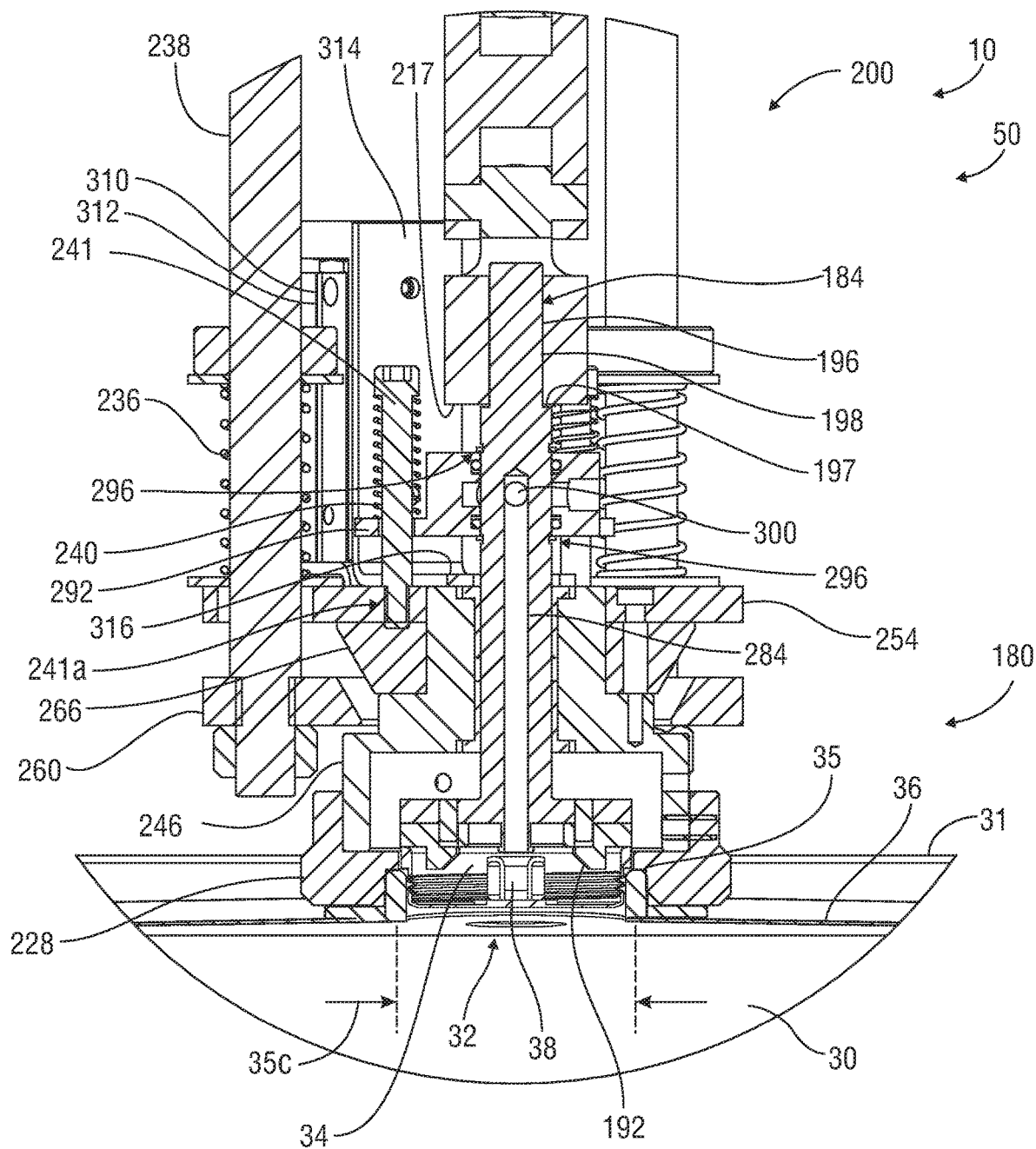
FIG. 27 is a cross-sectional view of the exemplary bung plug extractor of FIG. 17A contacting an exemplary drum and bung plug at the beginning of extraction of the bung plug in accordance with one or more embodiments of the present disclosure.

Referring to FIGS. 26 & 27, once the preferred bung plug engagement tool 184 and centering collar 228 are moved into engagement with the bung plug 34 and drum 30 (e.g. FIG. 26), respectively, the bung plug engagement tool 184 and/or centering collar 228 may be maintained in such engagement in any suitable manner. For example, the centering collar 228 and/or bung plug engagement tool 184 may be spring-biased to assist in maintaining the desired engagement. In such instances, any suitable components may be used to spring-bias the bung plug engagement tool 184 and/or centering collar 228 as desired. In the exemplary embodiment, one or more (e.g. three) of the outer springs 236 provide downward spring-biasing forces on the centering collar 228 to assist in maintaining its engagement (e.g.

contact) with the drum 30 (e.g. lip 35) during bung plug 34 removal, and one or more (e.g. three) inner springs 240 (e.g. coil spring) provide downward spring-biasing forces on the bung plug engagement tool 184 to assist in maintaining its engagement (e.g. contact) with the bung plug 34 during bung plug removal. However, in other embodiments, any other quantity and arrangement of one or more springs, or one or more than two sets of springs, or other biasing members, may be used. Moreover, some embodiments may not require any springs, biasing members and/or may include other or additional components to maintain the desired engaged relationship of the bung plug engagement tool 184 with the bung plug 34 and/or the centering collar 228 with the drum 30. For example, in some embodiments, one or more drivers (e.g. motors) may be used to retain or hold the bung plug engagement tool 184 and/or centering collar 228 in the desired engaged position(s).

Referring now to FIGS. 18, 26 & 27, in various embodiments, it may be desirable to provide limited positional flexibility (e.g. angular, up-and-down, etc.) of the centering collar 228 and/or bung plug engagement tool 184 relative to the drum 30 while seating the centering collar 228 on the drum 30 and/or bung plug engagement tool 184 on the bung plug 34. This may be desirable, for example, to allow precision in properly aligning and seating the centering collar 228 and/or bung plug engagement tool 184 to (i) improve performance of the drum manipulation system 10 (e.g. bung plug removal and installation) and/or efficiency and effectiveness of operations, (ii) assist in preventing the centering collar 228 and/or the bung plug engagement tool 184 from undesirably hitting or contacting the drum 30 or bung plug 34 and any resulting binding, jamming or damaging of components or disruption of operations, (iii) allow proper seating of the centering collar 228 and/or bung plug engagement tool 184 in imperfect situations (e.g. the drum 30 is not perfectly upright, the top 36 of the drum 30 is not perfectly horizontally-oriented or flat, the drum 30 or bung plug extractor 50 is misaligned, the drum 30 inadvertently slid or shifted position during lowering onto the drum conveyor 88), for any other purpose(s) or a combination thereof. Any suitable components may be used to allow positional flexibility of the centering collar 228 and/or bung plug engagement tool 184 relative to the drum 30. For example, the centering collar 228 and/or the bung plug engagement tool 184 may be provided with upward (or up-and-down) positional flexibility relative to the drum 30. In the preferred embodiment, the (e.g. three or more or less) outer spring(s) 236 acting upon the centering collar 228 allow limited up-and-down movement of the centering collar 228 relative to the drum 30, and the exemplary (e.g. three or more or less) inner spring(s) 240 acting upon the bung plug engagement tool 184 allow limited up-and-down movement thereof relative to the drum 30 (and centering collar 228). However, any other configuration of components (elastic members, shock absorbers, bearings, etc.) may be used to provide upward positional flexibility of the centering collar 228 and/or bung plug engagement tool 184, if this feature is included.

Still referring to FIGS. 18, 26 & 27, in some embodiments, the drum manipulation system 10 may be configured to limit the up and/or down movement of the centering collar 228 and/or the bung plug engagement tool 184 relative to other components. For example, while the upper end 196a of the exemplary guide 196 of the bung plug engagement tool 184 is moveable up and down within the bore 213 of the flexible coupler 212, the guide 196 may include a ledge 197 (or other feature) that shoulders-up against, or contacts, the lower end 217 (or other part) of the flexible coupler 212 to limit upward movement of the guide 196 and define its uppermost position relative to various other components. In the embodiment of FIG. 27, the ledge 197 of the guide 196 is shown (almost) in contact with the lower end 217 of the exemplary coupler 212. However, other embodiments may include a different mechanism to limit the upward (or downward) movement of the bung plug engagement tool 184 and/or the centering collar 228. For example, the upper end of the guide 196 may contact one or more transverse surfaces (e.g. the wall defining the upper end of the bore 213) of the flexible coupler 212.

Figure 29:
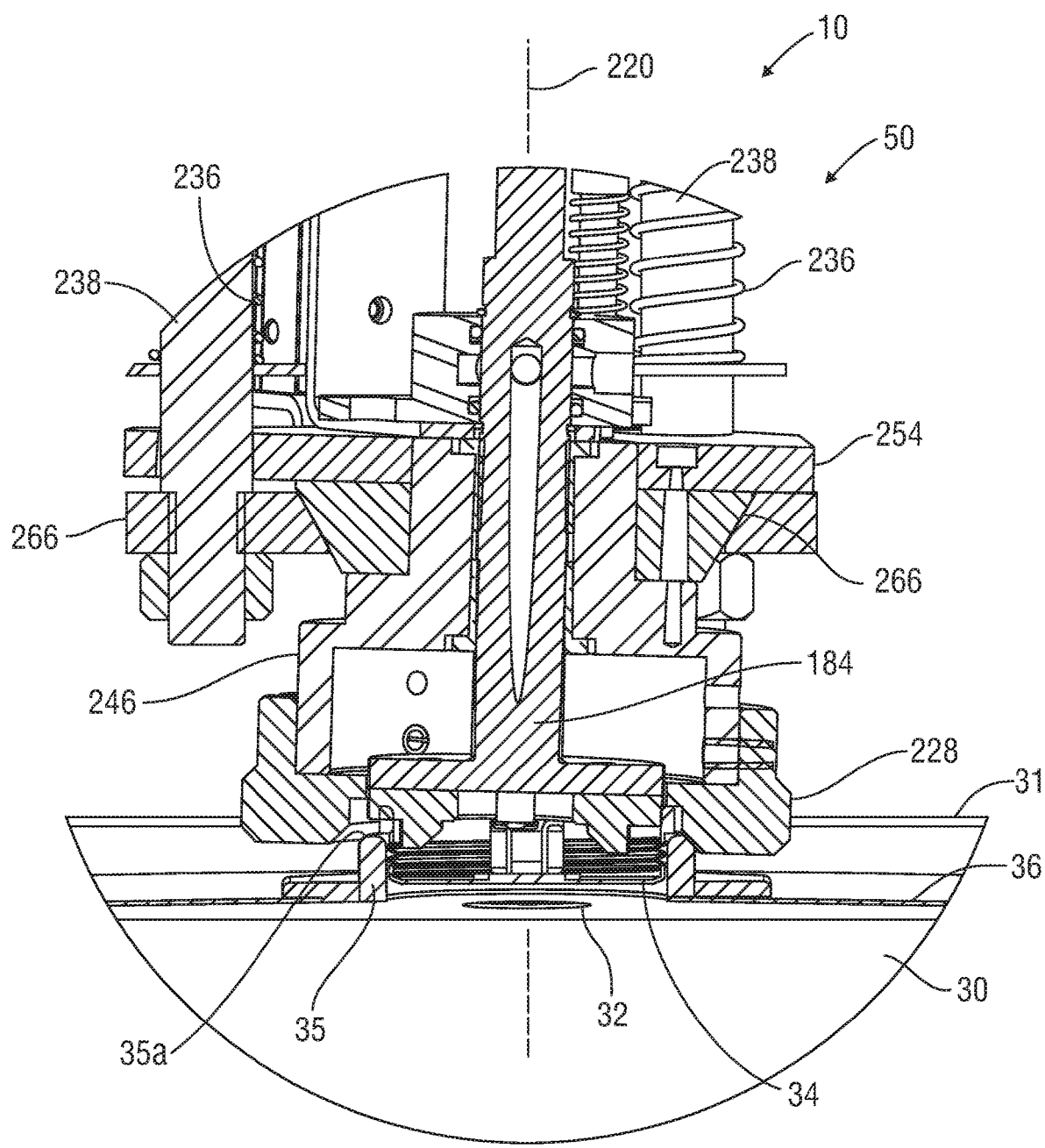
FIG. 29 is a cross-sectional view of the exemplary bung plug extractor of FIG. 17A in a misaligned position while contacting an exemplary drum and bung plug therein prior to removing the bung plug in accordance with one or more embodiments of the present disclosure.

For another example of positional flexibility, the centering collar 228 and/or bung plug engagement tool 184 may be provided with angular positional flexibility relative to the drum 30, such as to allow re-centering and/or proper alignment or seating of the centering collar 228 and/or bung plug engagement tool 184 in imperfect situations (e.g. as described above) and/or for any other purpose(s). In some embodiments, such as shown in FIGS. 17A-18, the bung plug extractor 50 is configured so that the centering collar 228 can pivot, tilt, or swivel around 360° relative to the vertical axis 220 of the bung plug extractor 50 and/or the drum 30. In the preferred embodiment, the desired angular positional flexibility of the centering collar 228 is provided by having three independently-acting outer springs 236. For example, the outer springs 236 may be evenly spaced-apart around the centering collar 228 and the vertical axis 220 of the bung plug extractor 50. The use of three independently acting (deformable) outer springs 236 may, for example, allow swiveling movement of the centering collar 228 around 360° relative to the vertical axis 220 of the bung plug extractor 50 and/or the drum 30. If desired, the exemplary bung plug extractor 50 may be configured to allow up to a certain amount (e.g. approximately ¼") of displacement due to swiveling movement of the centering collar 228 in any direction (around) 360°. In FIG. 29, for example, the bung opening 32 and lip 35 are approximately ¼" off-center relative to the exemplary bung plug extractor 50 (e.g. vertical axis 220) and the centering collar 228. In response to uneven upward forces acting upon the centering collar 228, one or more of the outer springs 236 deforms to allow the exemplary centering collar 228 (and the associated centering housing 246, centering cone 266, floating plate 254) and bung plug extraction tool 184 to re-center over and align with the bung opening 32 by swiveling, or tilting (downward to the right in the illustration) so that bung plug 34 extraction can proceed. However, other embodiments may allow the centering collar 228 to move in a range of motion less than 360° and/or more or less than ¼" movement (e.g. ⅛", ½", ¾", 1", etc.) in any or certain directions, or a combination thereof, or not allow relative angular movement of the centering collar 228.

Referring again to FIGS. 17A-18, the exemplary outer springs 236 may allow the desired angular positional flexibility of the centering collar 228 in any suitable manner and with any suitable components. In the preferred embodiment, the centering collar 228 is operatively coupled to the floating plate 254, upon which each of the illustrated outer springs 236 acts. For example, each outer spring 236 may be biased downwardly between a biasing collar 237 (or other component(s) rigidly coupled to its associated spring support rod 238) and the floating plate 254 (or one or more components (e.g. a flat washer 255) associated therewith). The exemplary floating plate 254 is able to float (up-and-down and side-to-side) independently on each spring support rod 238 within a limited range of motion between the outer springs 236 and the lower plate 260 (which is rigidly coupled to the rods 238 proximate to the lower ends 238a thereof). Thus, in the preferred embodiment, if uneven upward forces are placed upon the exemplary centering collar 228, one or more of the outer springs 236 may react, causing the floating plate 254 and attached centering collar 228 to move up or down, tilt or pivot relative to one or more of the spring support rods 238, lower plate 269, vertical axis 220 and/or drum 30 within the floating range of motion of the floating plate 254. The exemplary bung plug extractor 50 is thus configured to allow relative angular movement of the floating plate 254, centering collar 228 (and bung plug engagement tool 184, such as described below) up to ¼" displacement in any direction around the perimeter of the spring support rods 238.

However, the exemplary outer springs 236 (or other components) may allow the desired relative angular movement of the centering collar 228 in any other manner. Further, other embodiments of the bung plug extractor 50 may include more (four, five, six or more) or less (one or two) outer springs 236, one or more pairs of nested springs, or any other desired quantity and/or configuration of springs and/or other types of biasing members or other components (e.g. elastic members, swivels, bearings, etc.) to allow the desired relative angular movement or positional flexibility of the centering collar 228 and/or bung plug engagement tool 184 (e.g. more or less displacement (e.g. ¹⁄₁₆", ⅛", ½", ⅝", ¾" or more) in any desired direction and/or within any desired range of motion (e.g. more or less than)) 360°. For example, one or more swivel joints, bearings or other components may also, or instead, allow the desired relative angular movement of the centering collar 228 and/or bung plug engagement tool 184. However, in some embodiments, relative angular movement of the centering collar 228 and/or bung plug engagement tool 184 may not be provided. Thus, the details, nature, characteristics and operation of the components of the bung plug extractor 50 are not limiting upon the present disclosure and appended claims, except and only to the extent as may be expressly recited and explicitly required in a particular claim hereof and only for such claim(s) and any claims depending therefrom.

Referring now to FIG. 18, if desired, the bung plug engagement tool 184 may be configured to move in substantial unison with the centering collar 228 in relative angular movement (e.g. as described above) to allow angular positional flexibility of the bung plug engagement tool 184 relative to the drum 30. Concurrent relative angular movement of the tool 184 and centering collar 228 may be provided in any suitable manner. In the preferred embodiment, the bung plug engagement tool 184 is operatively coupled to the centering collar 228 with respect to relative angular movement. When this feature is included, the bung plug engagement tool 184 may be operatively coupled to the centering collar 228 in any suitable manner. In the preferred embodiment, a centering housing 246 is coupled to and extends at least partially between the floating plate 254 and the centering collar 228. The centering housing 246, when included, may have any suitable form, configuration and operation. For example, the illustrated centering housing 246 includes a central bore 248 through which the guide 196 of the bung plug engagement tool 184 extends and is freely slideable up and down. In the preferred embodiment, the central bore 248 of the exemplary centering housing 246 may be sized so that the guide 196 fits snugly therein (e.g. with minimal or no side-to-side movement of the guide 196 relative to the centering housing 246) to allow the bung plug engagement tool 184 to move concurrently with the centering housing 246 in swiveling movement and vice versa. If desired, one or more bushing assemblies 252 (or other components) may be associated with the bore 248 and/or centering housing 246 to assist in reducing frictional wear of the guide 196 and/or centering housing 246 as the guide 196 moves up and down relative thereto, for any other purpose(s) or a combination thereof.

It should be noted that the swiveling movement of the centering collar 228 and the bung plug engagement tool 184 may be limited by the flexible coupler 212, when included, acting on the bung plug engagement tool 184 (e.g. as described above) and/or any other components. In the preferred embodiment, the concurrent swiveling movement of the exemplary centering collar 228 and bung plug engagement tool 184 is limited by both the relevant range of motion of the exemplary floating plate 254 and its connected components and the exemplary universal joint 214. However, any other configuration of components (e.g. swivel joints) may be provided to allow concurrent swiveling movement of the bung plug engagement tool 184 and the centering collar 228. Thus, the details of the construction and operation of the components described and shown herein to allow concurrent swiveling movement of the bung plug engagement tool 184 and the centering collar 228 are in no way limiting upon the present disclosure or appended claims, except and only to the extent as may be expressly recited and explicitly required in a particular claim hereof and only for such claim(s) and any claim(s) depending therefrom.

Figure 30:
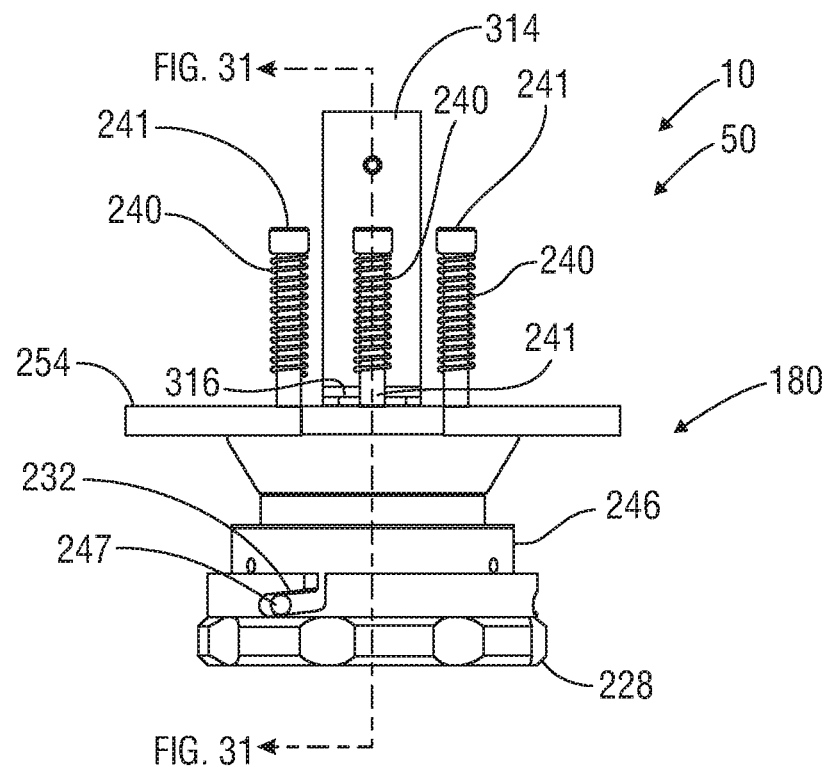
FIG. 30 is an isolated side view of certain components of the exemplary bung plug extractor of FIG. 17A including an exemplary bung plug retraction actuator in accordance with one or more embodiments of the present disclosure.
Figure 31:
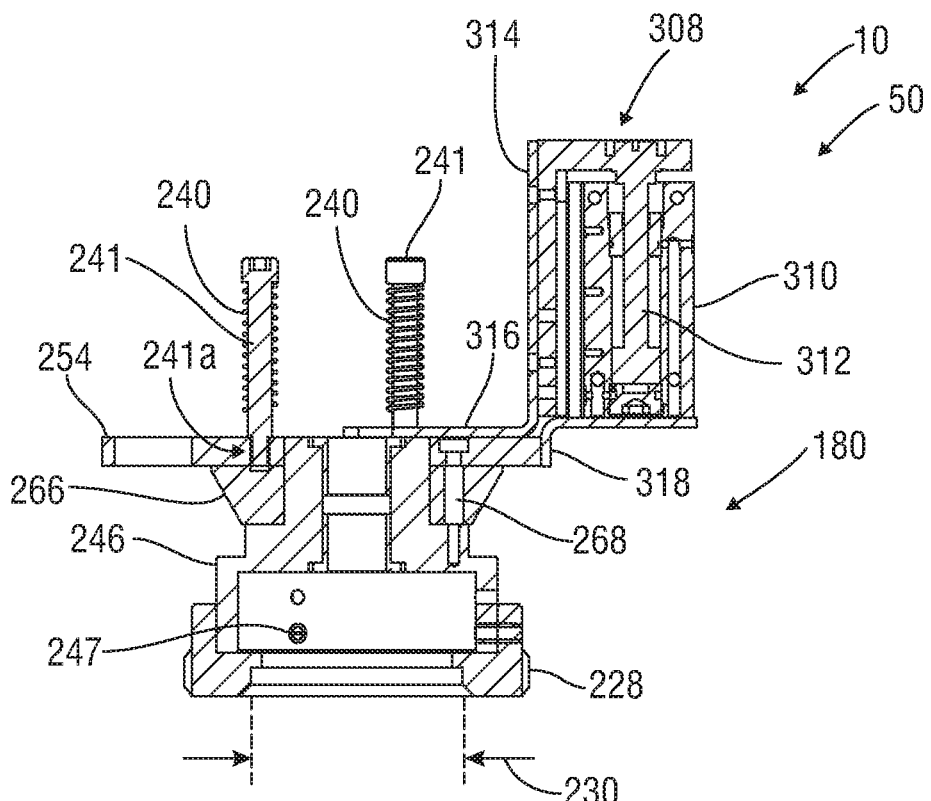
FIG. 31 is a cross-sectional view of the exemplary bung plug extractor components shown in FIG. 30 taken along lines FIG. 31-FIG. 31.

Referring now to FIGS. 30-32, the centering collar 228 may be rigidly, releasably coupled to the centering housing 246, such as for removal and replacement of the centering collar 228 due to wear or breakage, to switch out the centering collar 228 to match its inner diameter 230 with the diameter 35c (e.g. FIG. 28) of the lip 35 of the particular drum's bung opening 32, for any other purpose(s) or a combination thereof. In the preferred embodiment, the centering housing 246 includes one or more keys 247 that slideably, releasably, lockingly engage a respective locking groove 232 in the centering collar 228. However, any other arrangement of parts may be used to releasably couple the centering collar 228 and the centering housing 246, when included, or they may be non-releasably or non-rigidly coupled together or integrally formed.

Referring back to FIG. 18, if desired, the centering assembly 180 may include one or more centering cones 266 (or other component(s)) useful to assist in centering the centering collar 228 and bung plug engagement tool 184 relative to the vertical axis 220 of the bung plug extractor 50 and/or the drum 30 at any desired time, for any other purposes or a combination thereof. The centering cone 266, when included, may have any suitable form, configuration, components and operation. In the preferred embodiment, the centering cone 266 is configured to assist (e.g. along with the outer springs 236) in realigning or positioning the centering collar 228 and bung plug engagement tool 184 in their "home" positions (e.g. centered on the vertical axis 220 of the bung plug extractor 50 and/or the drum 30) when the bung plug extractor 50 is not engaged with a drum 30. For example, the centering cone 266 may be cone-shaped and rigidly releasably coupled (e.g. sandwiched) between the floating plate 254 and the centering housing 246. Referring to FIG. 32, if desired, one or more couplers 268 (e.g. screws) may connect the exemplary floating plate 254 (e.g. via holes 258) to the centering housing 246 (e.g. via holes 251) and extend through respective passages 270 in the centering cone 266. In the preferred embodiment, the couplers 268 include three screws. In other embodiments, any desired quantity (e.g. one, two, four, five, six, etc.) and form (e.g. clip, pin, rod, etc.) of couplers 268 or other connection components may be used.

Referring now to FIGS. 18 & 32, the exemplary centering cone 266 includes a central bore 272 that extends around a neck 249 of the centering housing 246. In this embodiment, an angled outer circumferential surface 276 of the illustrated centering cone 266 is configured to seat within a complimentary-angled inner diameter 262 of a central bore 264 formed in the lower plate 260 (e.g. in a preferred "home" position). Thus, the exemplary centering cone 266 will typically ensure that the centering collar 228 and bung plug engagement tool 184 are precisely aligned in their respective home positions, for example, prior to the start of bung plug 34 removal operations. However, the centering cone 266 may have any other shape (non-conical), be constructed of multiple components and operate in any other suitable manner. In some embodiments, the centering cone 266 may not be included, or one or more additional or different components may be used to help center the centering collar 228 and bung plug engagement tool 184 as desired. Thus, the details of the construction and operation of the centering cone 266 and related components as provided herein are in no way limiting upon the present disclosure or appended claims, except and only to the extent as may be expressly recited and explicitly required in a particular claim hereof and only for such claim(s) and any claim(s) depending therefrom.

Figure 28:
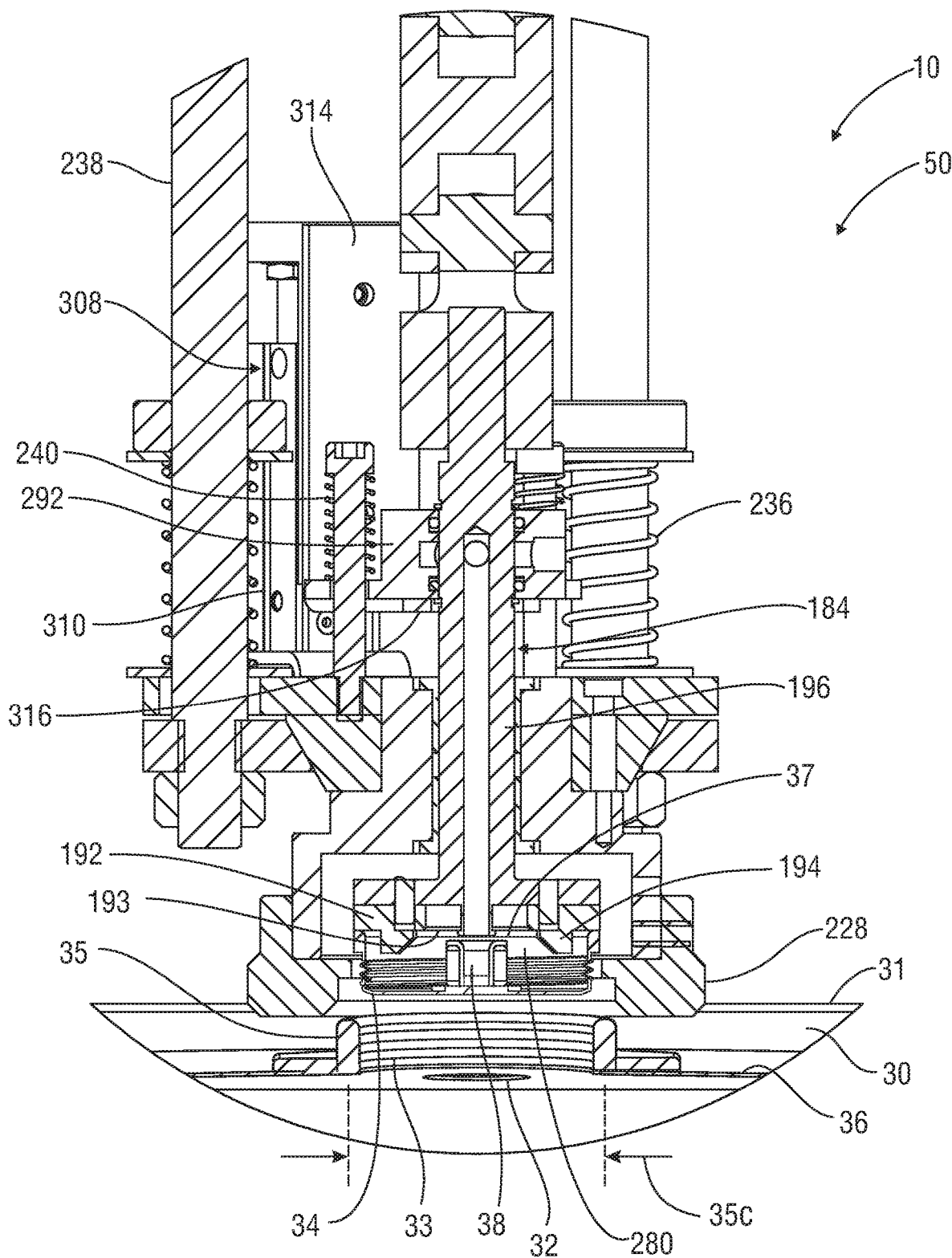
FIG. 28 is a cross-sectional view of the exemplary bung plug extractor of FIG. 17A being lifted away from the exemplary drum after removing the exemplary bung plug therefrom in accordance with one or more embodiments of the present disclosure.

Referring now to FIGS. 26-28, the bung plug extractor 50 may be configured to remove the bung plug 34 once it is disconnected from the drum 30. If this feature is included, any suitable arrangement of components and technique(s) may be used. For a few examples, the bung plug extractor 50 may utilize one or more cups, grippers, claws, tongs, magnets or any other mechanical or other components to physically or otherwise engage or grab the bung plug 34 or allow it to be moved away from the drum 30. For another example, suction may be used to effectively lock onto or grab the disconnected bung plug 34 and allow it to be moved away from the bung opening 32.

In the preferred embodiment, the drum manipulation system 10 is configured to provide air suction inside one or more vacuum spaces 280 formed between the mating portion 192 of the bung plug engagement tool 184 and the bung plug 34 (see also FIG. 18). For example, a vacuum may be provided in the vacuum space 280 through one or more air passageways 284 formed in, or extending at least partially through, the bung plug engagement tool 184 sufficient to lift the disconnected bung plug 34 (e.g. edge 37) up and at least partially against or proximate to the face 193 of the mating portion 192 (or other part(s)) of the bung plug engagement tool 184 and carry it with the bung plug engagement tool 184 away from the drum 30. In this manner, the bung plug 34 is "grabbed" or "carried" by the exemplary bung plug engagement tool 184. However, in other embodiments, suction may be created in a different space or between the bung plug 34 and another component of the bung plug extractor 50 to releasably engage, hold or carry the bung plug 34 for removal, or may not be included. For example, the bung engagement tool 184 of FIG. 21 includes a vacuum cup 274 for grabbing the bung plug 34 (e.g. plastic plug 34b, FIG. 5) in various scenarios (e.g. when manipulating a polyethylene drum 30).

Referring now to FIGS. 18 & 27, in the preferred embodiment, a vacuum may be provided through the air passageway(s) 284 of the bung plug engagement tool 184 to the vacuum space 280 (or other desired location) in any suitable manner. For example, one or more vacuum sources 288 (e.g. air compressors, vacuum generators, vacuum pumps) may be releasably fluidly coupled (e.g. via one or more hoses 289) directly to the bung plug engagement tool 184. For another example, the vacuum source(s) 288 may be coupled (e.g. via one or more hoses 289) to a vacuum housing 292 which is fluidly coupled to the air passageway(s) 284 of the bung plug engagement tool 184. In some embodiments, the drum manipulation system 10 may include an internal vacuum source or may be coupled to an external vacuum source. In FIG. 1C, the vacuum source is a vacuum generator 290 (shown with a vacuum gauge 291). If desired, the vacuum source(s) 288 and/or other vacuum-related components may be selectively actuated by the controller 12, but could instead or also be actuated by one or more operators, the driver 204 (e.g. FIG. 17A), other component(s) of the drum manipulation system 10 or a combination thereof. In some embodiments, the vacuum source may be large capacity (e.g. up to 60 cfm) to pull sufficient volume of air to lift the bung plug 34 (e.g. when a complete fluid tight seal is not formed around the vacuum space 280). If desired, one or more filters 293 (e.g. FIG. 1C) may be provided at one or more locations in the vacuum path to prevent metal shavings (e.g. created during rotation of the bung plugs 34) or other debris from entering the vacuum source(s) 288 or other components, for any other purpose(s) or a combination thereof. In the preferred embodiment, at least one filter 293 (e.g. FIG. 1C) is provided on the inlet side of the vacuum source(s) 288 to prevent debris from entering.

Still referring to FIGS. 18 & 27, when included, the vacuum housing 292 may have any suitable form, configuration, components and operation. In the preferred embodiment, the vacuum housing 292 is a sliding flange, collar, or sleeve, 294 (e.g. FIG. 33) rigidly releasably coupled (e.g. via snap, or retainer, rings 296) to the guide 196 of the bung plug engagement tool 184 above the floating plate 254. The exemplary vacuum housing 292 includes at least one fluid flow passage 300 fluidly coupling the air passageway 284 of the bung plug engagement tool 184 and the vacuum source 288. If desired, the vacuum housing 292 may be spring-biased downwardly by the inner spring(s) 240 and moveable with the guide 196. For example, each inner spring 240 may be provided around a respective inner spring rod, or linear bearing shaft, 241 extending through the vacuum housing 292 and anchored, at its lower end 241a, to the floating plate 254 (see e.g. FIGS. 30-31). While three inner springs 240 are shown, any other quantity (one, two, four or more) of inner springs 240 (or other biasing components) may be included. The exemplary vacuum housing 292 and bung engagement tool 184 are thus concurrently moveable up and down relative to the inner spring rods 241, floating plate 254, lower plate 260, centering cone 266, centering housing 246, centering collar 228 and drum 30. However, the vacuum housing 292 may have any other configuration and may be fluidly coupled between one or more vacuum sources 288 and the bung plug engagement tool 184 and/or moveable relative to any combination of components in any other suitable manner (e.g. without the use of inner springs 240) or not at all. Thus, the details of the construction and operation of the vacuum housing 292 and other components and techniques described and shown herein to provide a vacuum for lifting or otherwise engaging the bung plug 34 are in no way limiting upon the present disclosure or appended claims, except and only to the extent as may be expressly recited and explicitly required in a particular claim hereof and only for such claim(s) and any claim(s) depending therefrom.

Referring now to FIGS. 17A & 28, once the disconnected bung plug 34 has been grabbed by the exemplary bung plug engagement tool 184 or other component (e.g. the vacuum has been actuated and the bung plug 34 sucked up to the exemplary bung plug engagement tool 184), the bung plug extractor 50 and bung plug 34 may be selectively moved away from the drum 30. Before shuttling away the entire bung plug extractor 50, it may be desirable to initially retract, or move the bung plug 34 (e.g. straight up) away from the drum 30 and clear of the bung opening 32 to avoid knocking or tapping the bung plug 34 against the lip 35, or receiving threads 33 of the bung opening 32, or other part of the drum 30. Such event could, for example, release the suction of the vacuum (when included) and/or otherwise cause the bung plug 34 to drop from the bung plug engagement tool 184, interrupt or inhibit further operations, or cause other undesirable consequences. In the preferred embodiment, the drum manipulation system 10 is configured to initially retract the vacuum housing 292 and bung plug engagement tool 184 up (e.g. approximately 1.0", or more or less) away from the drum 30 against the downward biasing forces of the inner springs 240 before shuttling the bung plug extractor 50 away from the drum 30. For example, the vacuum housing 292 and bung plug engagement tool 184 may be initially moved up by a bung plug retraction actuator 308.

When included, the bung plug retraction actuator 308 may have any suitable form, configuration, components and operation sufficient to raise-up the vacuum housing 292, bung plug engagement tool 184 (and/or other components) and bung plug 34 clear of the bung opening 32 and drum 30. For example, referring to FIGS. 28 & 31, the actuator 308 may be a pneumatic or hydraulic cylinder 310 having an up-and-down moving piston 312 associated with the vacuum housing 292 and/or bung plug engagement tool 184 and configured to move it/them up as desired. In the preferred embodiment, a bracket 314 (e.g. L-bracket) extends outwardly from the piston 312 and is positioned to engage the vacuum housing 292 and/or bung plug engagement tool 184 (see also FIG. 32). For example, the bracket 314 may have a fork-shaped, U-shaped or similarly-shaped base 316 that at least partially straddles, or extends around, the guide 196 of the bung plug engagement tool 184 below the vacuum housing 292 (e.g. FIG. 17B). The illustrated bracket 314 is rigidly releasably coupled to the piston 312, but could instead be integrally formed therewith, or non-rigidly or non-releasably coupled thereto. The exemplary bracket 314 is selectively moveable up by the piston 312 to drag the exemplary vacuum housing 292 (bung plug engagement tool 184 and bung plug 34) up the desired distance to clear the disconnected bung plug 34 away from the drum 30.

Referring to FIGS. 27 & 31, if desired, a "start" or "home" position of the exemplary piston 312 and connected bracket 314 may be a down position relative to the bung plug engagement tool 184 so that the bracket 314 is out of the way of the bung plug engagement tool 184 and will not interfere with the action of the bung plug engagement tool 184 during disengagement of the bung plug 34 from the drum 30 and/or for any other purposes. After the bung plug 34 has been disconnected and grabbed by the exemplary bung plug engagement tool 184, the illustrated piston 312 may be selectively moveable up such as described above and thereafter selectively movable down. In the preferred embodiment, the actuator 310 is anchored to the side of the floating plate 254, such as via a connection plate 318 (e.g. FIG. 32), but could be mounted elsewhere as desired. Moreover, the bung plug retraction actuator 308 may have any other form, components and operation to selectively move the bung plug engagement tool 184 and bung plug 34 away from the drum 30 as desired. In some embodiments, particularly those not utilizing a vacuum housing 292, the bung plug retraction actuator 308 may be configured to directly move the bung plug engagement tool 184 and/or bung plug 34 away from the drum 30 (e.g. without the use of a vacuum housing 292), or may not be included. Moreover, any other suitable components and techniques (e.g. mateable engagement, gripping engagement, etc.) may be used to selectively move the bung plug 34 away from the drum 30. Thus, the details of the construction and operation of the components and techniques described and shown herein to initially move the engaged bung plug 34 away from the drum 30 are in no way limiting upon the present disclosure or appended claims, except and only to the extent as may be expressly recited and explicitly required in a particular claim hereof and only for such claim(s) and any claim(s) depending therefrom. Further, the bung plug extractor 50 may have any other suitable form configuration, components and operation. For example, the bung plug extractor 50 may incorporate or use any part, or all of, the apparatus and techniques disclosed in German Patent Pub. No. DE3715795A1 to Feige published on Nov. 24, 1988 and German Patent Pub. No. DE3715795C2 to Feige published on Nov. 22, 1990, both from German Patent App No. DE19873715795 filed on May 12, 1987 and entitled "Screwing Device for the Screw-in Lids of Barrel Bungholes", all the details and contents of which are hereby incorporated by reference herein in their entireties.

Referring back to FIGS. 1A-2, after the bung plug 34 has been disconnected from the drum 30 by the exemplary bung plug extractor 50 (and, if desired, initially cleared of the bung opening 32), the bung plug extractor 50 and/or bung plug 34 may be moved away from the drum 30, or the drum 30 moved away therefrom. In some embodiments, a separate mechanism may remove the bung plug 34 from the bung plug extractor 50. In the preferred embodiment, the bung plug extractor 50 carries the bung plug 34 away from the drum 30. For example, the bung plug 34 may be carried away from the drum 30 by the bung plug extractor 50 (e.g. by maintaining suction) as the bung plug extractor 50 is shuttled, or retracted, away from the drum 30. In such instances, the bung plug extractor 50 may be selectively moveable away from the drum 30 in any suitable manner. For example, one or more drivers 46 may be operatively coupled to the bung plug extractor 50 and, if desired, electronically coupled to electronic controller 12, for selectively moving the bung plug extractor 50 in one or more linear, arc-like and/or angular paths back and forth between positions, similarly as described above. In the preferred embodiment, the bung plug extractor 50 is typically moveable between operating and home positions by the second driver 46b in a vertical path (up clear of the drum 30), then by the first driver 46a in a linear path sideways (e.g. horizontally) away from the drum 30. However, in other embodiments, the bung plug extractor 50 may be moveable away from the drum 30 in any other desired manner, along a single path or one or more non-linear paths (e.g. an arc-like motion, angular motion, etc.), with the use of any other form or combination of driver(s) or other components controlled by the controller 12, other component(s) (e.g. sensor(s)), one or more operators or a combination thereof.

Figure 34:
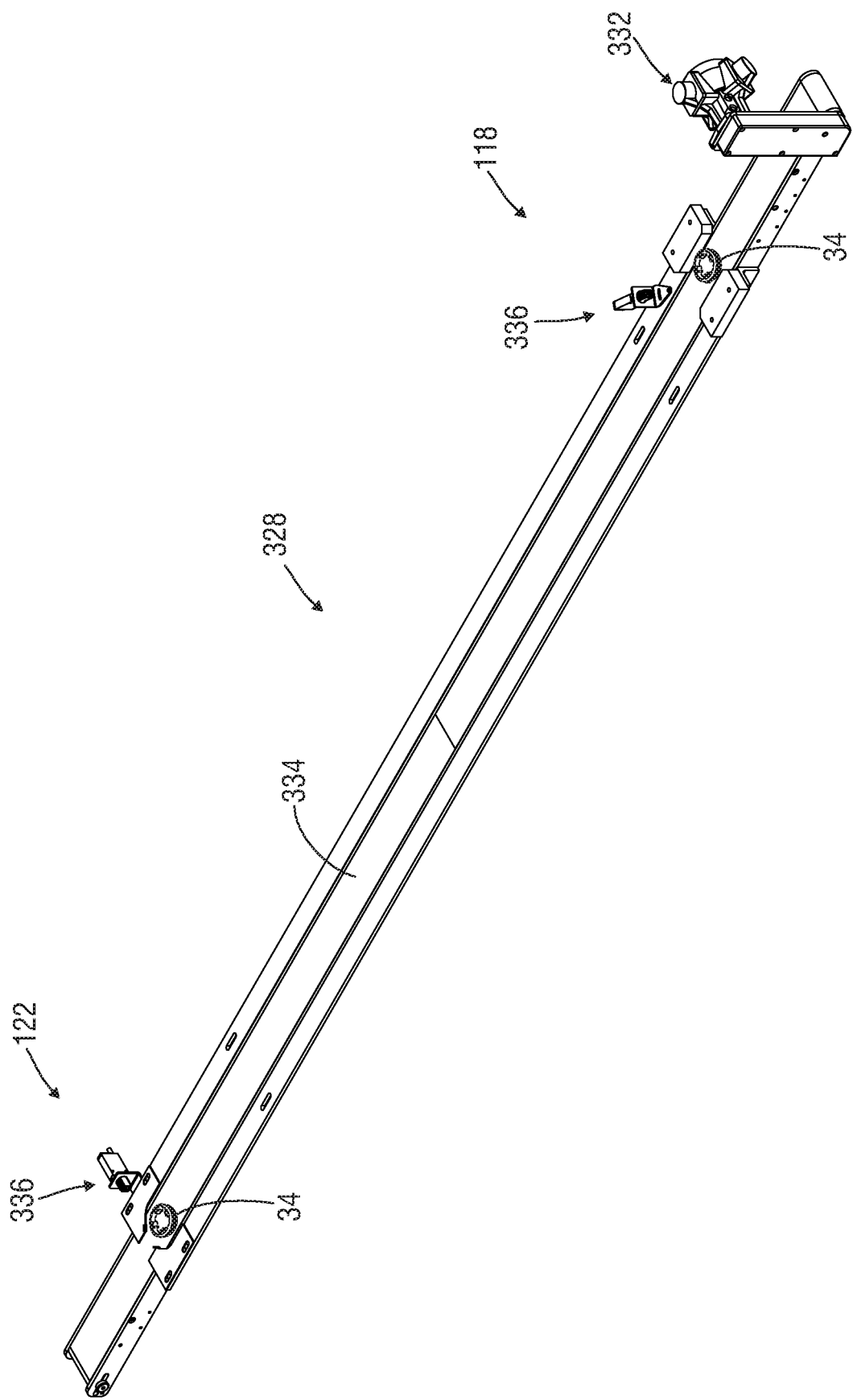
FIG. 34 is a perspective view of the bung plug conveyor shown in FIG. 1A in accordance with one or more embodiments of the present disclosure.

Referring to FIGS. 1A & 34, during retraction of the exemplary bung plug extractor 50, the bung plug 34 may, if desired, be moved to a desired location for storage, disposal, reuse or any other purpose, or may be retained by the bung plug extractor 50 or other component(s). For example, the bung plug 34 may be moved to a location when it can be re-engaged with the same (or a different) drum 30. In the preferred embodiment, the bung plug extractor 50 is configured to be selectively actuated to drop, or place, the bung plug 34 on a bung plug conveyor 328. For example, after moving the bung plug extractor 50 up, the bung plug extractor 50 may be moved initially in a rearward horizontal path (toward the rear side 106 of the drum manipulation system 10) away from the drum 30 to a position over the bung plug conveyor 328 to allow the bung plug 34 to be released onto the bung plug conveyor 328. In some embodiments, the bung plug extractor 50 may then be moved down to place the bung plug 34 on the bung plug conveyor 328. For example, once the exemplary bung plug extractor 50 is in a down position over the bung plug conveyor 328 (e.g. with the bung plug 34 resting on the bung plug conveyor 328), the vacuum may be de-actuated to release suction, or reversed to provide air pressure out of the bung plug engagement tool 184, to ensure timely release of the bung plug 34, hold the bung plug 34 in position on the bung plug conveyor 328 as the bung plug extractor 50 is then lifted up away from the bung plug conveyor 328 and drum 30 (e.g. to a home position), for any other suitable purpose(s) or a combination thereof. After clearing the bung plug 34 and bung plug conveyor 328, the vacuum may be turned off. However, any other technique or sequence may be used.

Still referring to FIGS. 1A & 34, the exemplary bung plug conveyor 328 is configured to convey the bung plug 34 to a location where it can later be picked up and re-engaged with the same drum 30. For example, the illustrated bung plug conveyor 328 may be configured to convey the bung plug 34 to a position adjacent to a third (e.g. bung plug installation) station 122 of the drum manipulation system 10 (or drum filing system 70). However, the bung plug conveyor 328 may move the extracted bung plugs 34 to a different destination. Moreover, the extracted bung plug 34 may instead be deposited onto, or into, a different type of device (e.g. vibratory bung plug feeder, disposal bin) for reuse or disposal or any other purpose.

When included, the bung plug conveyor 328 may have suitable form, configuration, components and operation. For example, the bung plug conveyor 328 may include a mini-mover belt 334 (e.g. 2.9" wide or more or less) configured to be selectively actuated by any suitable driver 332, such as an electric motor. If desired, the driver 332 may be electronically coupled to the controller 12 or other component of the drum manipulation system 10 for selective control thereof. In the preferred embodiment, the exemplary bung plug conveyor 328 is formed with a length suitable to transport the removed bung plugs 34 one-at-a-time in a linear path from the first station 118 to the third station 122 (e.g. 40", or more or less) and positioned rearward of (e.g. and parallel to) the drum conveyor 88 proximate to the rear side 106 of the drum manipulation system 10. One or more sensors 336 (e.g. photo-eye sensors) may be used to detect the presence of a bung plug 34 at each desired location on the bung plug conveyor 328. However, the bung plug conveyor 328 may have any other configuration, location and operation and the bung plugs 34 may be deposited thereon (and/or removed therefrom, such as described below) in any other suitable sequence or manner. Thus, the details of the construction and operation of the bung plug conveyor 328 and other components and techniques described and shown herein relating to the disposition of the removed bung plug 34 are in no way limiting upon the present disclosure or appended claims, except and only to the extent as may be expressly recited and explicitly required in a particular claim hereof and only for such claim(s) and any claim(s) depending therefrom.

Referring to FIGS. 1A & 28, if desired, the bung plug 34 may be placed on the exemplary bung plug conveyor 328 in a particular orientation and/or with the bung plug engagement tool 184 in a particular position so that the exemplary bung plug installer 60 (or other component) can later engage or pick up the bung plug 34, for any other purpose(s) or a combination thereof. For example, the tabs 194 of the mating portion 192 of the illustrated engagement tool 184 of the bung plug extractor 50 (e.g. FIG. 28) and bung plug installer 60 (e.g. FIG. 39) may be specifically oriented at or near the same positions when the bung plug 34 is placed on and removed from the bung plug conveyor 328, respectively. In embodiments of bung plug engagement tool 184 having first and second tabs 194, for one example, the tabs 194 may be positioned at, or near, respective three o'clock and nine o-clock (or any other desired) positions relative to the front side 104 of the drum manipulation system 10 for plug drop-off and pick-up. Similarly, or alternately, when a bung plug 34 having protrusions 38 is used, the bung plug 34 (e.g. FIGS. 4, 5) may be placed on the bung plug conveyor 328 with the protrusions 38 in a particular orientation. For one example, in situations using bung plugs 34 having first and second protrusions 38 (e.g. bung plug 34a, FIG. 4), the protrusions 38 may be specifically oriented at, or near, respective six o-clock and twelve o-clock (or any other desired) positions relative to the front side 104 of the drum manipulation system 10 when the bung plug 34 is placed on and removed from the bung plug conveyor 328. This would allow the bung plug engagement tool 184 of the exemplary bung plug installer 60 (e.g. FIG. 39), as described further below, to later be oriented in approximately the same position as the bung plug engagement tool 184 of the bung plug extractor 50, such as to efficiently and effectively pick up the bung plug 34, avoid the exemplary tabs 194 (or other part of the bung plug installer 60) from undesirably hitting the protrusions 38 (or other part of the bung plug 34) and/or preventing the creation of sufficient suction to pick up the bung plug 34 or otherwise hinder the ability of the bung plug installer 60 to grab the bung plug 34 and/or for any other purpose(s). However, any other orientation of the protrusions 38 or other part(s) of the bung plug 34 and/or the tabs 194 (or other part(s)) of the respective bung plug engagement tools 184 of the bung plug extractor 50 and bung plug installer 60 or techniques may be used to selectively position the bung plug 34 on the bung plug conveyor 328 or otherwise assist the bung plug installer 60 in picking up the plug 34 from the bung plug conveyor 328, when this capability is included.

Referring back to FIGS. 1A-2, after the bung plug 34 is removed from a "first" drum 30 (e.g. and the bung plug extractor 50 and bung plug 34 are moved away), the first drum 30 may be further manipulated as desired (e.g. inspected, filled, cleaned, modified, etc.). In the preferred embodiment, the first drum 30 is moved to the second station 120. For example, retraction of the bung plug extractor 50 away from the first drum 30 or other event may cause the drum conveyor 88 to move it to the second station 120 (e.g. at the direction of the controller 12, other components(s) or operator(s)). As the first drum 30 is transported away from the exemplary first station 118, one or more sensors 93 or other component(s) may be configured to detect the arrival of the first drum 30 at a particular position along the length of the drum conveyor 88 that represents the second station 120 and cause the drum conveyor 88 to stop, or otherwise deposit the first drum 30 at that location. In the preferred embodiment, upon detection of the first drum 30 at the desired position, one or more sensors 93 or other component(s) signal the electronic controller 12, which signals the drum conveyor 88 to stop moving. However, in other embodiments, the sensor(s) 93, or other component(s), may directly cause the drum conveyor 88 to stop or may not be included. Some embodiments may not involve movement of the drum 30 between multiple stations. For example, all of the drum manipulation activities may occur at only one station.

Still referring to FIGS. 1A-2, if desired, a second drum 30 may be deposited or provided on the drum conveyor 88 behind the first drum (e.g. at or near the entrance end 100 of the drum manipulation system 10 and/or drum filling system 70), so that movement of the first drum 30 to the exemplary second station 120 will concurrently move the second drum 30 to the first station 118 (e.g. for removal of the bung plug 34 therefrom). Thereafter, the desired drum manipulation operations (if any) at the respective stations 118, 120 may be performed to both the first and second drums 30. A third drum 30 may be similarly added and moved to the first station 118 as the first drum 30 moves to the third station 122 and the second drum moves to the second station 120 for drum manipulations operations there (if any), then a fourth drum 30, and so on. In the preferred embodiment, any desired quantity of drums 30 may be subsequently added and moved in unison (spaced apart appropriately) to each successive station, then out of the drum manipulation system 10 (and drum filling system 70) at the exit end 102 in an "assembly-line" style of continuous processing.

In the illustrated drum manipulation system 10 (and/or drum filling system 70), the second station 120 involves the filling of the drum 30 with liquid by the drum filler 74. However, any other activity or no activity may take place at the second station 120. After the desired activity or inactivity at the second station 120, or otherwise whenever desired, the exemplary bung plug installer 60 may be used to attach a bung plug 34 to the bung opening 32 of the subject drum 30. In this embodiment, the drum 30 is moved to the third station 122 (e.g. similarly as described above with respect to movement of the drum 30 from the first station 118 to the second station 120) for installation of a bung plug 34. However, in other embodiments, the bung plug installer 60 may attach a bung plug 34 to the drum 30 at the second station 120 (the first station, any other station or location).

Figure 35:
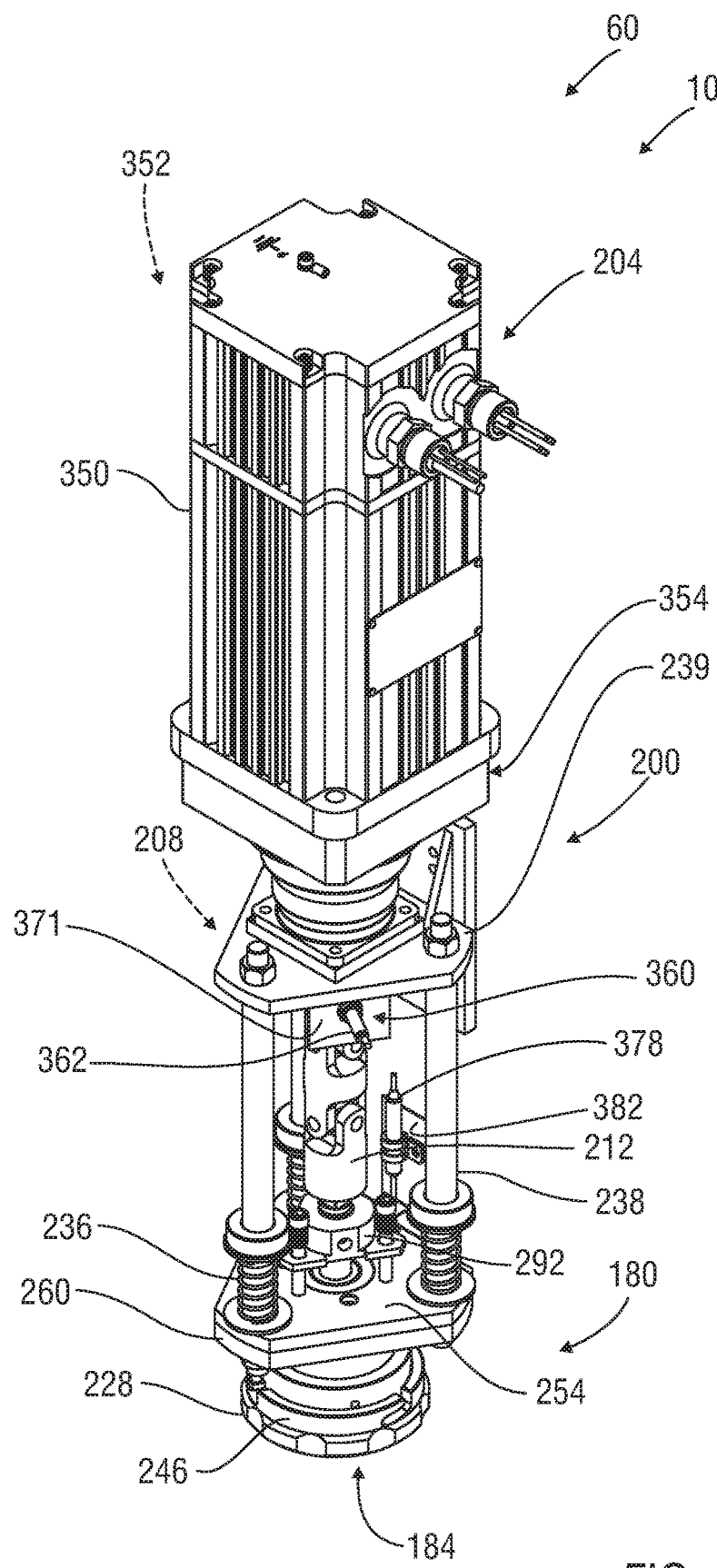
FIG. 35 is a perspective view of the exemplary bung plug installer shown in FIG. 1A in accordance with one or more embodiments of the present disclosure.
Figure 36:
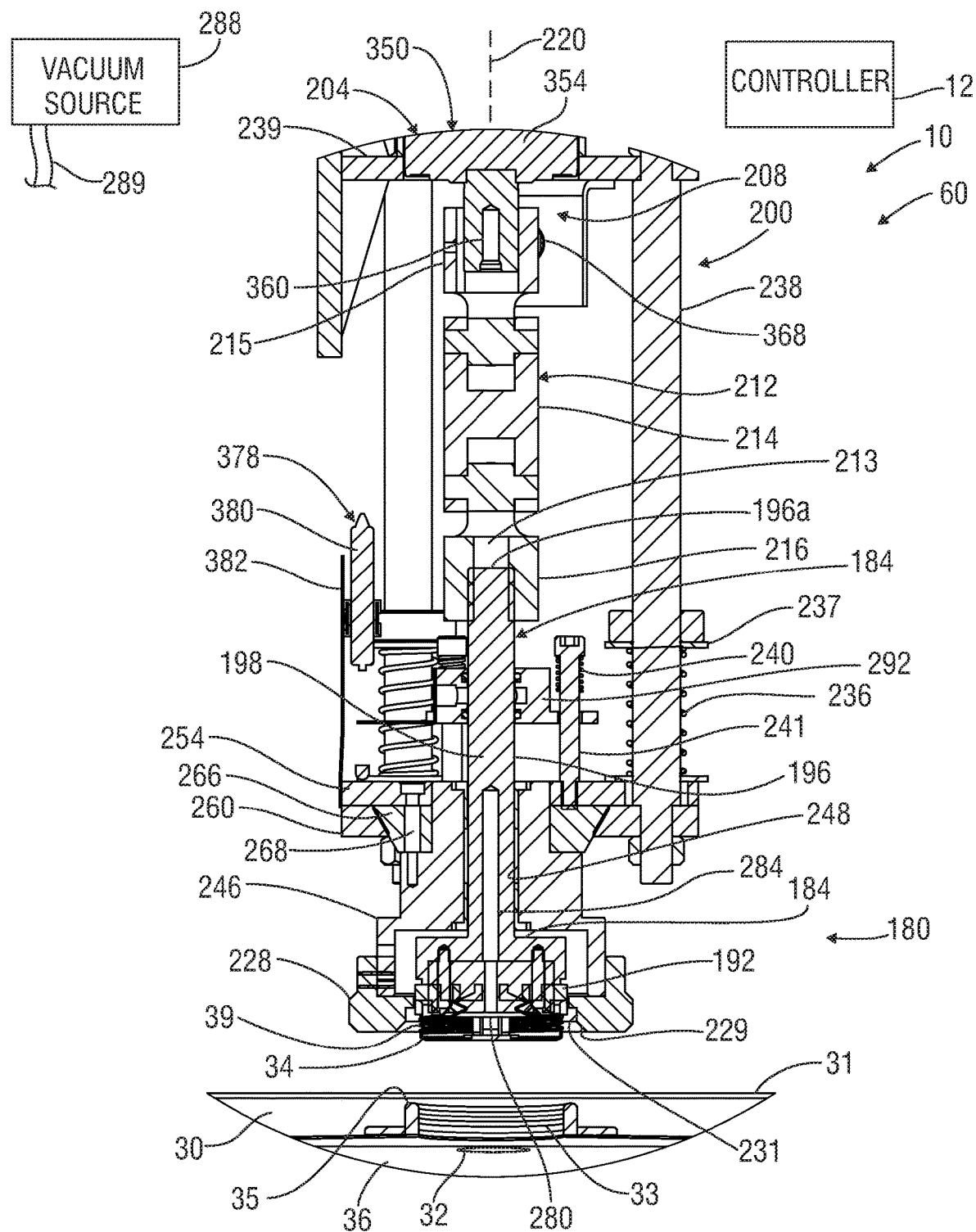
FIG. 36 is a cross-sectional view of the exemplary bung plug installer of FIG. 35 in an exemplary home position, or before installing an exemplary bung plug in an exemplary drum, in accordance with one or more embodiments of the present disclosure.

Referring now to FIGS. 35 & 36, the bung plug installer 60 may have any suitable form, configuration, components and operation. For example, the bung plug extractor 50, such as described above, may be used as the bung plug installer 60. In other embodiments, the bung plug installer 60 may be separate and distinct from the bung plug extractor 50, but have most of the same components, features, details and operation as the bung plug extractor 50 (such as described above). For example, the bung plug installer 60 may include the same centering assembly 180 (e.g. centering collar 228, centering housing 246 and centering cone 266), bung plug engagement tool 184, carrier 200, vacuum housing 292 and related components as described above with respect to the exemplary bung plug extractor 50, the descriptions above of which are hereby incorporated by reference herein in their entireties. In such instance, these exemplary components may be used generally in reverse by the illustrated bung plug installer 60 to grab (e.g. suck up) the bung plug 34 off the bung plug conveyor 328 (e.g. FIG. 1A) or other location, center the bung plug engagement tool 184 and bung plug 34 over the bung opening 32 and install the bung plug 34 (carried thereby) into the bung opening 32 (e.g. rotating the bung plug engagement tool 184 in the opposite direction as during bung plug extraction by the bung plug extractor 50). In the preferred embodiment, some components of the bung plug installer 60 may be modified or have modified capabilities as those of the bung plug extractor 50. For example, the driver 204 (for actuating the guide 196 of the bung plug engagement tool 184) of the bung plug installer 60 may include the same and additional capabilities as the driver 204 of the bung plug extractor 50. For example, the driver 204 of the bung plug installer 60 may be a servo-motor 350 having a selectively rotatable shaft operatively coupled (e.g. via a gear box 354) to the guide 196 of the bung plug engagement tool 184 for rotation thereof in the same manner, or similarly, as described above and shown in the appended drawings as the air motor 206 (e.g. FIG. 17C) of the bung plug extractor 50, plus additional components and capabilities (such as described below). Furthermore, various of the features of the exemplary bung plug extractor 50 may not be necessary in the exemplary bung plug installer 60, such as the bung plug retraction actuator 308 (e.g. FIG. 31) and related components (e.g. bracket 314, connection plate 318), and thus may not be included in the bung plug installer 60.

Figure 37:
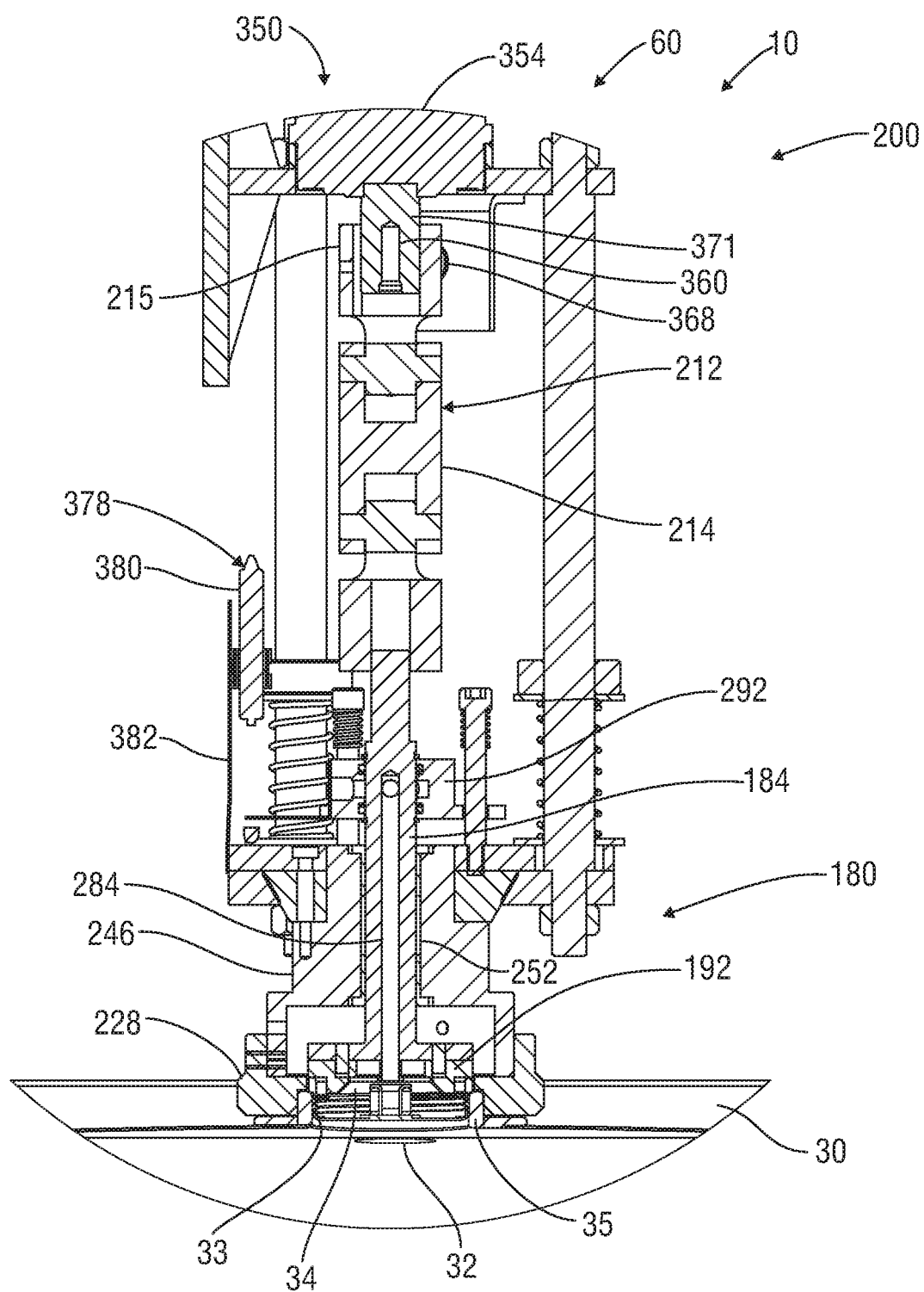
FIG. 37 is a cross-sectional view of the exemplary bung plug installer of FIG. 35 as it makes contact with an exemplary drum and prior to fully threadably engaging an exemplary bung plug therewith in accordance with one or more embodiments of the present disclosure.
Figure 39:
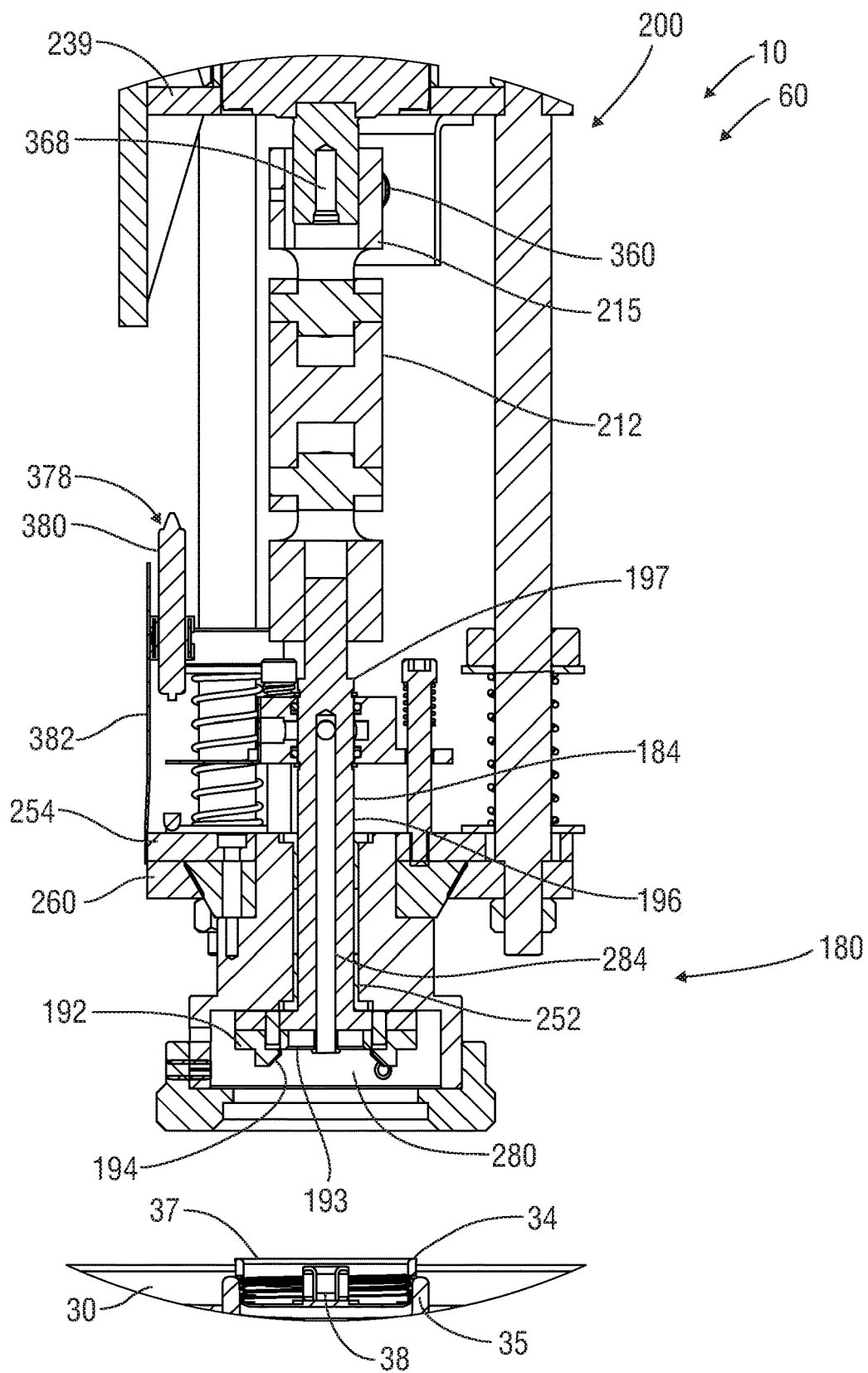
FIG. 39 is a cross-sectional view of the exemplary bung plug installer of FIG. 35 after threadably engaging an exemplary bung plug with an exemplary drum and moving away from the drum in accordance with one or more embodiments of the present disclosure.

Referring to FIGS. 1A-B & 2, in the preferred embodiment, once the drum 30 is positioned as desired for installing a bung plug 34 in the drum 30 (e.g. moved to the third station 122), the exemplary bung plug installer 60 may be shuttled, or moved, into position relative to the drum 30 and/or the drum 30 may be moved in a desired position relative to the bung plug installer 60. For example, the bung plug installer 60 may be moved from at least one "home" position (e.g. away from the drum 30, similar to the home positions of the exemplary bung locator 40 and bung plug extractor 50 as described above) to an "operating" position over and/or in contact with the drum 30. In at least one exemplary home position, the bung plug installer 60 may be sufficiently clear of the drum 30 to allow other one or more components (e.g. dust cap crimper 98) to engage or perform other drum manipulation operations on the drum 30, allow the drum 30 to be moved to a different location, for any other desired purpose(s) or a combination thereof. In at least one operating position, the exemplary bung plug installer 60 may be over the bung opening 32 of the drum 30. In the preferred embodiment, for example, FIG. 36 illustrates the exemplary bung plug installer 60 over the drum 30 prior to being lowered down onto the drum 30. FIG. 37 illustrates the bung plug installer 60 of the preferred embodiment installing the bung plug 34 in the drum 30 and FIG. 39 illustrates the exemplary bung plug installer 60 after installing the bung plug 34 and moving up away from the drum 30. (It should be noted that FIG. 39 also represents an exemplary position of the bung plug installer 60 of the preferred embodiment prior to picking up a bung plug 34 prior to installation.)

Figure 40:
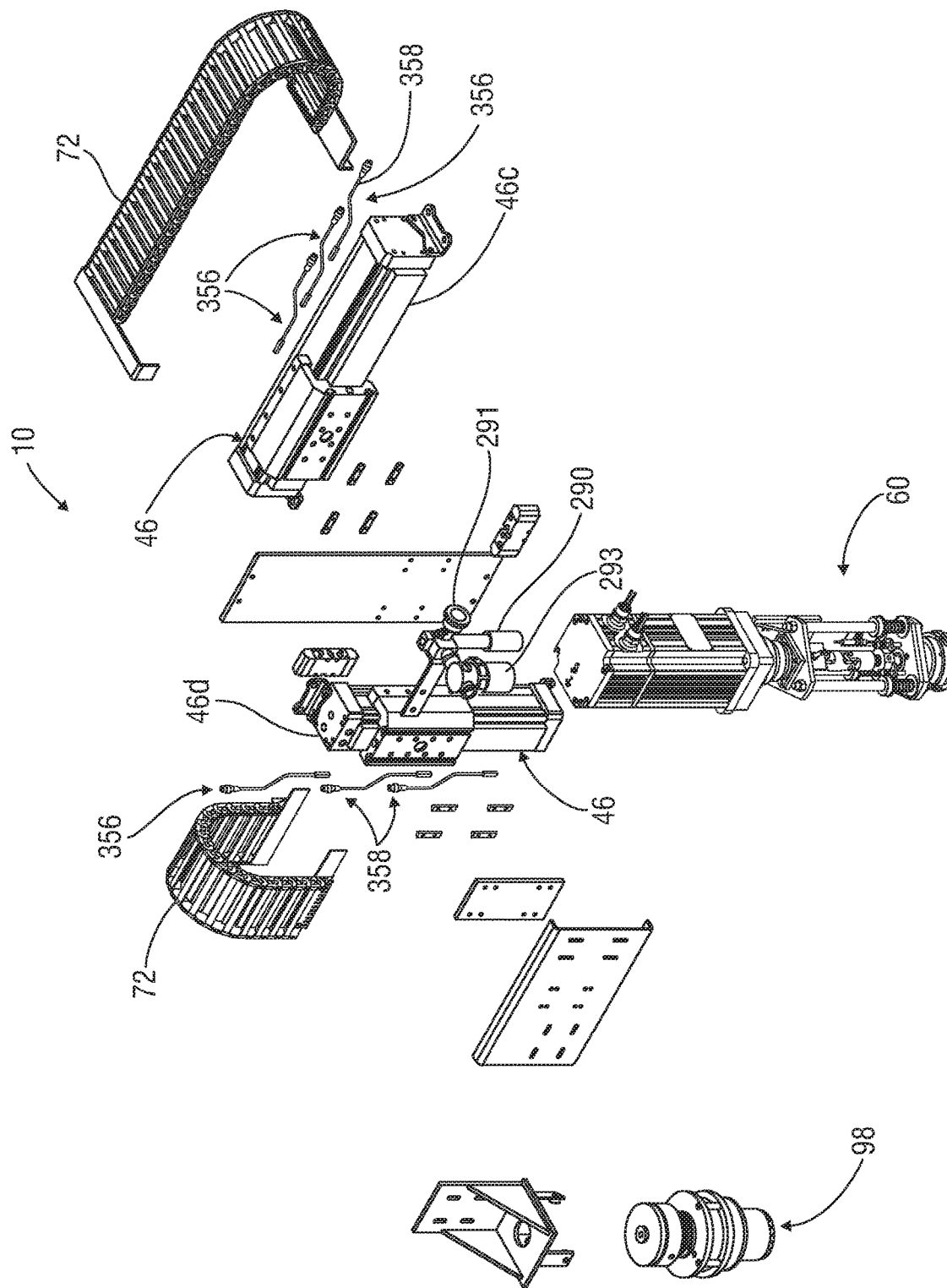
FIG. 40 is an exploded view of various exemplary components of the drum manipulation system of FIG. 1A including the exemplary bung plug installer in accordance with one or more embodiments of the present disclosure.
Figure 41:
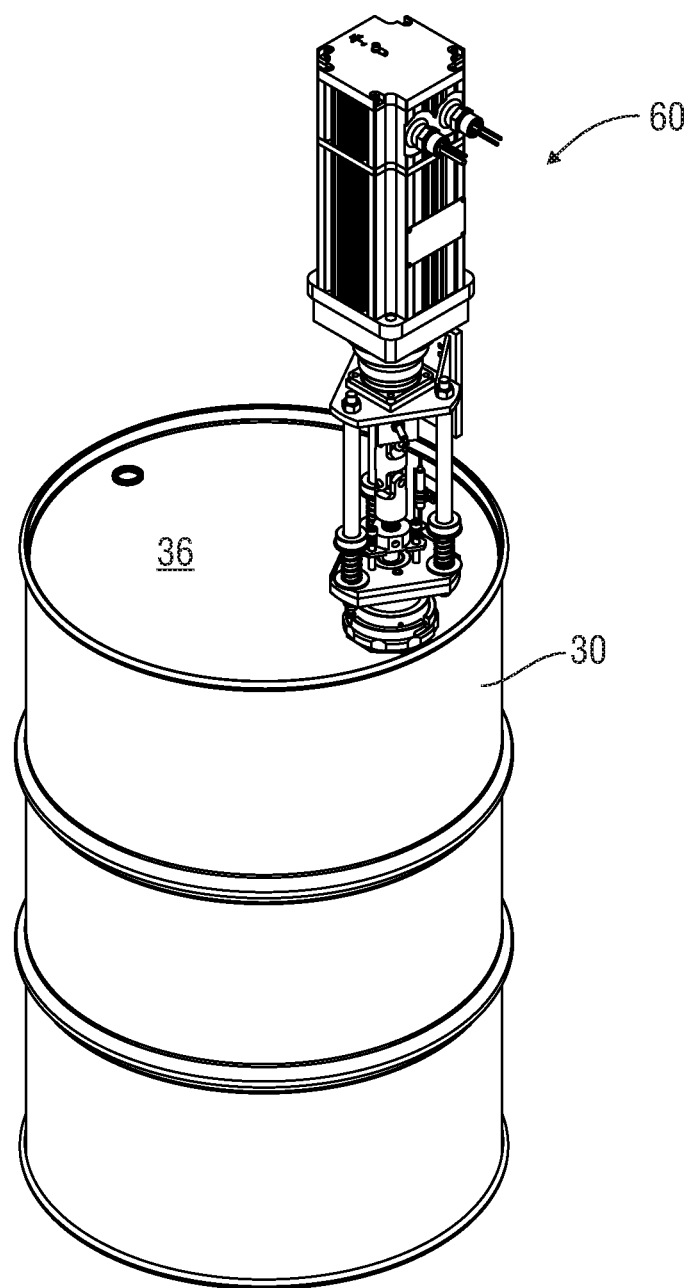
FIG. 41 is a perspective view of the exemplary bung plug installer of FIG. 35 shown engaging an exemplary drum.
Figure 47:
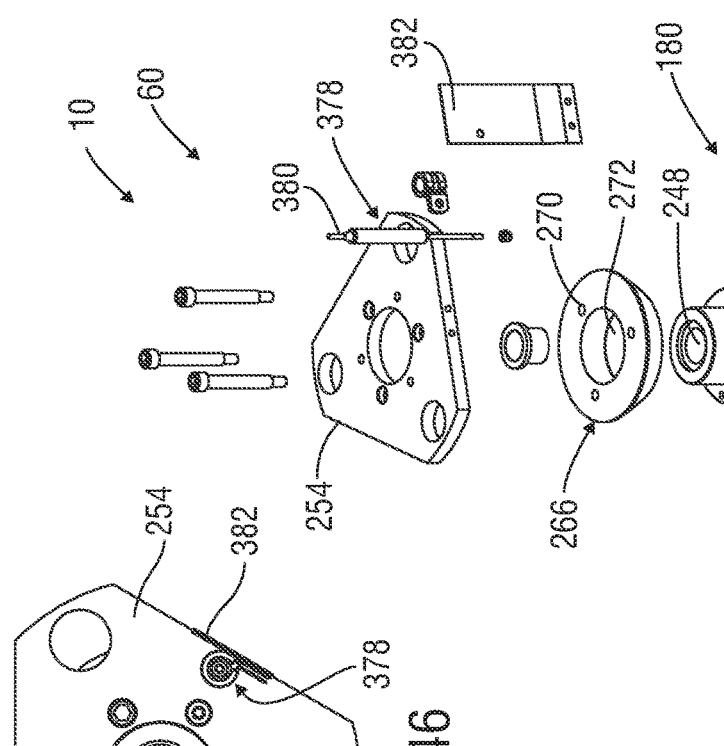
FIG. 47 is an exploded view of the exemplary bung plug installer components of FIG. 45.
Figure 46:
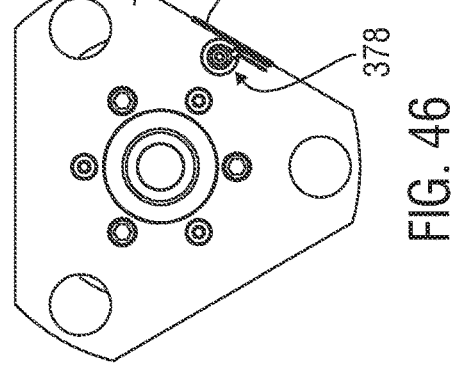
FIG. 46 is a top view of the exemplary bung plug installer components of FIG. 45.
Figure 48:
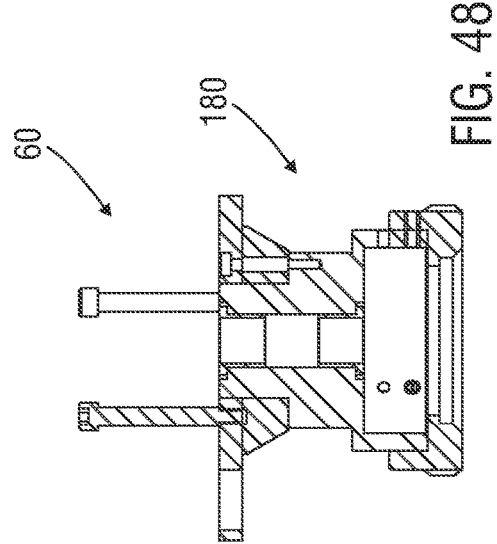
FIG. 48 is a cross-sectional view of the exemplary bung plug installer components of FIG. 45 taken along lines FIG. 48-FIG. 48.
Figure 45:
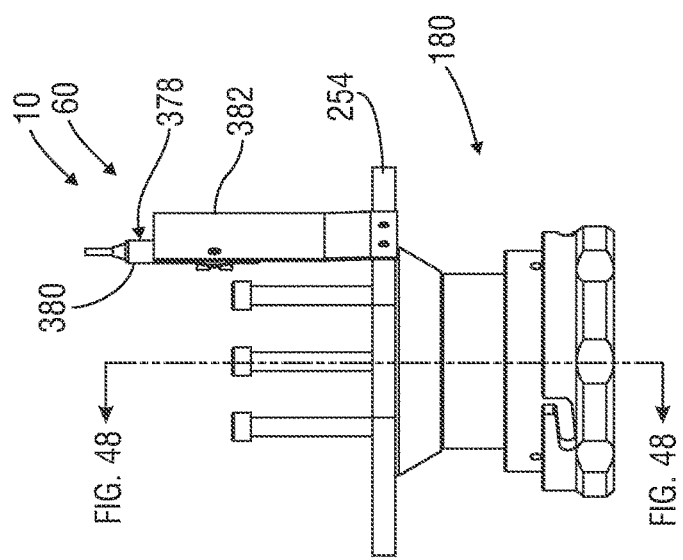
FIG. 45 is an isolated side view of certain components of the exemplary bung plug installer of FIG. 35 including the exemplary displacement sensor in accordance with one or more embodiments of the present disclosure.

Referring again to FIGS. 1A-B & 2, in the preferred embodiment, the bung plug installer 60 may be selectively moveable relative to the drum 30 as desired in any suitable manner. For example, one or more drivers 46 may be operatively coupled to the bung plug installer 60 and, if desired, electronically coupled to electronic controller 12, for selectively moving the bung plug installer 60 in one or more linear, arc-like and/or angular paths back and forth between positions, similarly as described above with respect to the movement of the exemplary bung locator 40. In the preferred embodiment, the bung plug installer 60 is moveable between home and operating positions by a third driver 46c (e.g. linear pneumatic or hydraulic cylinder) in a first linear path sideways (e.g. horizontally) toward the drum 30 and then by a fourth driver 46d (e.g. linear pneumatic or hydraulic cylinder) in a linear vertical path down to the drum 30. If desired, one or more sensors 356 (e.g. proximity sensors 358, FIG. 40) may be used to assist in positioning the bung plug installer 60 for each of its positions. In other embodiments, the bung plug installer 60 may be moveable toward and away from the drum 30 in any other desired manner, along a single path or one or more non-linear paths (e.g. an arc-like motion, angular motion, etc.), with the use of any other form or combination of driver(s) or other components controlled by the controller 12, other component(s), one or more operators or a combination thereof.

For installing a bung plug 34 in the drum 30, the bung plug 34 should preferably be brought into position on, over or in the bung opening 32 for engagement therewith by the exemplary bung plug installer 60. The bung plug 34 may be positioned on, over or in the bung opening 32 in any suitable manner. For example, a robotic arm, or other component, may place the bung plug 34 on, over or in the bung opening 32 (e.g. prior to engagement by the bung plug installer 60). For another example, a robotic arm, or other component, may deliver the bung plug 34 to the bung plug installer 60, which will then position the bung plug 34 on, over or in the bung opening 32. For yet another example, the bung plug installer 60 may itself store one or more bung plugs 34 for one-by-one successive positioning onto the respective bung openings 32 of each successive drum 30 (e.g. with a built-in automatic or associated dispenser).

Referring still to FIGS. 1A-B & 2, in many embodiments, the bung plug installer 60 itself retrieves the bung plug 34 and brings it to the bung opening 32 of the subject drum 30. In such instances, the installer 60 may use any suitable configuration of components to retrieve and carry the bung plug 34. Similarly, as mentioned above for the bung plug extractor 50, the bung plug installer 60 may utilize one or more cups, grippers, claws, tongs, magnets or any other mechanical or other components to retrieve (physically or otherwise engage or grab) the bung plug 34 (at any desired bung plug storage location or waiting area). For another example, suction may be used to effectively lock onto, or grab, the bung plug 34 and carry it to the bung opening 32. Referring to FIG. 36, preferably, the drum manipulation system 10 is configured to provide air suction inside one or more vacuum spaces 280 formed between the mating portion 192 of the bung plug engagement tool 184 of the bung plug installer 60 and the bung plug 34, in the same manner, or similarly, as described above with respect to the bung plug extractor 50 (e.g. FIGS. 18, 26-28). Thus, the details, components and operations provided above and shown in the appended drawings relating to use of a vacuum of the exemplary bung plug extractor 50 are hereby incorporated by referenced herein in their entireties with respect to the exemplary bung plug installer 60. For example, a vacuum may be formed in the vacuum space 280 through one or more air passageways 284 formed in, or extending at least partially through, the bung plug engagement tool 184 of the bung plug installer 60 sufficient to lift the bung plug 34 (e.g. edge 37, FIG. 4) up and at least partially against or proximate to the face 193 (or other portion(s)) of the mating portion 192 (e.g. FIG. 39) of the bung plug engagement tool 184 and carry it with the bung plug engagement tool 184. However, in other embodiments, suction may be created in a different space or between the bung plug 34 and another component of the bung plug extractor 50 to releasably engage, hold or carry the plug 34 for removal, or may not be included. For example, the bung engagement tool 184 of FIG. 21 (as described above) may be used in the bung plug installer 60.

Referring back to FIGS. 1A & 2, when the exemplary bung plug installer 60 moves to the drum 30 and retrieves the bung plug 34 from a bung plug conveyor 328 (or other plug depository), the bung plug installer 60 may be moved (e.g. from a home position) to the bung plug conveyor 328 to allow the bung plug engagement tool 184 bung plug installer 60 (e.g. FIG. 36) to suck up (or otherwise grab or engage) the bung plug 34 and carry it (e.g. by maintaining suction) to the drum 30. This may be done in any suitable manner and with any desired components. In the preferred embodiment, the bung plug installer 60 is moved in a horizontal path toward the bung plug conveyor 328 via the third driver 46c to a "first intermediate" position to pick up the bung plug 34. For example, one or more sensors 356 (e.g. FIG. 40), such as a proximity sensor 358, may detect when the bung plug installer 60 has arrived at the desired first intermediate position and signal the controller 12 (other component or operator). The exemplary controller 12 (other component or operator) may then cause the third driver 46c to stop moving and initiate one or more other actions (e.g. direct the bung plug installer 60 to pick up a bung plug 34). In other embodiments, the sensor(s) 356 may communicate directly with the driver 46c, other component(s), an operator or combination thereof.

Referring to FIGS. 1A & 39, if it is desired to orient the bung plug engagement tool 184 of the bung plug installer 60 in a particular manner to pick up the bung plug 34 (e.g. from the bung plug conveyor 328 or other location), the bung plug engagement tool 184 is so oriented in any suitable manner and at any desired time. In the preferred embodiment, before lowering the bung plug engagement tool 184 of the bung plug installer 60 to pick up the bung plug 34, the tabs 194 of the mating portion 192 of the bung plug engagement tool 184 (e.g. FIG. 20) may be oriented over spaces between protrusions 38 of the bung plug 34 (e.g. FIGS. 4-5) by rotating the mating portion 192. For one example, if the bung plug 34a (FIG. 4) was placed on the bung plug conveyor 328 (or other plug depository) with its first and second protrusions 38 oriented at, or near, the six and twelve o-clock positions, the tabs 194 of the mating portion 192 of the bung plug engagement tool 184 may be rotated to, or near, the three and nine o-clock positions. Of course, these particular positions are provided herein for exemplary purposes only and any other desired positions may be used. Alternately, the respective tabs 194 of the bung plug engagement tool 184 of the exemplary bung plug installer 60 may be placed in the same approximate or exact (known) positions in which the respective tabs 194 of the bung plug extractor 50 were situated when the bung plug 34 was placed on the bung plug conveyor 328, such as described above.

In the present embodiment, the bung plug engagement tool 184 of the bung plug installer 60 is rotated while moving toward the bung plug conveyor 328 (or other bung plug 34 depository). However, in other embodiments, the bung plug engagement tool 184 may be rotated or otherwise oriented at another time, such as before the bung plug installer 60 is moved to the location of the bung plug 34 or after it arrives. The exemplary drum manipulation system 10 is configured so that the same bung plug 34 that was removed from a particular drum 30 will typically be retrieved from the bung plug conveyor 328 and re-engaged with the same drum 30. Reinstalling the same bung plug 34 that was removed from the drum 30 may have advantages, such as, for example, providing greater assurance that the bung plug 34 will properly fit and mate with the drum 30. However, this capability is not required.

Referring to FIGS. 35 & 36, in the preferred embodiment, the bung plug engagement tool 184 of the bung plug installer 60 is rotated into the desired orientation over the bung plug 34 (before picking it up) with the use of one or more alignment sensors 360 coupled to, or extending from, a non-rotating part of the bung plug installer 60 and configured to detect the presence of one or more flags 368 (having a particular pre-set position) on one of the rotating parts of the bung plug installer 60 during rotation of the bung plug engagement tool 184 over the bung plug 34. The alignment sensor(s) 360 and flag(s) 368 may have any suitable form, configuration, location and operation. For example, the alignment sensor 360 may be a proximity sensor 362 carried on a mounting plate 371 or other component affixed to the bung plug installer 60. The exemplary flag 368 may include one or more reflectors, pieces of key stock or other items welded or otherwise affixed to, or integral with, the flexible coupler 212 (e.g. the upper link 215 of the universal joint 214) or other moving component of the bung plug installer 60 or a marking, irregularity or geometric feature (e.g. protrusion, indentation) thereon. However, the alignment sensor(s) 360 and flag(s) 368 may have any other suitable form and configuration and be provided on any other suitable components of the drum manipulation system 10. For example, the alignment sensor(s) 360 may instead be coupled to, or provided on, the driver 204, upper plate 239 or another component coupled thereto, and the flag(s) 368 coupled to, or provided on, a different part of the flexible coupler 212, the shaft 208 of the driver 204, the guide 196 or another rotating part of the bung plug engagement tool 184 of the bung plug installer 60.

Still referring to FIGS. 35 & 36, in the preferred embodiment, when the exemplary flag 368 is aligned under the alignment sensor 360, the bung plug engagement tool 184 is in the desired orientation to move down and engage the bung plug 34. At that time, for example, the exemplary alignment sensor 360 may be configured to signal another component (e.g. the driver 204 and/or controller 12) to stop rotation of the bung plug engagement tool 184 or take other action or may direct such action itself. However, any other arrangement of parts and techniques may be used to orient the bung plug engagement tool 184 of the bung plug installer 60 for engaging the bung plug 34. Thus, the components and techniques described and shown herein for orienting the bung plug 34 or bung plug engagement tool 184 to pick up the bung plug 34 are in no way limiting upon the present disclosure or appended claims, except and only to the extent as may be expressly recited and explicitly required in a particular claim hereof and only for such claim(s) and any claim(s) depending therefrom.

Referring to FIGS. 1A & 39, after the exemplary bung plug engagement tool 184 of the bung plug installer 60 is oriented as desired, it may be moved down to pick up the bung plug 34 in any suitable manner. In the preferred embodiment, the bung plug installer 60 is moved in a vertical path down to a "second intermediate" position via the fourth driver 46d until the bung plug engagement tool 184 engages the bung plug 34 as desired. For example, when a vacuum is used to engage the bung plug 34 (e.g. to create suction in the vacuum space 280), the second intermediate position may be achieved when the face 193 of the mating portion 192 of the bung plug engagement tool 184 abuts the edge 37 of the bung plug 34, or the mating portion 192 is close enough to the bung plug 34 to allow sufficient vacuum suction to suck up or "grab" the bung plug 34. If desired, the vacuum source 288 (or other component) may be configured to indicate whether sufficient vacuum suction has been created to lift or grab the bung plug 34, or otherwise if the bung plug 34 has been lifted, and signal the controller 12 or other component (e.g. to initiate the next action(s)). If it is determined that sufficient vacuum suction is not detected (or the bung plug 34 has not been engaged), the drum manipulation system 10 may be configured to lift the exemplary bung plug installer 60, rotate the bung plug engagement tool 184 a desired amount (e.g. 10° or more or less) and try again to engage the bung plug 34. This process may be repeated a desired number of times (three or more or less) in an effort to grab the bung plug 34 before the controller 12 (or other component) reports a fault event and/or issues a fault signal. However, any other components and techniques may be used to pick up the bung plug 34. For example, when a vacuum is not used to engage the bung plug 34, the bung plug engagement tool 184 may engage the bung plug 34 in another suitable manner (such as mentioned above) and, if desired, any suitable components may be used to determine whether successful engagement is achieved.

Referring to FIGS. 1A & 36, in the preferred embodiment, after the exemplary bung plug 34 has been grabbed by the bung plug engagement tool 184, the bung plug installer 60 is moved to an operating position over the bung opening 32 of the drum 30. Any sequence and components may be used to move the bung plug installer 60 to an operating position. For example, the fourth driver 46d may be actuated to move the bung plug installer 60 up, the third driver 46c actuated to move the bung plug installer 60 forward (toward the front side 104 of the drum manipulation system 10) and the fourth driver 46d actuated again to move the bung plug installer 60 down to an operating position, all while maintaining engagement with the bung plug 34 (e.g. maintaining vacuum suction). After the exemplary bung plug installer 60 arrives at the operating position (e.g. FIGS. 41-44), the centering assembly 180, bung plug engagement tool 184 and other components of the exemplary bung plug installer 60 may be configured to operate in substantially the same manner as described above and shown in the appended drawings with respect to the bung plug extractor 50, but, in this instance, to install the bung plug 34 into the bung opening 32 (e.g. FIGS. 36-39).

Referring now to FIGS. 36 & 37, in the preferred embodiment, since the bung plug 34 threadably engages the bung opening 32, the bung plug 34 is ideally positioned over the bung opening 32 so that the lowermost of its threads 39 aligns over or abuts the uppermost thread(s) 33 of the opening 32. Thereafter, the mating portion 192 of the exemplary bung plug engagement tool 184 is rotated (e.g. clockwise) to engage the bung plug 34 in the hole 32. If desired, the bung plug installer 60 may be capable of registering, or properly aligning, the threads 39 of the bung plug 34 with the threads 33 of the bung opening 32 to ensure proper alignment for threadable installation, provide improved accuracy, efficiency and effectiveness of bung plug installation operations, for any other reason(s) or a combination thereof. The threads 39, 33 may be registered or properly aligned in any suitable manner and with any suitable components.

In some embodiments and circumstances, it may be desirable to uninstall the bung plug 34 from the drum 30 and try to install it again (e.g. if the bung plug 34 does not properly engage the bung opening 32). In such instances, the exemplary bung plug engagement tool 184 of the bung plug installer 60 is rotated in the opposite direction (e.g. counterclockwise) to unscrew the bung plug 34 from the drum 30. Thus, the bung plug installer 60 of the preferred embodiment may also be used to uninstall (and in some cases to extract) the bung plug 34 from the drum 30.

Figure 38:
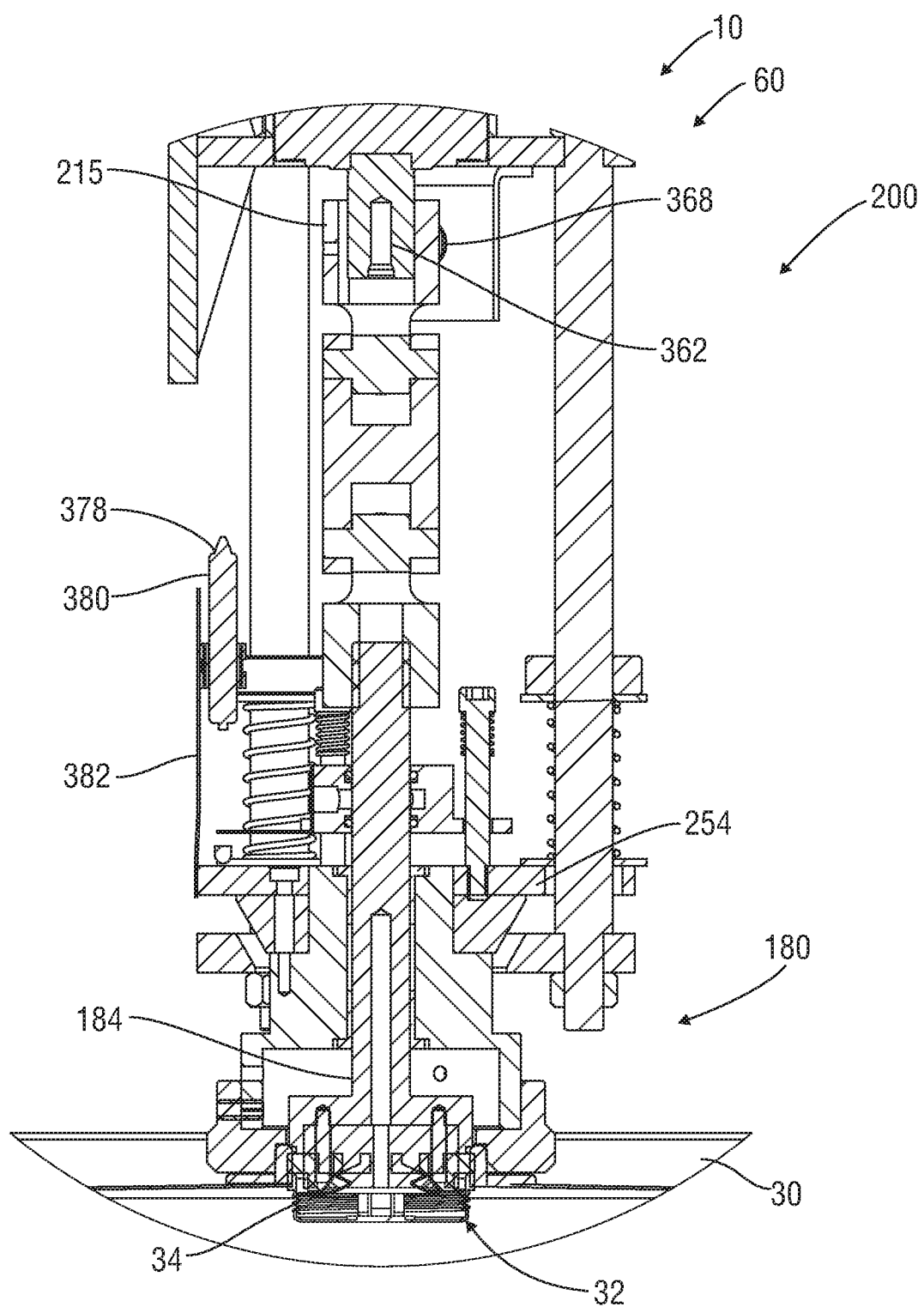
FIG. 38 is a cross-sectional view of the exemplary bung plug installer of FIG. 35 after threadably engaging an exemplary bung plug too far into the bung opening of an exemplary drum.

Referring to FIGS. 36-38, the exemplary bung plug installer 60 may include additional capabilities, such as the ability to (i) measure the amount of vertical movement of the bung plug 34 in the bung opening 32 during installation, (ii) count the number of revolutions of rotation (e.g. or fractions of a revolution) of the bung plug 34 as it threadably engages the drum 30 (when applicable), (iii) measure the amount of torque applied to the bung plug 34 during installation (when applicable), any other capabilities, any variations thereof or a combination thereof. As used herein and in the appended claims the terms "bung plug insertion variables" and variations thereof mean and refer to any one or more of the above variables (variables measured in items (i)-(iii), other variables relating to installation of the bung plug 34 and variations thereof). Different embodiments may include measuring any one or more (or none) of the bung plug insertion variables, while some embodiments may not measure any bung plug insertion variables.

The bung plug insertion variable(s) may be useful, for example, to assist in preventing damage to the bung plug 34 and/or drum 30 during installation of the bung plug 34 (e.g. stripping or cross-threading threads of the bung plug 34 and/or bung opening 32), determining when to stop rotating the bung plug 34, ensuring the bung plug 34 is properly engaged with the drum 30 (e.g. without excessive torque applied to the bung plug 34, not inserted too deep or too shallow in the drum 30 or after too few or too many rotations of revolution), prevent a dust-cap from being placed on a drum 30 with a cross-threaded or damaged bung plug 34 (e.g. FIG. 38), satisfying regulatory criteria or quality control standards and/or reporting requirements or drum certifications (e.g. DOT, Six Sigma), identifying drums 30 that do not meet particular criteria or standards, providing data to report any of the same, for any other purpose(s) or a combination thereof. In some embodiments, one or more bung plug insertion variables may be measured or determined in real-time on a continuing or as-desired basis. Based upon the measurement(s) taken of one or more bung plug insertion variables, the exemplary drum manipulation system 10 (e.g. controller 12) is preferably configured to make one or more determinations (e.g. and initiate, or signal for, one or more responsive actions when deemed necessary) in real-time on an on-going basis, such as whether the torque applied to the bung plug 34 after a particular length of downward vertical movement of the bung plug 34 and/or number of revolutions of rotation of the bung plug 34 meets or exceeds a desired torque value, the bung plug 34 has been cross-threaded, other determination or a combination thereof.

Still referring to FIGS. 36-38, if desired, the drum manipulation system 10 (e.g. controller 12) may be configured to provide (e.g. electronically transmit) bung plug insertion variable data (e.g. in real-time) to an operator, with other entities, such as customers, regulatory authorities and the like and/or to any other location. In some circumstances, for example, the controller 12 can determine if a desired torque value applied to the bung plug 34 is achieved before a desired amount of downward vertical movement of the bung plug 34 and/or number of revolutions of rotation of the bung plug 34. When this occurs, for example, the controller 12 may provide a default (or other) signal, initiate one or more actions to be taken (e.g. remove the drum 30 from the drum manipulation system 10), report pertinent data to a desired destination or a combination thereof. For another example, the controller 12 may be configured to determine (e.g. based upon torque, rotations and vertical travel) if the bung plug 34 was cross-threaded when installed in the drum 30 and signal an operator (via screen display, default signal, etc.) that such drum 30 should not be further processed (e.g. have a dust cap installed) and allow the drum 30 to be removed from the drum manipulation system 10, if desired. In the preferred embodiment, the exemplary controller 12 should determine that the bung plug 34 in FIG. 38 has been secured to the drum 30 too far into the bung opening 32 and provide a signal that this drum 30 should be rejected and/or removed from the drum manipulation system 10.

Referring still to FIGS. 36-38, any suitable configuration of components and techniques may be used to measure one or more bung plug insertion variable(s), use such data and direct any responsive actions. For example, during threadable engagement of the bung plug 34 with the drum 30, one or more displacement sensor(s) 378 (e.g. linear encoder 380) may be configured to monitor the amount of vertical movement, depth or distance that the bung plug 34 moves into the bung opening 32 during installation (e.g. on a continuing basis, in real-time), for any other purpose(s) or a combination thereof. For example, the displacement sensor 378 (e.g. FIGS. 45-48) may be coupled (e.g. via bracket 382) to the floating plate 254 (or other component). In some embodiments, the displacement sensor 378 (or other component(s)) may communicate data relating to vertical displacement measurements taken to the electronic controller 12 (or other component(s)) in real-time on a continuing basis for a determination of when rotation of the bung plug 34 should be stopped and to cause such stoppage and/or for any other purpose(s).

For another example, the exemplary bung plug installer 60 may include one or more electronic, or other form, of torque sensors, torque transducers, torque meters or the like (e.g. one or more encoders 352 inside driver 204, FIG. 35) to measure the amount of torque applied to the bung plug 34 during installation (e.g. on a continuing basis, in real-time) and/or any related variable. For still a further example, the bung plug installer 60 may include one or more electronic, or other forms, of counters (e.g. encoder 352 of driver 204, FIG. 35) to count or monitor the number of revolutions of rotation of the bung plug 34 (e.g. on a continuing basis, in real-time) as it is installed in the drum 30. In the preferred embodiment, the driver 204 (e.g. servo-motor 350) is capable of counting or monitoring the number of revolutions of rotation of the bung plug 34 as it is installed in the drum 30 in real-time on a continuing basis, the amount of torque applied to the bung plug 34 in real-time on a continuing basis during installation, one or more variations thereof or a combination thereof. For example, the servo-motor 350 may include one or more (e.g. internal) encoders 352 (FIG. 35) and/or other component(s) configured to monitor, measure or determine one or more parameters that relate to the torque applied to the bung plug 34 and count or monitor the number of revolutions of rotation of the bung plug 34 as it is installed in the drum 30 during rotation thereof (e.g. on a continuing basis, in real-time). In some embodiments, this may entail the encoder 352 measuring resistance on the shaft 208 of the servo-motor 350 (e.g. FIG. 36), demand placed upon the motor 350, other variable(s) or a combination thereof. If desired, the encoder 352 may communicate its measurements and/or related data to the electronic controller 12 (or other component(s)) in real-time for a determination of when rotation of the bung plug 34 should be stopped and to cause such stoppage (e.g. when a desired torque had been applied to the bung plug 34) and/or for any other purpose(s). In other embodiments, the driver 204 may be an air motor or one or more other components configured to assist in measuring or providing one or more bung plug insertion variables.

When one or more bung plug insertion variable(s) or variations thereof fails to satisfy a desired value, the exemplary controller 12 (or other component(s)) may be configured to direct one or more responsive actions, such as reporting a fault event, providing a fault signal, initiating an alarm, rejecting or tagging the drum 30, directing the bung plug installer 60 to uninstall or remove the bung plug 34, ceasing operation of the bung plug installer 60, drum manipulation system 10 or one or more components thereof, other action(s) or a combination thereof. In the preferred embodiment, for example, if the torque applied to the bung plug 34 exceeds a particular value (or range) prior to the occurrence of a particular number of revolutions of rotation of, or amount of downward vertical displacement, of the bung plug 34, the controller 12 may be configured to unscrew bung plug 34 and repeat the installation process as described above up to two (or fewer or more) additional times before rejecting the drum 30. For another example, if the torque applied to the bung plug 34 exceeds a particular value (or range) after the occurrence of a particular number of revolutions of rotation of, or amount of downward vertical displacement, the controller 12 may be configured to stop rotation of the bung plug 34 and identify or reject the drum 30 for removal from the drum manipulation system 10 (e.g. because the bung plug 34 is damaged or something else is wrong).

Referring now to FIGS. 1A & 39, in the preferred embodiment, after the bung plug 34 is secured to the drum 30 (or earlier as desired), the exemplary bung plug engagement tool 184 of the bung plug installer 60 may be disengaged from the bung plug 34 and the bung plug installer 60 shuttled, or moved, away from the drum 30, such as described above. For example, the bung plug installer 60 may be shuttled back to its home position or an intermediate position (e.g. to make room for the dust cap crimper 98 to crimp a dust cap over the bung plug 34). In embodiments involving the use of suction to engage the bung plug 34, the vacuum may be turned off or suction otherwise released (and air pressure reversed, if desired) at any desired time during or after the bung plug 34 is engaged with the drum 30.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and/or claims.

The methods described above or claimed herein and any other methods which may fall within the scope of the appended claims can be performed in any desired or suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments have been shown and described, many variations, modifications and/or changes of the system, apparatus and methods of the present disclosure, such as in the components, details of construction and operation, arrangement of parts and/or methods of use, are possible, contemplated by the patent applicant(s) hereof, within the scope of any appended claims, and may be made and used by one of ordinary skill in the art without departing from the spirit, teachings and scope of this disclosure and any appended claims. Thus, all matter herein set forth or shown in the accompanying drawings should be interpreted as illustrative, and the scope of the disclosure and any appended claims should not be limited to the embodiments described and shown herein.

The invention claimed is:

1. Apparatus for rotating a container in a container manipulation system, the container being delivered to the container manipulation system on a conveyor, the conveyor having first and second sides and front and rear ends, the apparatus comprising:
    first and second carriages being positioned proximate to opposite sides of the conveyor, respectively, whereby the first carriage is closer to the first side of the conveyor and the second carriage is closer to the second side of the conveyor,
    each carriage carrying respective forward and rear clamps arms, the rear clamp arm of each carriage being closer to the rear end of the conveyor than the respective associated front clamp arm, and
    each clamp arm being selectively independently moveable toward and away from the container on the conveyor and carrying at least first and second vertically spaced-apart wheels, whereby the wheels on the respective rear clamp arms are rearward of the wheels on the corresponding associated front clamp arms relative to the conveyor, wherein all of the wheels are engageable with the container on the conveyor, at least two of the wheels on the first carriage are power-driven and selectively rotatable and the remaining wheels on the first and second carriages are free-spinning.

\* \* \* \* \*